United States Patent
Muro

(10) Patent No.: US 9,959,292 B2
(45) Date of Patent: May 1, 2018

(54) APPLICATION PROGRAM, SMART DEVICE, INFORMATION PROCESSING APPARATUS, INFORMATION PROCESSING SYSTEM, AND INFORMATION PROCESSING METHOD

(71) Applicant: Koji Muro, Tokyo (JP)

(72) Inventor: Koji Muro, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 171 days.

(21) Appl. No.: 14/865,209

(22) Filed: Sep. 25, 2015

(65) Prior Publication Data

US 2016/0094785 A1    Mar. 31, 2016

(30) Foreign Application Priority Data

Sep. 30, 2014 (JP) .................................. 2014-199812
Sep. 15, 2015 (JP) .................................. 2015-181503

(51) Int. Cl.
*H04N 5/76* (2006.01)
*G06F 17/30* (2006.01)
*H04N 5/232* (2006.01)

(52) U.S. Cl.
CPC .... *G06F 17/30265* (2013.01); *G06F 17/3028* (2013.01); *H04N 5/23206* (2013.01); *H04N 5/23216* (2013.01)

(58) Field of Classification Search
CPC ....................... G06F 17/30265; G06F 17/3028
USPC ..................................................... 348/231.3
See application file for complete search history.

(56) References Cited

U.S. PATENT DOCUMENTS

| | | | | |
|---|---|---|---|---|
| 2003/0156196 A1* | 8/2003 | Kato | ..................... | H04N 1/2112 348/207.2 |
| 2004/0249861 A1* | 12/2004 | Hoshino | ................. | G11B 27/11 |
| 2009/0079847 A1* | 3/2009 | Ohtsuka | ............ | G06F 17/30247 348/231.2 |
| 2009/0096891 A1* | 4/2009 | Jacumet | ................... | H04N 5/77 348/231.3 |

(Continued)

FOREIGN PATENT DOCUMENTS

| | | |
|---|---|---|
| JP | 2000-287164 | 10/2000 |
| JP | 2002-302252 | 10/2002 |

*Primary Examiner* — Sinh Tran
*Assistant Examiner* — Zhenzhen Wu
(74) *Attorney, Agent, or Firm* — IPUSA, PLLC

(57) ABSTRACT

A smart device includes a storage device, an imaging unit configured to capture a photo image, an input unit configured to input data to a predetermined field of a virtual display panel image, an image editing unit configured to create a virtual display panel-added photo image by superimposing the virtual display panel image having the data input to the predetermined field by the input unit on the photo image captured by the imaging unit, a first verification information generating unit configured to generate first verification information with respect to the virtual display panel-added photo image based on at least the photo image of the virtual display panel-added photo image, and a verification information storage unit configured to create a verification information/virtual display panel-added photo image that stores the first verification information and the data input to the predetermined field as metadata of the verification information/virtual display panel-added photo image.

16 Claims, 42 Drawing Sheets

(56) References Cited

U.S. PATENT DOCUMENTS

| | | | |
|---|---|---|---|
| 2011/0143707 A1* | 6/2011 | Darby, Jr. | G06F 17/30265 |
| | | | 455/404.2 |
| 2011/0145305 A1* | 6/2011 | Kamei | G06F 17/30038 |
| | | | 707/822 |
| 2015/0145888 A1* | 5/2015 | Hanai | H04N 13/004 |
| | | | 345/633 |

* cited by examiner

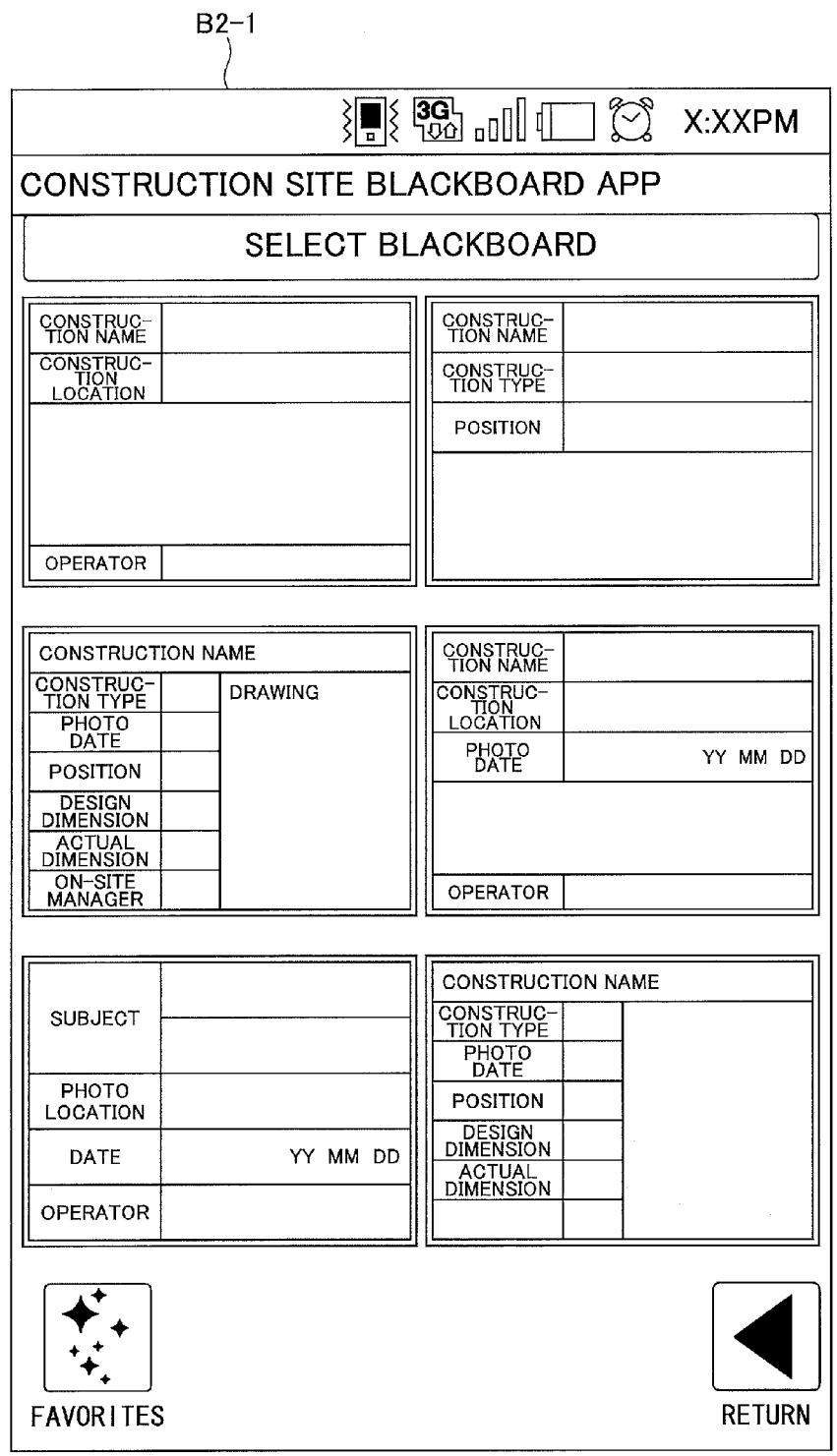

FIG.16

| SOI | START OF COMPRESSED DATA |
|---|---|
| APP1 | APPLICATION MARKER SEGMENT 1 |
| | (INCLUDES Exif INFORMATION AND THUMBNAIL) |
| APP5 | APPLICATION MARKER SEGMENT 5 |
| DQT | QUANTIZATION TABLE |
| DHT | HUFFMAN TABLE |
| SOF | FRAME HEADER |
| SOS | SCAN HEADER |
| COMPRESSION DATA | COMPRESSED MAIN IMAGE DATA |
| EOI | END OF COMPRESSED DATA |

FIG.21

| FAVORITE ITEM NO. | INPUT DATA FOR Templete01.jpg | | |
|---|---|---|---|
| | CONSTRUCTION NAME | CONSTRUCTION LOCATION | OPERATOR | FREE SPACE |
| Template01-1 | STATION SQUARE RENOVATION WORK | ○○ STATION | TANAKA CONSTRUCTION (CO., LTD.) | |
| .. | | | | |

| FAVORITE ITEM NO. | INPUT DATA FOR Templete02.jpg | | |
|---|---|---|---|
| | CONSTRUCTION NAME | CONSTRUCTION TYPE | POSITION | FREE SPACE |
| Template02-1 | ○○ BUILDING RENOVATION WORK | GENERAL ARCHITECTURAL AND CONSTRUCTION WORK (BUILDING) | (36,140) | |
| Template02-2 | PARKING CONSTRUCTION WORK | GENERAL ARCHITECTURAL AND CONSTRUCTION WORK (MISCELLANEOUS) | | |
| .. | .. | .. | .. | .. |

| PHOTO NO. | PHOTO IMAGE | BLACKBOARD IMAGE | BLACKBOARD IMAGE PARAMETER SETTINGS ||||
|---|---|---|---|---|---|---|
| | | | BLACKBOARD COLOR | BLACKBOARD POSITION | BLACKBOARD LAYOUT | BLACKBOARD SIZE |
| 001 | 001.jpg | Templete02.jpg | BLACK | UPPER LEFT | HORIZONTAL | W250 × H200 |
| 002 | 002.jpg | Templete03.jpg | BLACK | LOWER RIGHT | VERTICAL | W300 × H250 |
| 003 | 003.jpg | Templete01.jpg | GREEN | (10,10) | HORIZONTAL | W120 × H100 |
| : | : | : | : | : | : | : |

(1) INPUT DATA FOR Templete01.jpg

| PHOTO NO. | CONSTRUCTION NAME | CONSTRUCTION LOCATION | OPERATOR | | FREE SPACE |
|---|---|---|---|---|---|
| 003 | STATION SQUARE RENOVATION WORK | ○○ STATION | TANAKA CONSTRUCTION (CO., LTD.) | | : |
| : | : | : | : | | |

(2) INPUT DATA FOR Templete02.jpg

| PHOTO NO. | CONSTRUCTION NAME | CONSTRUCTION TYPE | POSITION | FREE SPACE |
|---|---|---|---|---|
| 001 | ○○ BUILDING RENOVATION WORK | GENERAL ARCHITECTURAL AND CONSTRUCTION WORK (BUILDING) | (36,140) | |
| : | : | : | : | |

(3) INPUT DATA FOR Templete03.jpg

| PHOTO NO. | CONSTRUCTION NAME | CONSTRUCTION TYPE | PHOTO DATE | POSITION | DESIGN DIMENSION | ACTUAL DIMENSION |
|---|---|---|---|---|---|---|
| 002 | ○○ DISTRICT CONSTRUCTION WORK | GENERAL ARCHITECTURAL AND CONSTRUCTION WORK (BUILDING) | 2011/11/11 | (36,140) | ○○ | △△ |
| : | : | : | : | : | : | : |

「xxx.jpg」

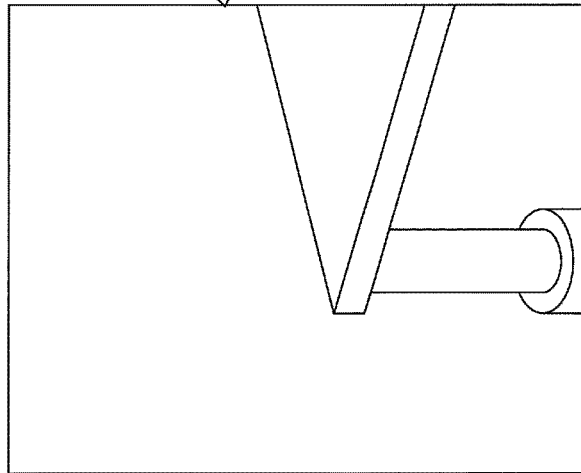

File Name: RIMG0100.JPG
Exif: Exif
▶Main Information
  Title:
  Manufacturer: XXXX
  Model: xxxx R4
  Image Orientation: Upper Left
  Width Resolution: 72/1
  Height Resolution: 72/1
  Resolution Unit: Inch
  Update Date/Time: 2011:05:30 16:01:09
  Copyright: (C)by xxxx R4 User
  Exif Information Offset: 312
  Print[M]FD: 256 Bytes
▶Sub Information
  ExposureTime: 1/36 sec
  Lens F-Number: F3.3
  Exposure Program: Program AE
  ISO Sensitivity: 148
  Exif Version: 0221
  Original Photo Date/Time: 2011:05:30 16:01:09
  Digitized Date/Time: 2011:05:30 16:01:09
  Aperture Value: F3.2
  Brightness Value: EV1.5
  Exposure Bias Value: EV0.0
  Maximum Aperture Value: F3.1
  Metering Mode: Multi-Zone Metering
  Focal Length: 4.60(mm)
  Image Width: 2816
  Image Height: 2112
  Sharpness: Normal
▶Manufacturer Specific Information
  Data Format : Rdc
  Firmware: Rev0106
  XXXX Camera Info IFD: Offset: 968(490 byte)

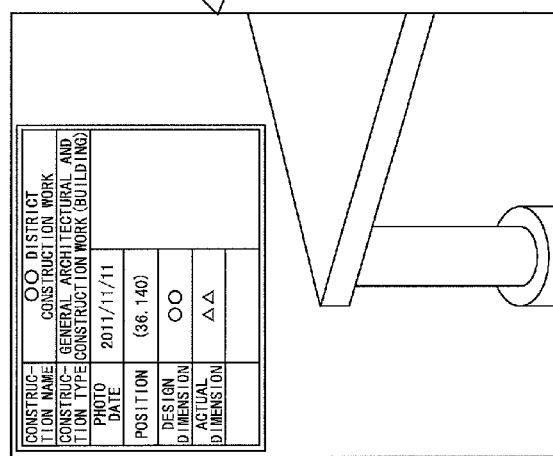

File Name: RIMG0100.JPG
▼Exif: Exif
▼Main Information
  Title:
  Manufacturer: XXXX
  Model: xxxx R4
  Image Orientation: Upper Left
  Width Resolution: 72/1
  Height Resolution: 72/1
  Resolution Unit: Inch
  Update Date/Time: 2011:05:30 16:01:09
  Copyright: (C)by xxxx R4 User
  Exif Information Offset: 312
  Print|M|FD: 256 Bytes
▼Sub Information
  ExposureTime: 1/36 sec
  Lens F-Number: F3.3
  Exposure Program: Program AE
  ISO Sensitivity: 148
  Exif Version: 0221
  Original Photo Data/Time: 2011:05:30 16:01:09
  Digitized Date/Time: 2011:05:30 16:01:09
  Aperture Value: F3.2
  Brightness Value: EV1.5
  Exposure Bias Value: EV0.0
  Maximum Aperture Value: F3.1
  Metering Mode: Multi-Zone Metering
  Focal Length: 4.60(mm)
  Image Width: 2816
  Image Height: 2112
  Sharpness: Normal
▼Manufacturer Specific Information
  Data Format : Rdc
  Firmware: Rev0106
  XXXX Camera Info IFD: Offset: 968(490 byte)

} DIGITAL CAMERA SPECIFIC DATA

| CONSTRUCTION NAME | ○○ DISTRICT CONSTRUCTION WORK |
|---|---|
| CONSTRUCTION TYPE | GENERAL ARCHITECTURAL AND CONSTRUCTION WORK (BUILDING) |
| PHOTO DATE | 2011/11/11 |
| POSITION | (36. 140) |
| DESIGN DIMENSION | ○○ |
| ACTUAL DIMENSION | △△ | ixAb3EDFagMmKsQLo+chf==

} DATA ENTERED IN PREDETERMINED FIELDS OF VIRTUAL BLACKBOARD IMAGE

} VERIFICATION INFORMATION

APPLICATION PROGRAM, SMART DEVICE, INFORMATION PROCESSING APPARATUS, INFORMATION PROCESSING SYSTEM, AND INFORMATION PROCESSING METHOD

BACKGROUND OF THE INVENTION

1. Field of the Invention

The present invention relates to an application program, a smart device, an information processing apparatus, an information processing system, and an information processing method.

2. Description of the Related Art

Taking photos of construction sites for maintaining photographic evidence are one of the conventionally required administrative operations conducted at construction sites such as building construction sites and civil engineering sites, for example. Particularly, in the case of public construction projects commissioned by the national (or local) government, construction reports including detailed accounts of construction work operations have to be submitted, and photos of the construction site capturing each stage of the construction work operations are used (attached). Even with respect to construction projects commissioned by the private sector, construction reports similar to those prepared for public sector construction projects are typically created. Thus, photo documentation of construction sites is conducted at almost all constructions sites.

To take a photo of a construction site, an operator (construction worker) may have to bring an image capturing device such as a digital camera to the construction site, and may also have to prepare a blackboard to be photographed along with the construction site. The blackboard may have items such as "construction name", "construction location", and "operator" inscribed therein with a chalk or a pen, for example. In this way, the construction site being photographed (imaging object) may be identified. Also, in some cases, items such as "measurement point" and "actual dimension" as measurement data obtained at the site may be written on the blackboard, for example. Once the blackboard is prepared, one operator may stand with his back facing the construction site (imaging object) and hold the blackboard in his hand, for example. Another operator may then use the digital camera to photograph the construction site including the blackboard.

In most cases, construction work involves a plurality of construction work stages such as foundation (substructure) work and main structure construction work, for example. Note that after the main structure construction work is started, the foundation portion would no longer be visible, and as such, site photos need to be taken during the foundation work stage, for example. Also, photos need to be taken during the various phases of the foundation work and the main structure construction work stages. For example, when a relatively large building is constructed, over several thousands of site photos may be taken.

Site photos taken at the construction site in this manner may be stored in the digital camera and may be brought back to an office where editing for construction report preparation is performed. For example, the site photos may be downloaded into a personal computer (PC), and an operator may organize the site photos by checking information relating to the site photos that is written on the blackboard photographed along with the construction site. Also, the operator may include the information written on the blackboard in the construction report, and attach the site photos to the construction report, for example.

Examples of techniques for creating construction reports include a construction album creation support system for facilitating the creation of a construction album (construction report) detailing construction results that is to be submitted to a project owner of a civil engineering work project or some other construction project (see e.g. Japanese Laid-Open Patent Publication No. 2000-287164).

In the case of public construction projects, for example, a construction report has to be submitted to a national (or local) government agency to be inspected for tampering. Specifically, the construction report is inspected to confirm whether site photos and information written on the blackboard have been tampered with.

Because site photos and information written on the blackboard provide detailed accounts of construction work operations, there is a demand for high accuracy in detecting cases of tampering.

SUMMARY OF THE INVENTION

An aspect of the present invention is directed to improving accuracy in detecting tampering of construction reports that provide detailed accounts of construction work.

According to one embodiment of the present invention, a smart device is provided that includes a storage device, an imaging unit configured to capture a photo image, an input unit configured to input data to a predetermined field of a virtual display panel image, an image editing unit configured to create a virtual display panel-added photo image by superimposing the virtual display panel image having the data input to the predetermined field by the input unit on the photo image captured by the imaging unit, a first verification information generating unit configured to generate first verification information with respect to the virtual display panel-added photo image based on at least the photo image of the virtual display panel-added photo image, and a verification information storage unit configured to create a verification information/virtual display panel-added photo image that stores the first verification information and the data input to the predetermined field as metadata of the verification information/virtual display panel-added photo image.

BRIEF DESCRIPTION OF THE DRAWINGS

FIG. 9 illustrates an example of screen B2-1 according to an embodiment of the present invention;

FIG. 16 illustrates an exemplary Exif data format;

FIG. 21 illustrates an exemplary configuration of favorites storage management information according to an embodiment of the present invention;

FIG. 23 illustrates an example of virtual blackboard-added photo storage management information according to an embodiment of the present invention;

FIG. 28 illustrates an example of EXIF data according to a comparison example;

FIG. 29 illustrates an example of EXIF data of the output JPEG image according to an embodiment of the present invention;

FIG. 32 illustrates a process for determining whether a virtual blackboard-added photo has been tampered with;

DESCRIPTION OF THE PREFERRED EMBODIMENTS

Figure 1:
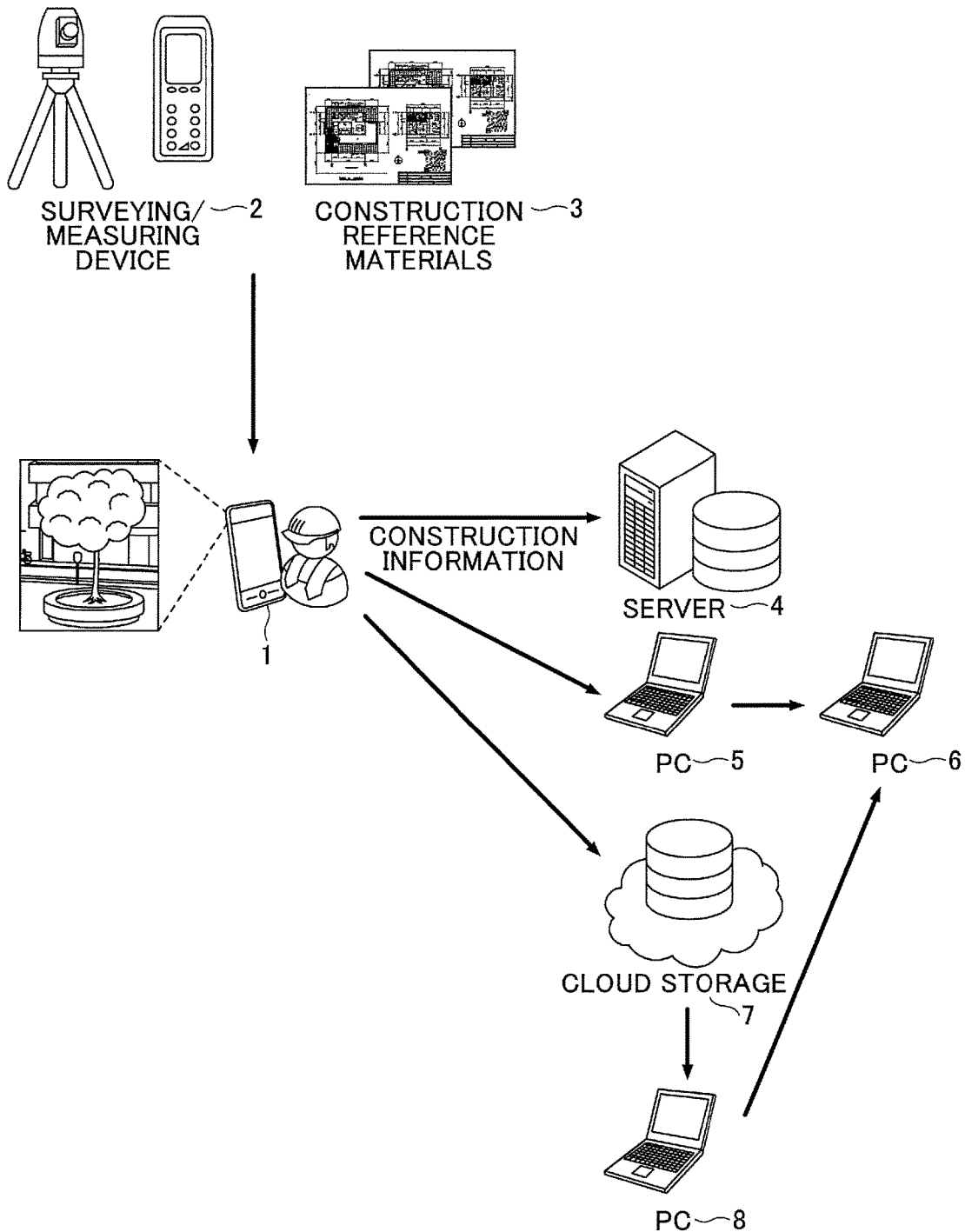
FIG. 1 illustrates an overall configuration of a system according to an embodiment of the present invention.

In the following, embodiments of the present invention are described with reference to the accompanying drawings. Note, however, that the embodiments described below are merely illustrative examples, and the present invention is by no way limited to these embodiments. Also, in the drawings, elements having substantially the same features and/or functions are given the same reference numerals and overlapping descriptions thereof may be omitted.

Portable information terminals such as mobile phones and personal digital assistants (PDAs) are being widely used these days, and such portable information terminals enable users to easily access the Internet and use email and other services, for example. Further, mobile phones have evolved into so-called smart devices such as smartphones and tablet terminals, and markets for such smart devices are expanding at an astonishing rate.

Typical features of the smart device include advanced processing performance and features enabling terminal operations simply through touching a screen, for example. While traditional portable information terminals are operated using built-in hard keys, there are some smart devices that do not have any hard keys and can be operated entirely through touch operations via a screen and soft key operations, for example. Such operational characteristics of smart devices are being utilized in taking site photos of construction sites, for example.

[System Configuration]

(Overall Configuration)

FIG. 1 illustrates an overall configuration of a system according to an embodiment of the present invention. In the system according to the present embodiment, a smart device 1 is used as a device for taking site photos of a construction site. The smart device 1 may be implemented by a smart phone or a tablet, for example. A worker at the construction site may use a camera function of the smart device 1 to capture a photo image of the construction site corresponding to an imaging object. Although an image of a blackboard indicating relevant information typically needs to be captured in the site photo, in the present embodiment, such a blackboard (physical blackboard) as described above is not used. Instead, an application program installed in the smart device 1 inserts a virtual electronic blackboard (hereinafter referred to as "virtual blackboard") into the site photo captured by the camera of the smart device 1.

Note that the term "blackboard" generally refers to a panel or a piece of board painted with black or green paint. However, in the present descriptions, the term "blackboard" is used in a broader sense to include not only boards painted black or green but also whiteboards and other panels for writing and displaying information such as characters and figures. That is, the term "blackboard" may be used to refer to some form of a display panel for displaying information such as characters and figures. Further, in the present descriptions, the term "virtual blackboard" may be used synonymously with the term "virtual display panel".

A surveying/measuring device 2 and construction reference materials 3 may provide information to the smart device 1 on the spot at the construction site. For example, in the case of inputting measurement data obtained on the spot such as "measurement point" and "actual dimension" to the virtual blackboard, a worker may obtain the measurement data using the surveying/measuring device 2 and transmit the obtained measurement data from the surveying/measuring device 2 to the smart device 1 through data communication using BlueTooth (registered trademark), for example. Also, in the case of inputting general items of construction information such as "construction name", "construction location" and "operator" to the virtual blackboard, the worker may capture an image of the construction reference materials 3 using the camera function of the smart device 1, and convert the construction information included in the captured image into text, or use a variety of code information such as a barcode or a QR code (registered trademark) to input the construction information to the virtual blackboard. In this way, the construction information may be reflected in the virtual blackboard.

A server 4 may be installed at an office or a data center, for example. The server 4 is a management server used for construction information management. For example, the server 4 may transmit (input) construction information to the smart device 1 via a wireless local area network (LAN) such as WiFi (registered trademark), a telephone network/IP network (such as 3G) or some other data communication scheme, and the smart device 1 may upload site photos and the like to the server 4 using the same data communication scheme. Note that if the construction site is located in a mountainous region or the like where connection is restricted, for example, the smart device 1 may not be able to communicate with the server 4. In such case, the construction information may be input to the server 4 beforehand, and site photos stored in the smart device 1 may be uploaded later, for example.

A PC 5 is used as a terminal for creating a construction report. In preparing a construction report, an operator acquires construction information and uploaded site photos from the server 4. Also, the PC 5 may acquire site photos from a digital camera via a USB or a recording medium, for example. The PC 5 may transmit a construction report to a delivery destination such as a PC 6, for example, via a wireless LAN such as WiFi, a telephone network/IP network, or some other data communication scheme.

The PC 6 is a terminal provided at a delivery destination such as a national or local government agency where the construction report is inspected. The PC 6 receives the construction report transmitted from the PC 5, for example. The PC 6 inspects the construction report to confirm whether the site photos attached to the construction report have been tampered with.

A cloud storage 7 is a storage device for storing site photos that is provided on a network such as the Internet. For example, the smart device 1 may upload site photos to the cloud storage 7 via a wireless LAN such as WiFi, a telephone network/IP network such as 3G, or some other data communication scheme. Because a storage area of the smart device 1 for storing site photos has a limited capacity, the cloud storage 7 may be used as an alternative storage area for storing the site photos, for example.

Also, the site photos that have been stored in the cloud storage 7 may be subsequently utilized in a variety of ways. For example, in creating a construction report, the PC 5 may acquire construction information and site photo that have been uploaded from the cloud storage 7. Further, the construction report created by PC 5 may be uploaded to the cloud storage 7. In addition, by having the cloud storage 7 cooperate with a print service such as a cloud printing service, a site photo stored in the cloud storage 7 may be arbitrarily selected and printed, for example. That is, while site photos taken by the smart device 1 are typically organized by the PC 5 and then printed, by storing the site photos in the cloud storage 7, a site photo can be printed directly from the smart device 1.

A PC 8 is used as a terminal for acquiring a construction report from the cloud storage 7. For example, the PC 8 may transmit a construction report acquired from the cloud storage 7 to a delivery destination such as the PC 6 via a wireless LAN such as WiFi, a telephone network/IP network such as 3G, or some other data communication scheme. When transmitting the construction report to the delivery destination such as the PC 6, the PC 8 may be able to confirm whether the site photos attached to the construction report have been tampered with. In this way, a construction report may be transmitted to a delivery destination such as the PC 6 from a terminal other than the terminal that has created the construction report. That is, a construction report may be transmitted to a delivery destination such as the PC via a plurality of terminals.

(Smart Device Hardware)

Figure 2:
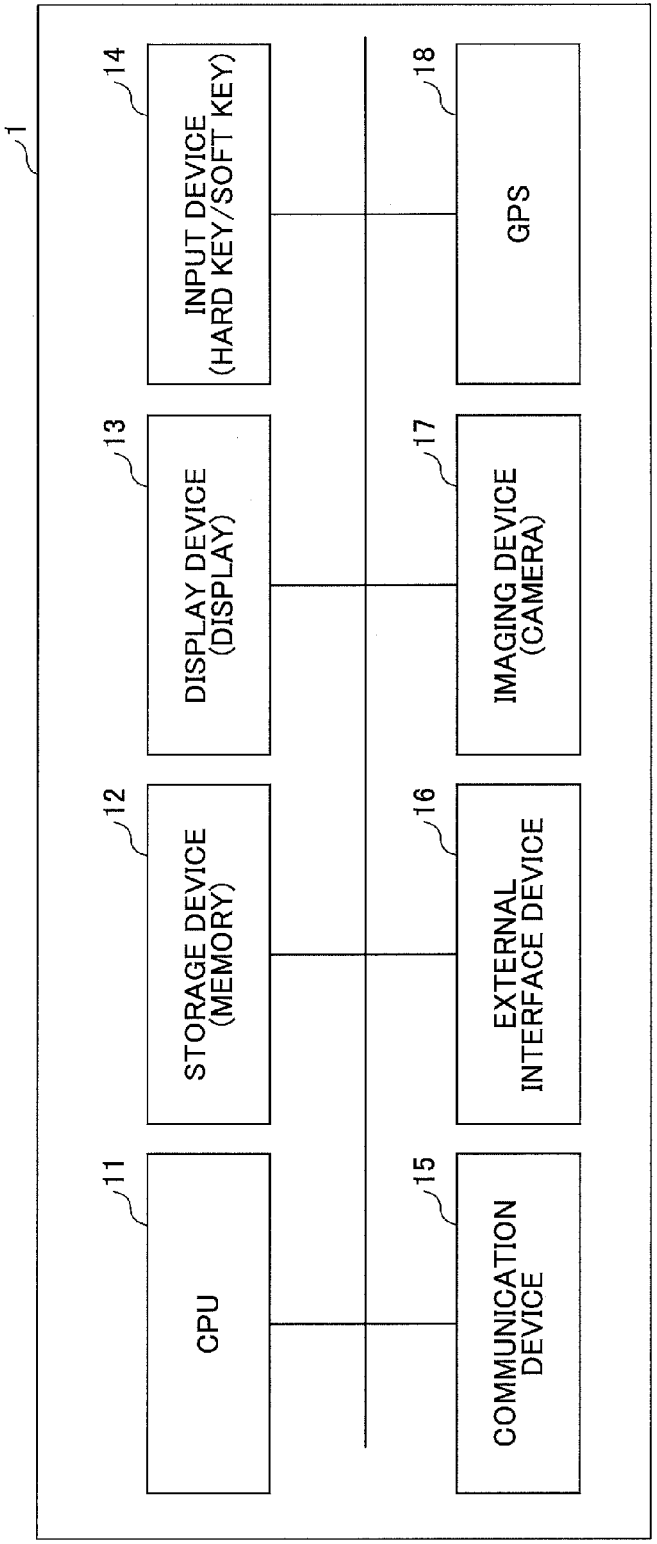
FIG. 2 illustrates a hardware configuration of a smart device according to an embodiment of the present invention.

In the following, a hardware configuration of the smart device 1 according to an embodiment of the present invention is described. FIG. 2 illustrates an exemplary hardware configuration of the smart device 1 according to the present embodiment. In FIG. 2, the smart device 1 includes a CPU (Central Processing Unit) 11, a storage device 12, a display device 13, an input device 14, a communication device 15, an external interface device 16, an imaging device 17, and a GPS 18.

The CPU 11 is implemented by a microprocessor and peripheral circuitry and is configured to control the overall operations of the smart device 1. The CPU 11 executes various processes by running a smart device operating system (OS) and various application programs.

The storage device 12 is a memory that stores the smart device OS, various application programs, and other various data. The storage device 12 may include a RAM (Random Access Memory) that is used as a working area by the CPU 11 upon performing various controls by executing various programs, a nonvolatile memory such as a ROM (Read Only Memory) for storing predetermined control programs, and a HDD (Hard Disk Drive) for storing a relatively large amount of data. In the present embodiment, it is assumed that a smart device application program (e.g., "construction site blackboard app") is installed in the storage device 12 of the smart device 1.

The display device 13 includes a display for displaying various forms of data on a display screen. The input device 14 enables a user to perform various input operations. The input device 14 of the smart device 1 according to the present embodiment includes hard keys and a touch panel switch that is overlaid on the display screen of the display device 13. In this way, soft keys may be implemented by controlling the touch panel switch via an input program of the smart device OS. That is, the smart device 1 of the present embodiment may be operated entirely through touch operations and soft key operations of a screen.

The communication device 15 is a device for establishing communication with another device. The communication device 15 supports communications using various types of networks including wired networks and wireless networks. For example, the smart device 1 according to the present embodiment may support communications via a wireless LAN such as WiFi, a telephone network/IP network such as 3G, Bluetooth (registered trademark), and infrared communication.

The external interface device 16 is an interface for connecting an external recording medium to the smart device 1 such that data may be read from or written on the recording medium. For example, a memory card such as a USB memory or an SD card may be loaded into the external interface device 16 to output information or acquire information from the exterior.

The imaging device 17 may be a digital camera included in the smart device 1. The imaging device 17 includes an imaging lens for capturing an image (photo image). The captured image (photo) is imported into the smart device 1 as image data (photo data). Note that when various code information such as a bar code or a QR code (registered trademark) included in the construction reference materials 3 is captured by the imaging device 17, text data included in the code may be read using a predetermined application, for example.

The GPS 18 is a GPS receiver that receives current position information on the Earth from global positioning system (GPS) satellites. That is, the GPS 18 acquires current position information (position coordinates) of the smart device 1 from the GPS satellites.

(Smart Device Functions)

Figure 3:
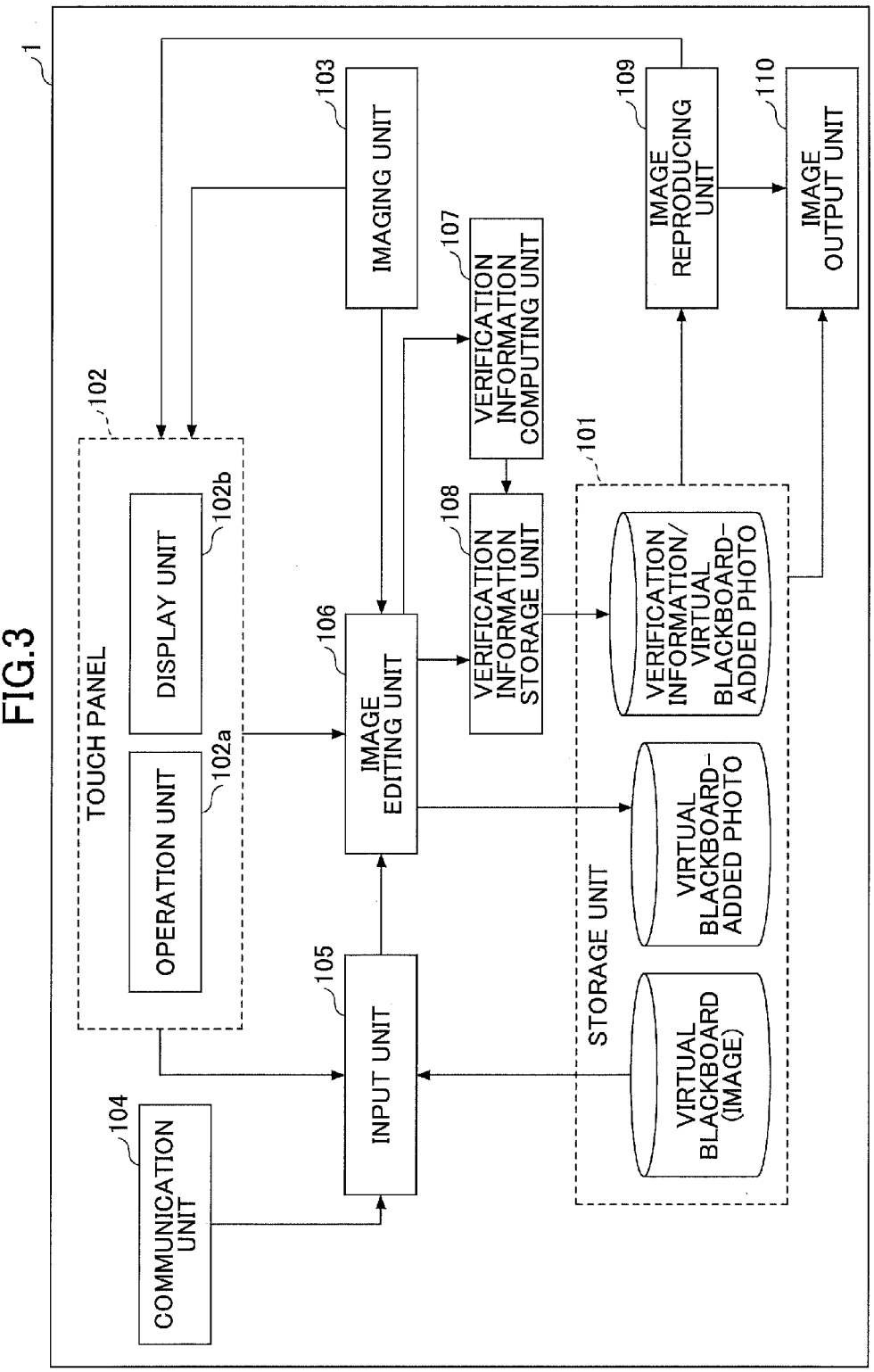
FIG. 3 illustrates an exemplary functional configuration of the smart device according to an embodiment of the present invention.

In the following, a functional configuration of the smart device 1 according to an embodiment of the present invention is described. FIG. 3 illustrates an exemplary functional configuration of the smart device 1 according to the present embodiment. In FIG. 3, the smart device 1 includes a storage unit 101, a touch panel 102, an imaging unit 103, a communication unit 104, an input unit 105, an image editing unit 106, a verification information computing unit (first verification information generating unit) 107, a verification information storage unit 108, an image reproducing unit 109, and an image output unit 110.

The storage unit 101 may be implemented by the storage device 12 of FIG. 2, for example. The storage unit 101 stores a virtual blackboard image having predetermined fields (blank fields) in advance. Also, when a photo image (e.g. site photo) having a virtual blackboard image added thereon (hereinafter referred to as "virtual blackboard-added photo") is created, the storage unit 101 stores the virtual blackboard-added photo. Specifically, to store the virtual blackboard-added photo, the storage unit 101 stores the photo image, the virtual blackboard image that is stored in advance as a template, position information of the virtual blackboard image on the photo image, size information of the virtual blackboard image on the photo image, and data input to the predetermined fields of the virtual blackboard image in association with each other.

Also, when verification information is computed (generated) based on the virtual blackboard-added photo and Exif (Exchangeable Image File Format) metadata that is automatically created upon storing the virtual blackboard-added photo as a JPEG file, for example, and the verification information is stored (embedded) in the virtual blackboard-added photo to create a verification information/virtual blackboard-added photo, the storage unit 101 stores the verification information/virtual blackboard-added photo. The verification information is used for verifying whether the virtual blackboard-added photo and/or the metadata have been tampered with.

The touch panel 102 is a touch panel display including an operation unit 102a that may be implemented by the input device 14, and a display unit 102b that may be implemented by the display device 13 of FIG. 2, for example. By including such a touch panel display in addition to hard keys, the smart device 1 according to the present embodiment may be operated entirely through touch operations and soft key operations from a screen.

The imaging unit 103 may be implemented by the imaging device 17 such as a digital camera included in the smart device 1. A captured image (photo) is imported into the smart device 1 as image data (photo data). Note that when a variety of code information such as a barcode or a QR code (registered trademark) included in the construction reference materials 3 is captured by the imaging unit 103, text data included in the code may be read using a predetermined application, for example.

The communication unit 104 may be implemented by the communication device 15, for example, and is configured to establish communication with other devices. For example, the smart device 1 according to the present embodiment may support communications using a wireless LAN such as WiFi, a telephone network/IP network such as 3G, Bluetooth (registered trademark), and infrared communication, and establish communication with devices such as the surveying/measuring device 2, the server 4, and the PC 5.

The input unit 105 inputs relevant data relating to a construction site to the predetermined fields of the virtual blackboard image (template) stored in the storage unit 101. In this way, relevant data relating to the construction site may be input to the blank fields of the virtual blackboard image. Note that although the specific items of data that are input may vary depending on the fields included in the virtual blackboard image, for example, measurement data (e.g. "measurement point" and "actual dimension") obtained by the surveying/measuring device 2 and other general construction information (e.g. "construction name", "construction location", and "operator") managed by the server 4 or by various code information may be input. Note that the data may be input by the user operating soft keys from the touch panel 102, or via the communication unit 104, for example.

The image editing unit 106 creates a virtual blackboard-added photo (e.g. virtual blackboard-added site photo) by superimposing the virtual blackboard image having relevant data input by the input unit 105 on a photo image captured by the imaging unit 103. The created virtual blackboard-added photo is stored in the storage unit 101. Further, the image editing unit 106, converts the virtual blackboard-added photo into a JPEG file, and inputs the JPEG file to the verification information computing unit 107 and the verification information storage unit 108.

The verification information computing unit 107 generates verification information for the virtual blackboard-added photo based on at least the photo image of the virtual blackboard-added photo in the JPEG file format input by the image editing unit 106. For example, the verification information computing unit 107 may acquire from the virtual blackboard-added photo in the JPEG file format, the Exif metadata that has been automatically generated when the JPEG file was created. Then, the verification information computing unit 107 may compute the verification information based on the virtual blackboard-added photo and the Exif metadata, and input the generated verification information to the verification information storage unit 108.

The verification information storage unit 108 stores the verification information input by the verification information computing unit 107 and the data input to the virtual blackboard by the input unit 105 (virtual blackboard information) in the virtual blackboard-added photo in the JPEG file format input by the image editing unit 106. In this way, the verification information storage unit 108 creates a verification information/virtual blackboard-added photo (e.g.

verification information/virtual blackboard-added site photo). The created verification information/virtual blackboard-added photo is stored in the storage unit 101.

The image reproducing unit 109 reproduces the virtual blackboard-added photo stored in the storage unit 101 and displays the reproduced image at the display device 13. When reproducing the virtual blackboard-added photo, the image reproducing unit 109 acquires the virtual blackboard image associated with the photo image from the storage unit 101, inputs relevant data in the predetermined fields of the virtual blackboard image, and superimposes the virtual blackboard image having the relevant data input to its fields on the photo image at a corresponding position and in a corresponding size based on the position information and the size information of the virtual blackboard image.

The image output unit 110 outputs a JPEG file corresponding to the virtual blackboard-added photo stored in the storage unit 101 and reproduced by the image reproducing unit 109 as image data. Specifically, the image output unit 110 generates the JPEG file of the virtual blackboard-added photo corresponding to a composite image of the virtual blackboard image having relevant data input to its fields being arranged on the photo image, and outputs the generated JPEG file. Further, the image output unit 110 outputs the verification information/virtual blackboard-added photo stored in the storage unit 101.

Note that the above functional features may be implemented by the CPU 11 of the smart device 1 running and executing a smart device OS and relevant smart device application programs (e.g. "construction site blackboard app"), for example.

(PC Hardware)

Figure 4:
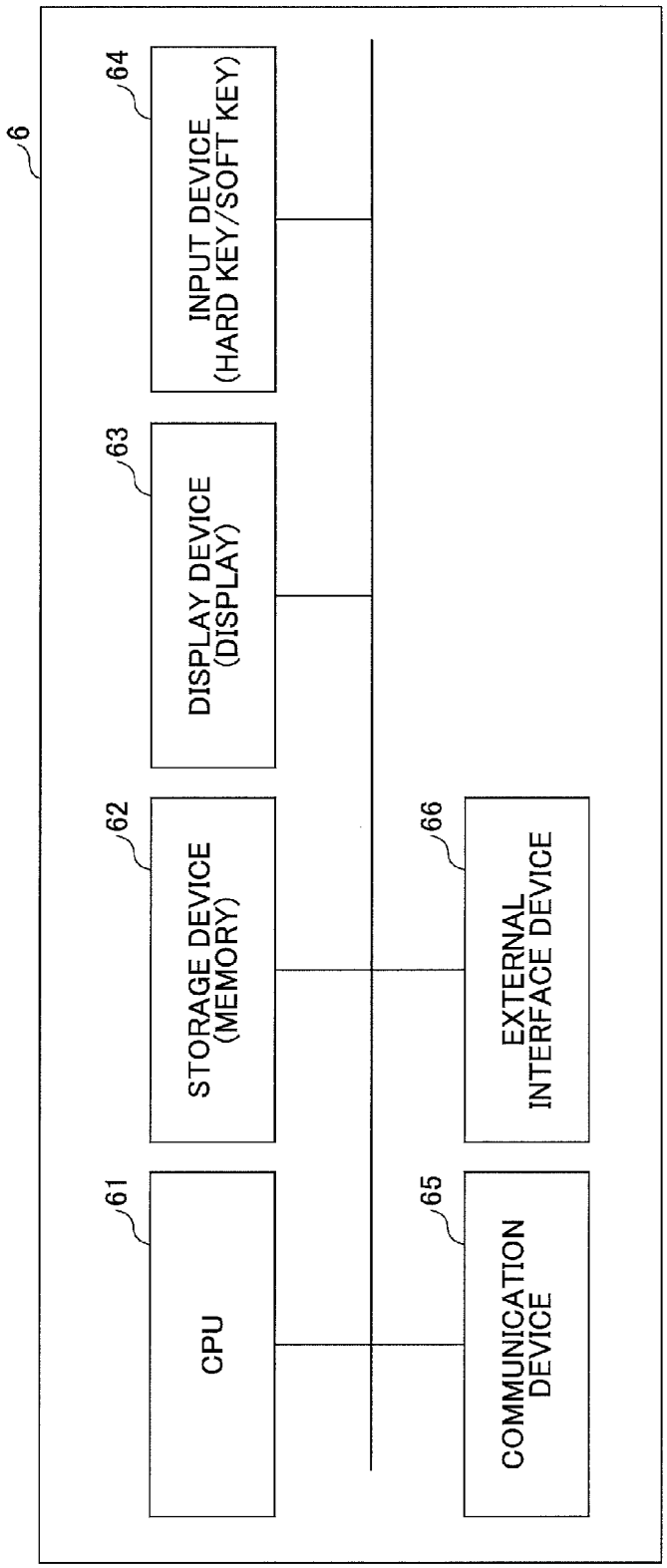
FIG. 4 illustrates a hardware configuration of a personal computer according to an embodiment of the present invention.

In the following, a hardware configuration of the PC 6 according to an embodiment of the present invention is described. FIG. 4 illustrates an exemplary hardware configuration of the PC 6 according to the present embodiment. In FIG. 4, the PC 6 includes a CPU 61, a storage device 62, a display device 63, an input device 64, a communication device 65, and an external interface device 66.

The CPU 61 includes a microprocessor and peripheral circuitry and is configured to control overall operations of the PC 6. The CPU 61 executes the processes based an OS for the PC 6 and various application programs.

The storage device 62 is a memory for storing the OS for the PC 6, various application programs, and other various data. The storage device 62 may include a RAM that is used as a working area by the CPU 61 upon running various programs and performing various control operations, a non-volatile ROM that stores predetermined control programs, and a HDD that stores a relatively large amount of data, for example. In the present embodiment, it is assumed that an application program for the PC 6 (e.g. "construction site blackboard app") is installed in the storage device 62 in advance.

The display device 63 includes a display for displaying various data on a display screen. The input device 64 is a device for enabling the user to perform various input operations. In the PC 6 according to the present embodiment, the input device 64 includes hard keys and a touch panel switch that is overlaid on a display screen of the display device 63. In this way, the touch panel switch may be controlled by an input program of the OS to implement soft keys. That is, the PC 6 according to the present embodiment may be operated entirely through touch operations and soft key operations from the screen.

The communication device 65 is a device for establishing communication with other devices. The communication device 65 supports communications using various types of networks including wired networks and wireless networks. For example, the PC 6 according to the present embodiment may support communications via a wireless LAN such as WiFi, a telephone network/IP network such as 3G, Bluetooth (registered trademark), and infrared communication.

The external interface device 66 is an interface for connecting an external recording medium to the PC 6 such that data may be read from or written on the recording medium. For example, a memory card such as a USB memory or an SD card may be loaded into the external interface device 66 to output information or acquire information from the exterior.

(PC Functions)

Figure 5:
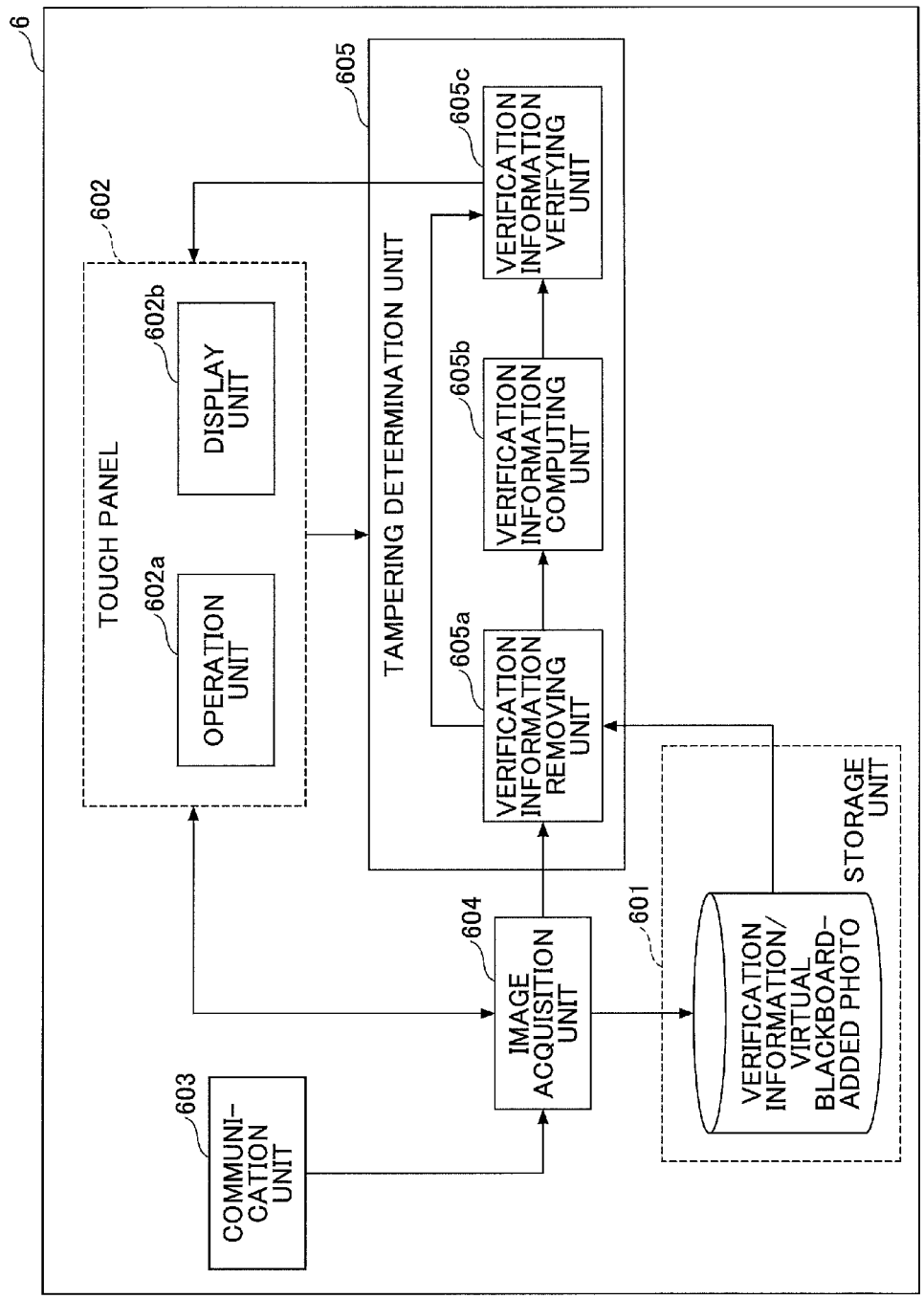
FIG. 5 illustrates an exemplary functional configuration of the personal computer according to an embodiment of the present invention.

In the following, a functional configuration of the PC 6 according to an embodiment of the present invention is described. FIG. 5 illustrates an exemplary functional configuration of the PC 6 according to the present embodiment. In FIG. 5, the PC 6 includes a storage unit 601, a touch panel 602, a communication unit 603, an image acquisition unit 604, and a tampering determination unit 605.

The storage unit 601 may be implemented by the storage device 62, for example, and is configured to store the verification information/virtual blackboard-added photo output by the smart device 1. The verification information/virtual blackboard-added photo corresponds to a JPEG file of a virtual blackboard-added photo having verification information stored (embedded) therein. The verification information may be computed (generated) based on the virtual blackboard-added photo and Exif (Exchangeable Image File Format) metadata that is automatically created upon storing the virtual blackboard-added photo as a JPEG file, and the verification information is used for verifying whether the virtual blackboard-added photo and/or the metadata have been tampered with.

The touch panel 602 is a touch panel display including an operation unit 602a that may be implemented by the input device 64, and a display unit 602b that may be implemented by the display device 63 of FIG. 4, for example. By including such a touch panel display in addition to hard keys, the PC 6 according to the present embodiment may be operated entirely through touch operations and soft key operations from the screen.

The communication unit 603 may be implemented by the communication device 65 of FIG. 4, for example, and is configured to establish communication with other devices. For example, the PC 6 according to the present embodiment may support communications using a wireless LAN such as WiFi, a telephone network/IP network such as 3G, Bluetooth (registered trademark), and infrared communication, and establish communication with various devices such as the server 4, the PC 5, and the PC 8.

The image acquisition unit 604 may be implemented by the CPU 61, for example, and is configured to acquire from the communication unit 603 a verification information/virtual blackboard-added photo transmitted from an external device such as the PC 5 or the PC 8, for example. The image acquisition unit 604 may input the acquired verification information/virtual blackboard-added photo to the storage unit 101, or to the storage unit 601 and the tampering determination unit 605. The user may operate the operation unit 602a to designate whether to input the verification information/virtual blackboard-added photo to the storage unit 601, or to both the storage unit 601 and the tampering determination unit 605. For example, if the user wishes to determine whether the virtual blackboard-added photo has been tampered with immediately after receiving the verification information/virtual blackboard-added photo, the user may have the verification information/virtual blackboard-added photo input to the storage unit 601 and the tampering determination unit 605.

The tampering determination unit 605 may be implemented by the CPU 61, for example, and is configured to determine whether the virtual blackboard-added photo has been tampered with based on the verification information/virtual blackboard-added photo input by the image acquisition unit 604 and display the determination result at the display unit 602b. The tampering determination unit 605 includes a verification information removing unit (verification information acquisition unit and verification information generating image creation unit) 605a, a verification information computing unit (second verification information generating unit) 605b, and a verification information verifying unit 605c that may be implemented based on instructions from the CPU 61 of FIG. 4, for example.

The verification information removing unit 605a is an exemplary embodiment of a verification acquisition unit that acquires first verification information and virtual blackboard information that are stored in the verification information/virtual blackboard-added photo. The verification information removing unit 605a is also an exemplary embodiment of a verification information generating image creation unit that creates a verification information generating image to be used for generating second verification information. The verification information generating image may be created by removing at least the first verification information from the verification information/virtual blackboard-added photo. Note that in the following descriptions, an image used for generating verification information (e.g. second verification information) that is used for determining whether a virtual blackboard-added photo has been tampered with is referred to as "verification information generating image".

For example, the verification information removing unit 605a may acquire and remove the first verification information and the virtual blackboard information from the verification information/virtual blackboard-added photo to create the verification information generating image (corresponding to the virtual blackboard-added photo). Then, the verification information removing unit 605a may input the verification information generating image (virtual blackboard-added photo) to the verification information computing unit 605b, and input the acquired first verification information to the verification information verifying unit 605c. Note that the verification information generating image (virtual blackboard-added photo) input to the verification information computing unit 605b includes metadata such as Exif data that is automatically created upon storing the virtual blackboard-added photo as a JPEG file.

The verification information computing unit 605b computes and generates second verification information based on the verification information generating image that has been created by the verification information removing unit 605a by removing the verification information (first verification information) and the virtual blackboard information from the verification information/virtual blackboard-added photo and input to the verification information computing unit 605b. The verification information computing unit 605b inputs the generated second verification information to the verification information verifying unit 605c.

The verification information verifying unit 605c performs verification by determining whether the second verification information input from the verification information computing unit 605b matches the first verification information input from the verification information removing unit 605a. If the first verification information and the second verification information match, the verification information verifying unit 605c displays a message indicating that the virtual blackboard-added photo has not been tampered with on the display unit 602b. If the first verification information and the second verification information do not match, the verification information verifying unit 605c displays a message indicating that the virtual blackboard-added photo has been tampered with on the display unit 602b.

Note that the above functional features of the PC 6 may be implemented by a computer including the CPU 61 that performs various processes by running and executing an OS and relevant application programs (e.g. "construction site blackboard app").

[Smart Device Operation Screen Transitions]

Figure 6:
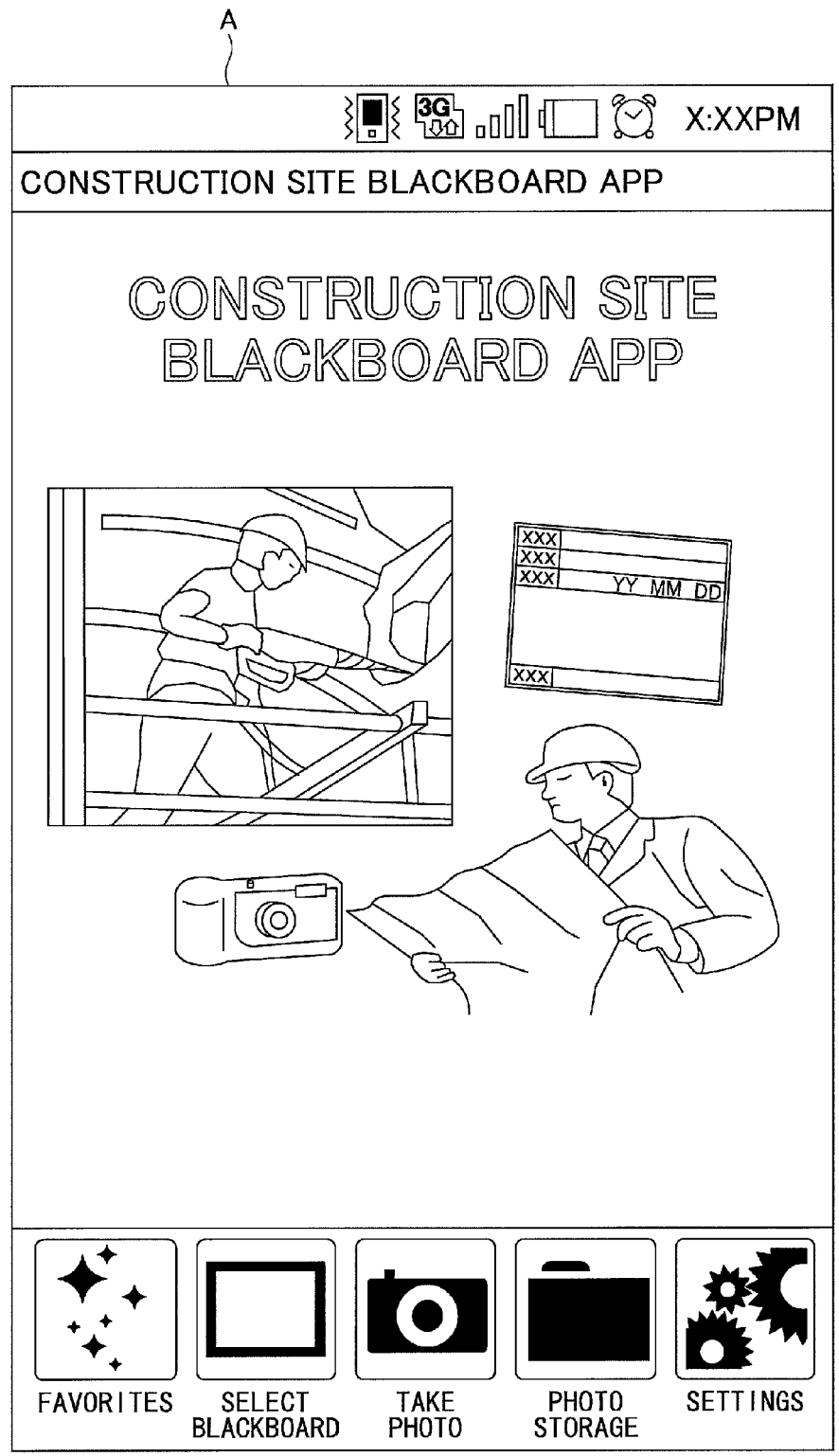
FIG. 6 illustrates an example of a top screen A according to an embodiment of the present invention.

FIG. 6 illustrates an example of a top screen A according to an embodiment of the present invention. The top screen A is a screen that is initially displayed when the user starts a smart device application program (e.g. "construction site blackboard app"). In FIG. 6, the top screen A includes operation buttons indicated as "FAVORITES", "SELECT BLACKBOARD", "TAKE PHOTO", "PHOTO STORAGE", and "SETTINGS".

Figure 7:
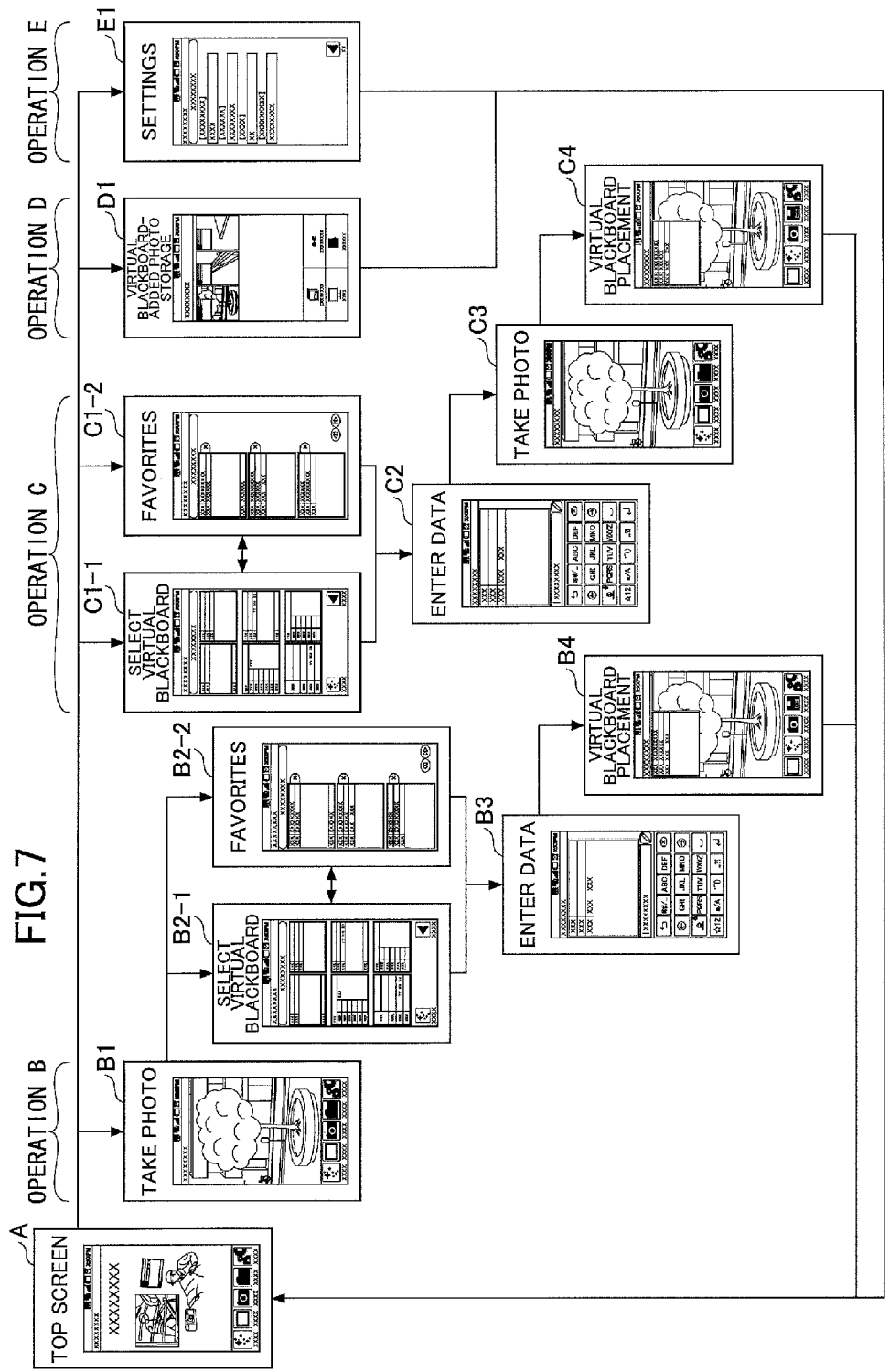
FIG. 7 illustrates exemplary operation screen transitions according to an embodiment of the present invention.

FIG. 7 illustrates exemplary operation screen transitions according to the present embodiment. The top screen A is displayed when the user starts a smart device application program, and when one of the operation buttons of the top screen A is operated by the user, the top screen A may be switched to the following operation screens according to the selected operation button.

"FAVORITES": to screen C1-2
"SELECT BLACKBOARD": to screen C1-1
"TAKE PHOTO": to screen B1
"PHOTO STORAGE": to screen D1
"SETTINGS": to screen E1

Operation B is an operation for creating a site photo. Operation B includes the process steps of taking a site photo, selecting a virtual blackboard, inputting data to predetermined fields of the virtual blackboard, placing the virtual blackboard on the site photo to create a virtual blackboard-added photo, and creating a verification information/virtual blackboard-added photo.

Operation C is also an operation for creating a site photo. In operation C, the same process steps as those of operation B are performed in a different order. That is, in operation C, the process steps of selecting a virtual blackboard and inputting data to the predetermined fields are performed before performing the process steps of taking a site photo and placing the virtual blackboard on the site photo. In this way, a virtual blackboard-added photo and a verification information/virtual blackboard-added photo may be created.

Operation D is an operation for referencing a virtual blackboard-added photo that has been stored, for example. The virtual blackboard-added photo and the verification information/virtual blackboard-added photo that have been created in operation B and operation C are stored. Thus, in operation D, the virtual blackboard-added photo and the verification information/virtual blackboard-added photo that have already been created may be referenced, and a given photo may be arbitrarily selected and output to the server 4, the PC 5, or a recording medium, for example.

Operation E is an operation for setting up various parameter settings. For example, in operation E, an initial color, an initial position, and an initial size of the virtual blackboard initial may be set up.

In the following, the above operations B-E are described in greater detail.

(Operation B)

In operation B, when the "TAKE PHOTO" operation button of the top screen A is operated (e.g. touched), the screen display is switched to screen B1.

Figure 8:
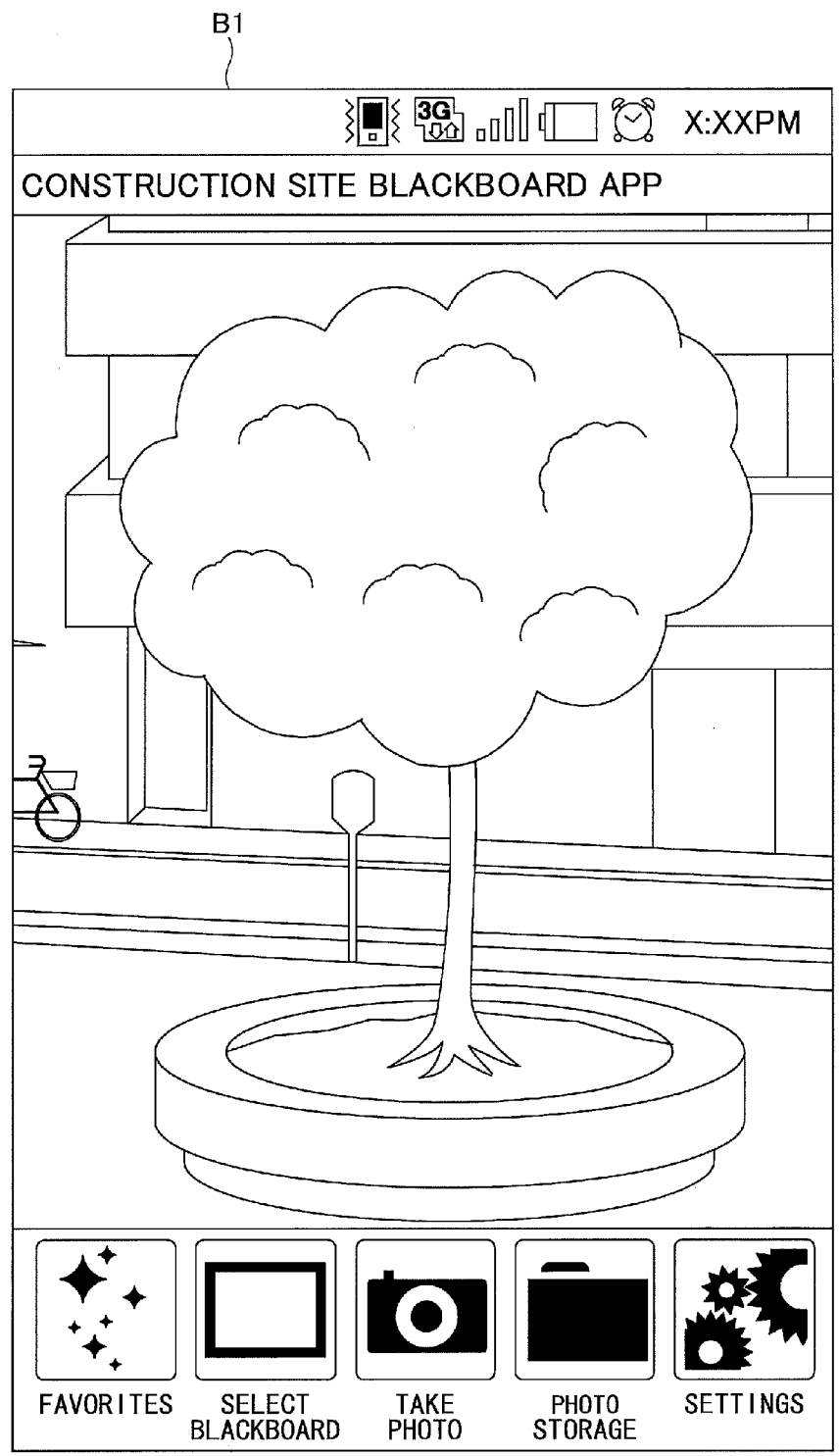
FIG. 8 illustrates an example of screen B1 according to an embodiment of the present invention.

FIG. 8 illustrates an example of screen B1 according to the present embodiment. As illustrated in FIG. 8, in the screen B1, a pre-installed camera app of the smart device 1 is launched and is set to image capture mode. A view of a construction site captured by the imaging unit 103 is reflected on the screen of the smart device 1 (a view of a cylindrical bench in the premises of a building is shown in FIG. 8). The user may perform image capturing operations to capture a photo image of the view.

FIG. 9 illustrates an example of screen B2-1 according to the present embodiment. When a photo image of screen B1 is captured, the screen display is switched to screen B2-1. The screen B2-1 displays a plurality of virtual blackboard template images that are pre-installed, and the user selects a desired virtual blackboard template image to be used by touching the corresponding virtual blackboard template image displayed on the screen B2-1.

Figure 10A:
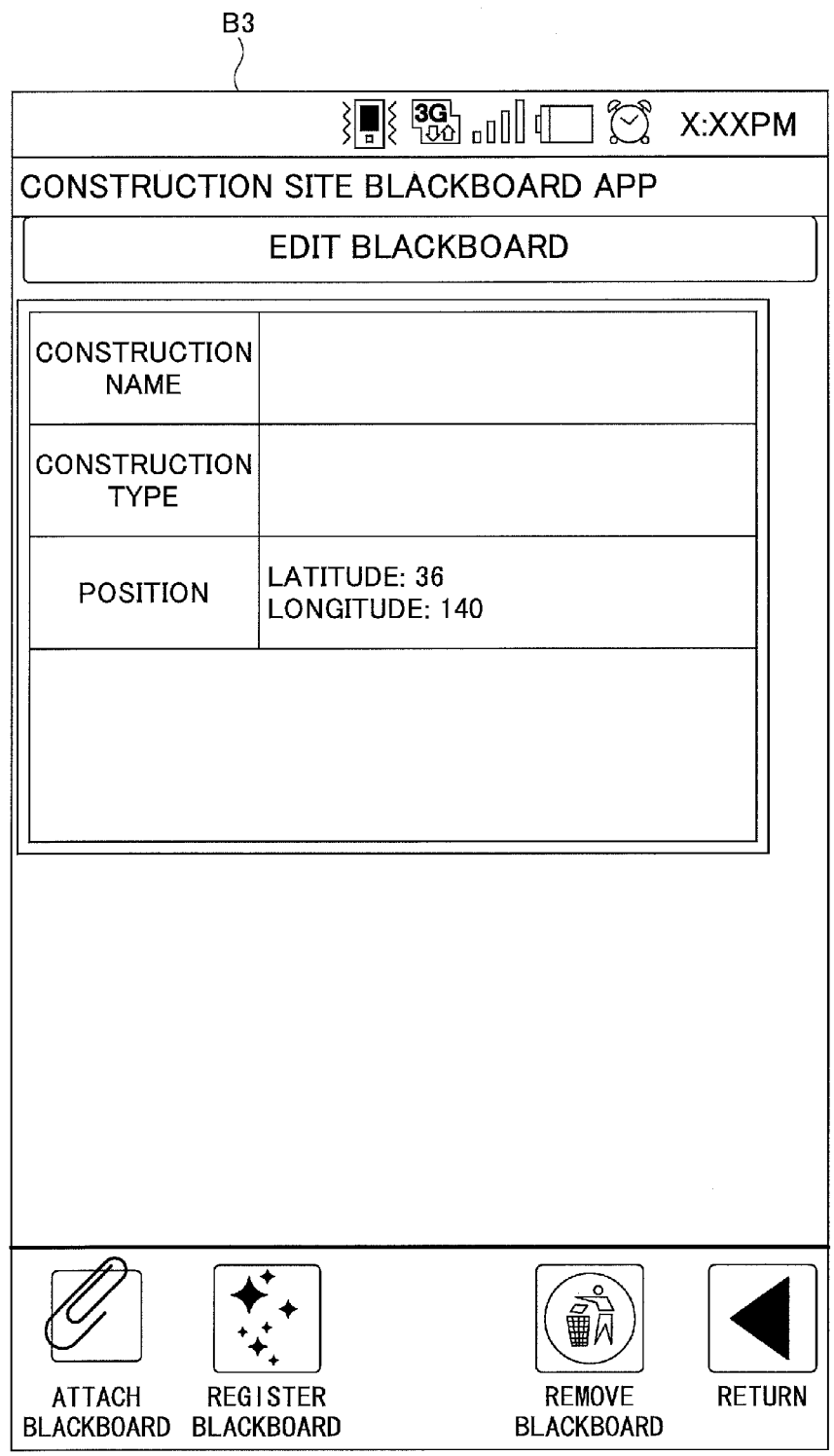
FIGS. 10A-10C illustrate examples of screen B3 according to embodiments of the present invention.
Figure 10B:
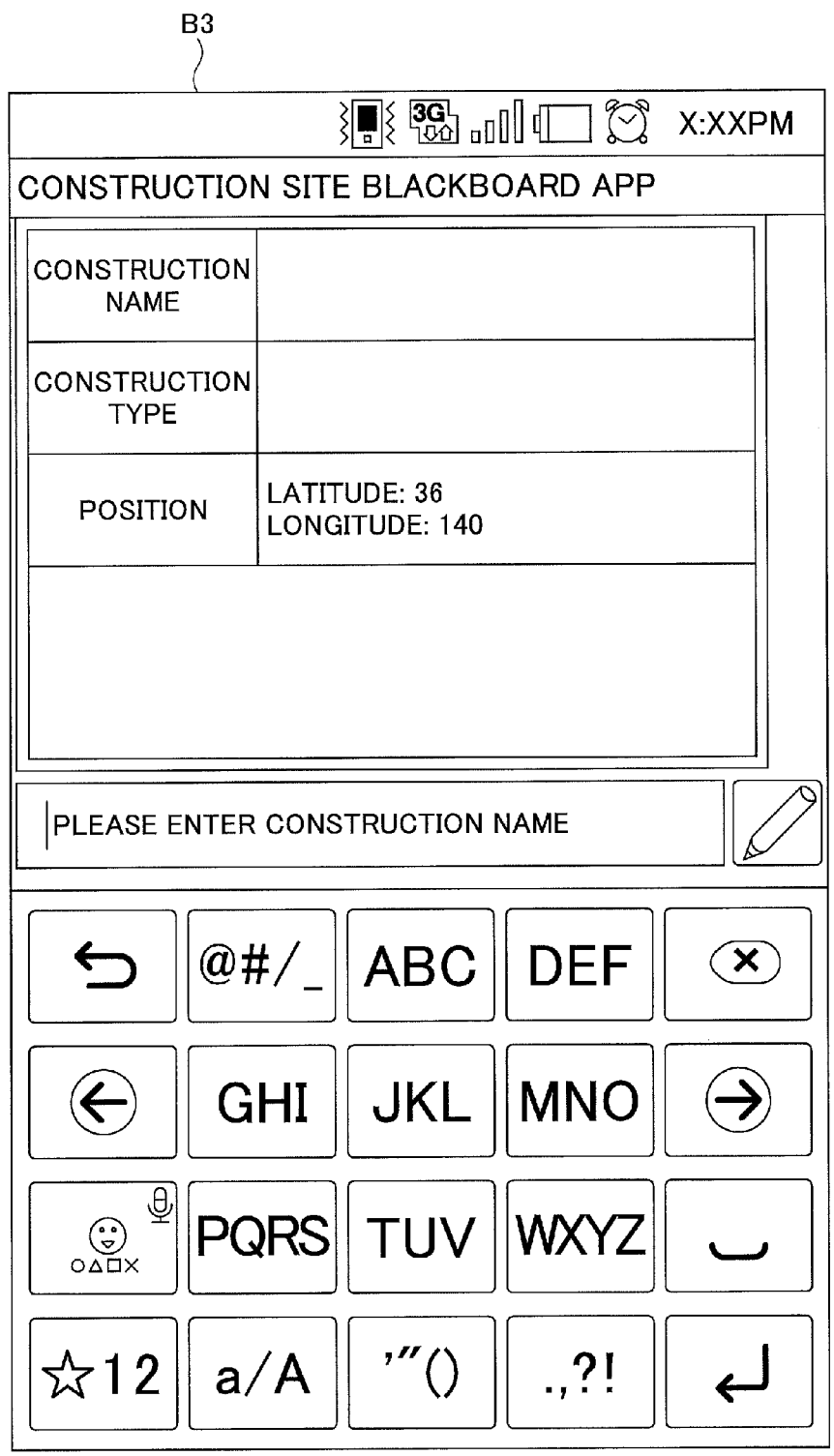
Figure 10C:
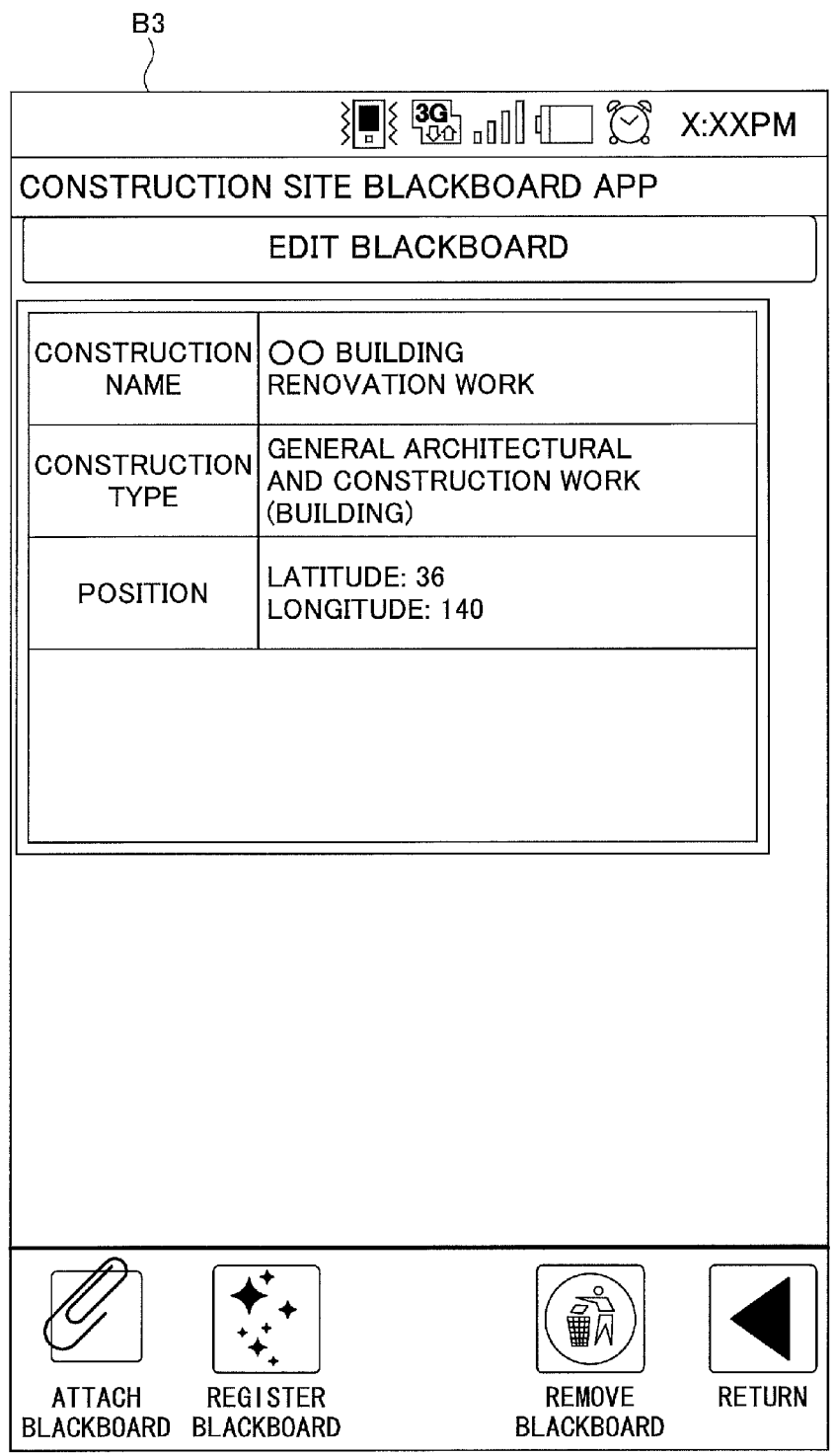

FIGS. 10A-10C illustrate examples of screen B3 according to the present embodiment. The screen B3 of FIG. 10A displays the virtual blackboard selected by the user. The virtual blackboard displayed on the screen B3 of FIG. 10A includes predetermined fields (blank fields) to which management information relating to the captured photo may be input by the input unit 105. Note that in a "POSITION" field of the virtual blackboard, position information (position coordinates) of the current location that has been automatically acquired by the GPS 18 is already input. Also, in some embodiments, specific address information may be automatically input to this field based on the acquired position information, for example.

When a "CONSTRUCTION NAME" field of the blank fields of the virtual blackboard is touched, soft keys may be launched as illustrated in FIG. 10B. Thus, the user may use the soft keys to enter the specific construction name of the construction project performed at the construction site. For example, the user may input the name "◯◯ BUILDING RENOVATION WORK" as the construction name. Also, the user may use the soft keys in a similar manner to input the specific type of construction work in a "CONSTRUCTION TYPE" field of the virtual blackboard. For example, "GENERAL ARCHITECTURAL AND CONSTRUCTION WORK (BUILDING)" may be input to this field.

Note that a construction drawing or some other arbitrary construction information may be input or attached to the free space provided below the "POSITION" field of the virtual blackboard as necessary.

After completing the above input operations, relevant information may be indicated in the predetermined fields of the virtual blackboard as illustrated in screen B3 of FIG. 10C, for example. After the user completes the input operations for inputting construction information, the user may touch an operation button "ATTACH BLACKBOARD" on the screen B3 of FIG. 10C.

Note that by touching an operation button "REGISTER BLACKBOARD" on the screen B3 of FIG. 10C, the virtual blackboard having relevant data input to its fields may be separately stored as a favorite virtual blackboard (e.g. see screens B2-2 and C1-2).

Figure 11:
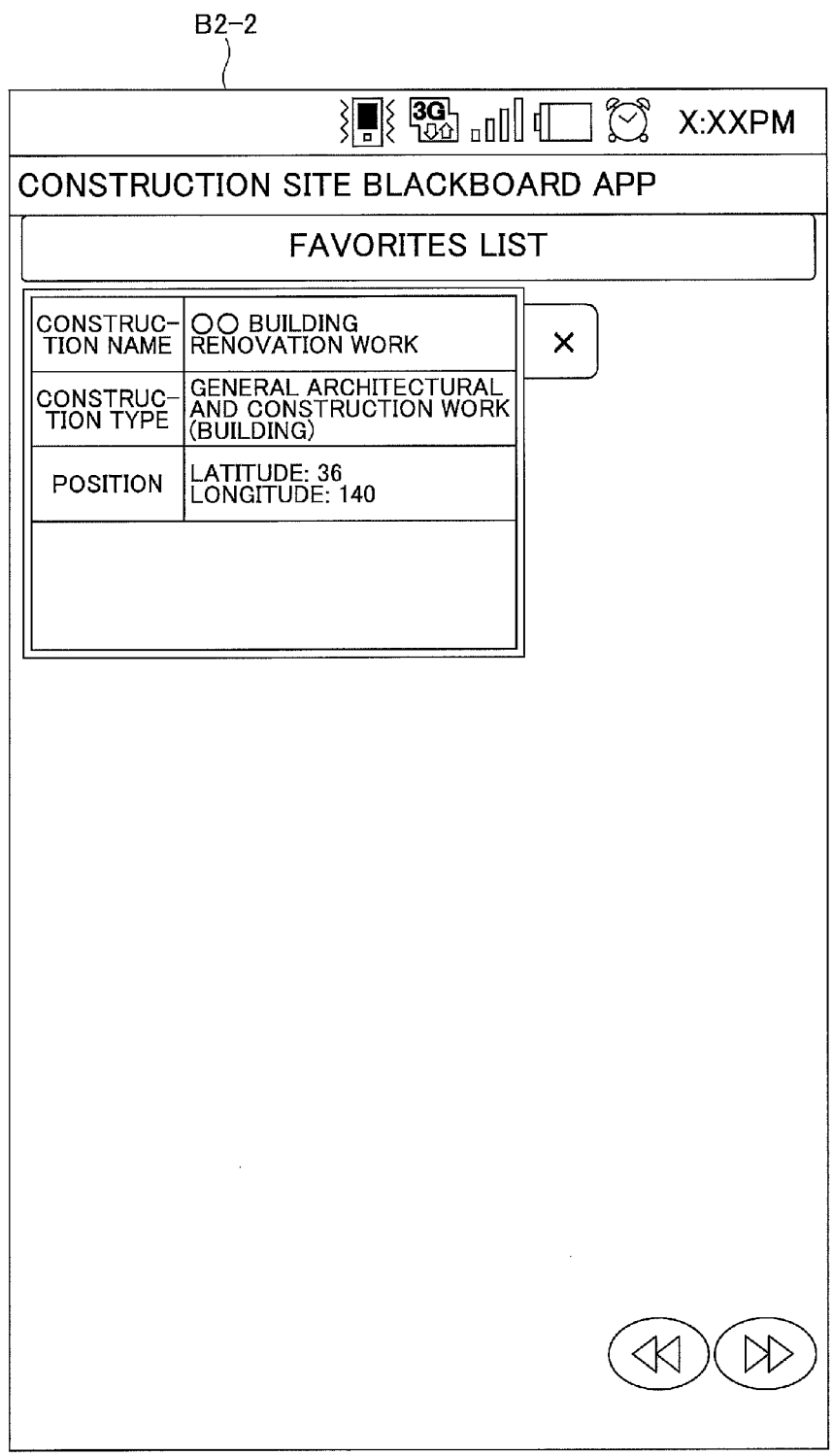
FIG. 11 illustrates an example of screen B2-2 according to an embodiment of the present invention.

FIG. 11 illustrates an example of screen B2-2 according to the present embodiment. The screen B2-2 displays a virtual blackboard that has been registered as a favorite virtual blackboard. Once relevant data is input to the blank fields of a virtual blackboard, the virtual blackboard having the relevant data input to its fields may be stored and registered as a favorite virtual blackboard. By reusing such a virtual blackboard that already has data input to its fields, redundant input operations may be reduced and efficiency may be improved. For example, in the case of taking a plurality of site photos of the same construction site, the virtual blackboard may be reused in order to reduce redundant input operations of inputting the same information.

Referring back to FIG. 7, after a photo image is captured, in some cases, a screen B2-2 displaying one or more favorite virtual blackboards may be displayed instead of the screen B2-1 and the virtual blackboard to be used may be selected from the screen B2-2, for example. In this case, because a favorite virtual blackboard already having relevant data input to its fields is called and displayed (e.g. see FIG. 10C), the user may not have to perform any input operations with respect to the next screen B3, and the user may simply touch the operation button "ATTACH BLACKBOARD" on the screen B3 of FIG. 10C.

Figure 12A:
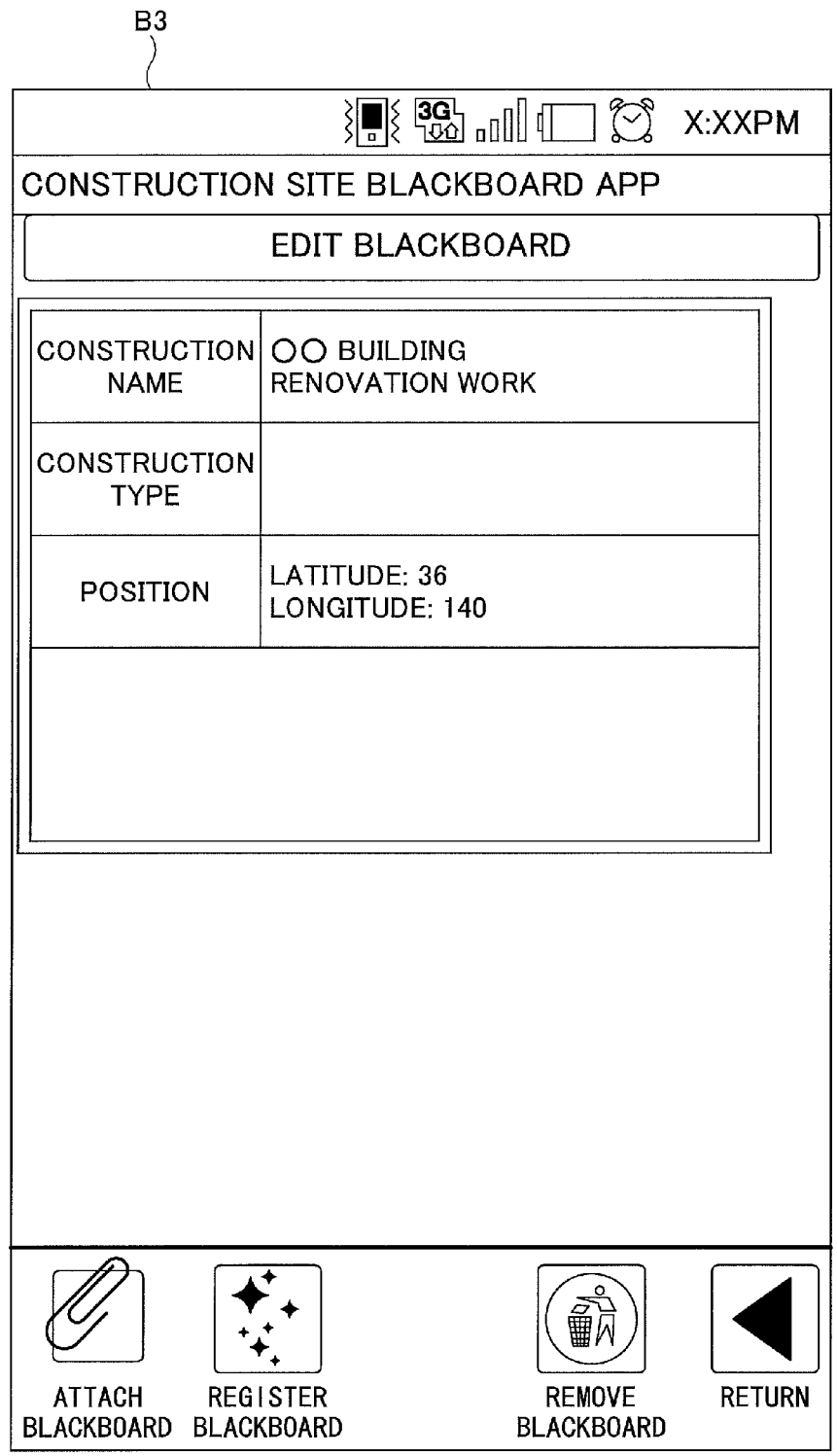
FIGS. 12A-12C illustrate modified examples of screen B3 according to embodiments of the present invention.
Figure 12B:
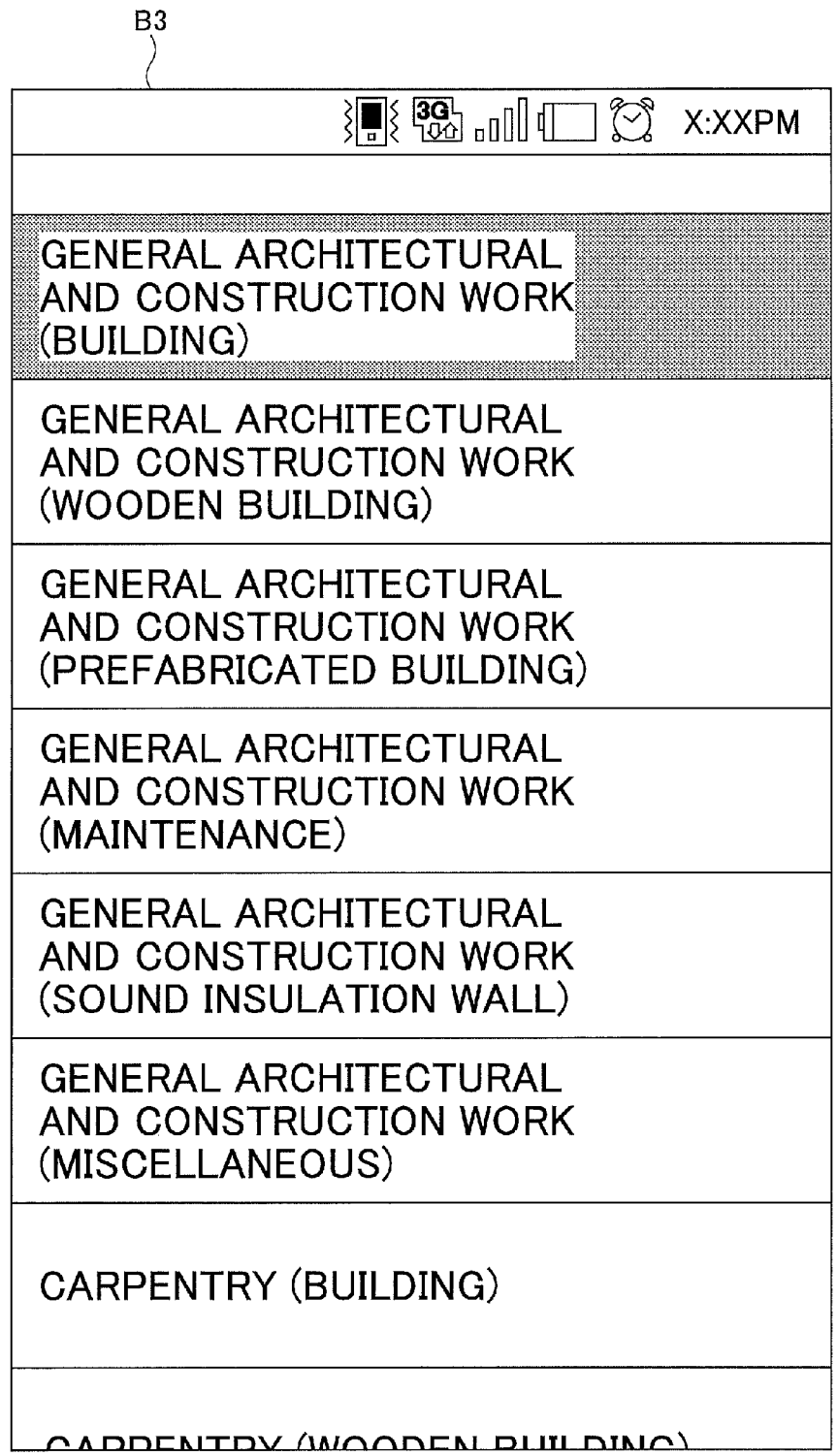
Figure 12C:
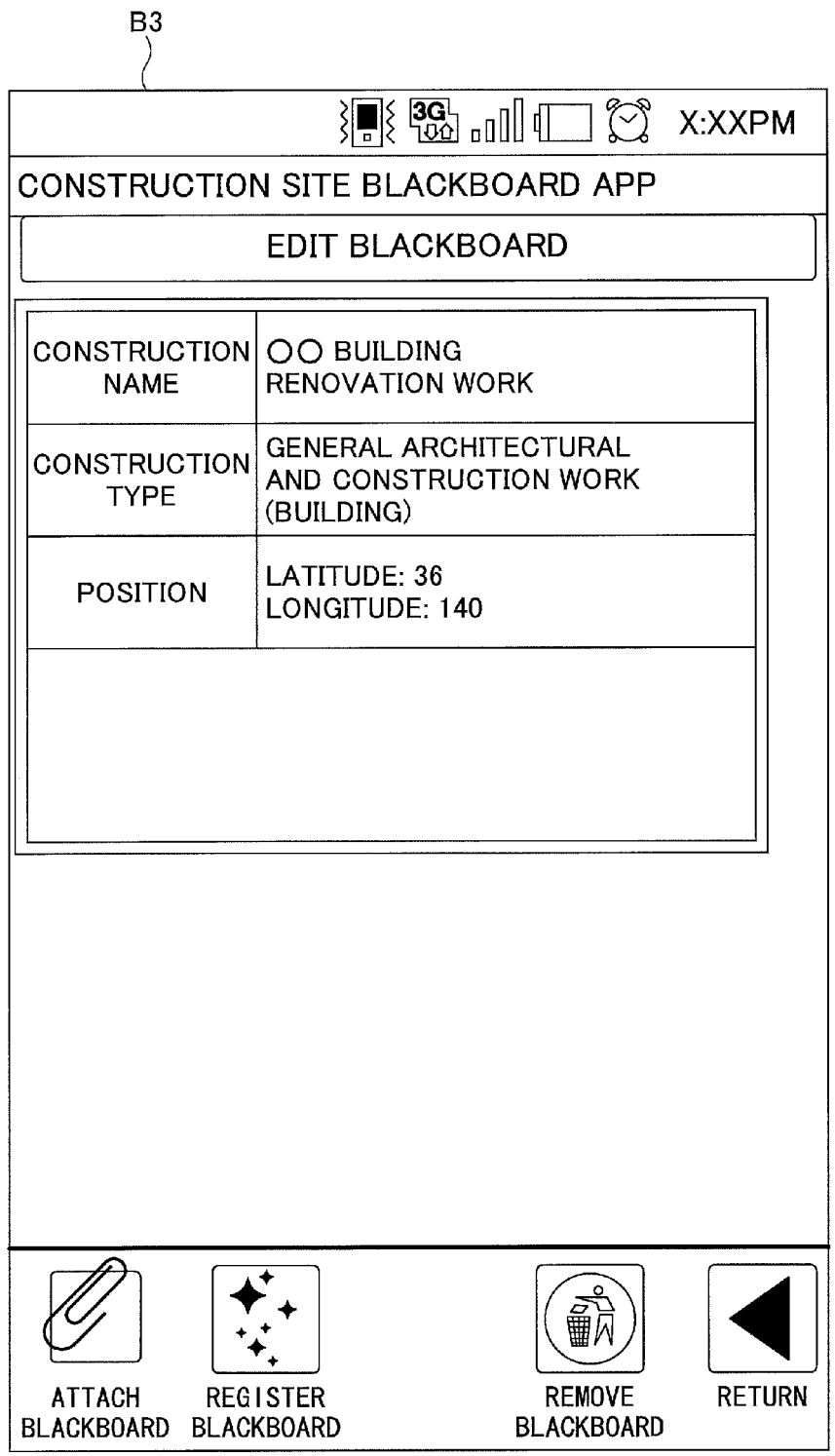

FIGS. 12A-12C illustrate modified examples of the screen B3 according to the present embodiment. FIG. 12A illustrates a virtual blackboard selected by the user. Like FIG. 10A, position information (position coordinates) of the current location automatically acquired by the GPS 18 is already input to the field "POSITION" on the screen B3 of FIG. 12A. Also, in the present modified example, information is already input to the field "CONSTRUCTION NAME". As described above, in the smart device 1 according to the present embodiment, measurement data obtained by the surveying/measuring device 2 (e.g. "measurement point", "actual dimension") and general construction information ("construction name", "construction type", "operator") managed by the PC 4 or by various code information may be input via the communication unit 104. Thus, an input value for the field "CONSTRUCTION NAME" may be automatically input by the input unit 105 based on construction information input to the smart device 1 via the communication unit 104, for example.

Then, when the user touches the field "CONTRUCTION TYPE" of the virtual blackboard that is still blank, a selection list as illustrated in FIG. 12B may be displayed, for example. Note that a fixed value is input as information for the field "CONSTRUCTION TYPE", and accordingly, a plurality of input values that can possibly be input to the field are stored in the selection list. Thus, the user may select the construction type of the present construction project from the selection list and input the corresponding input value to the field "CONSTRUCTOIN TYPE". Note that in some embodiments, the construction type may be determined based on construction information input to the smart device 1 via the communication unit 104 as described above, and in such case, the corresponding input value may be automatically input to the field "CONSTRUCTOIN TYPE" by the input unit 105 based on the input construction information in a manner similar to the automatic input operations performed with respect to the field "CONSTRUCTION NAME".

After the above input operations according to the modified example are completed, the virtual blackboard having relevant data input to its fields may be displayed as illustrated in FIG. 12C. Upon completing the input operations, the user may touch the operation button "ATTACH BLACKBOARD" on the screen B3 of FIG. 12C.

Figure 13:
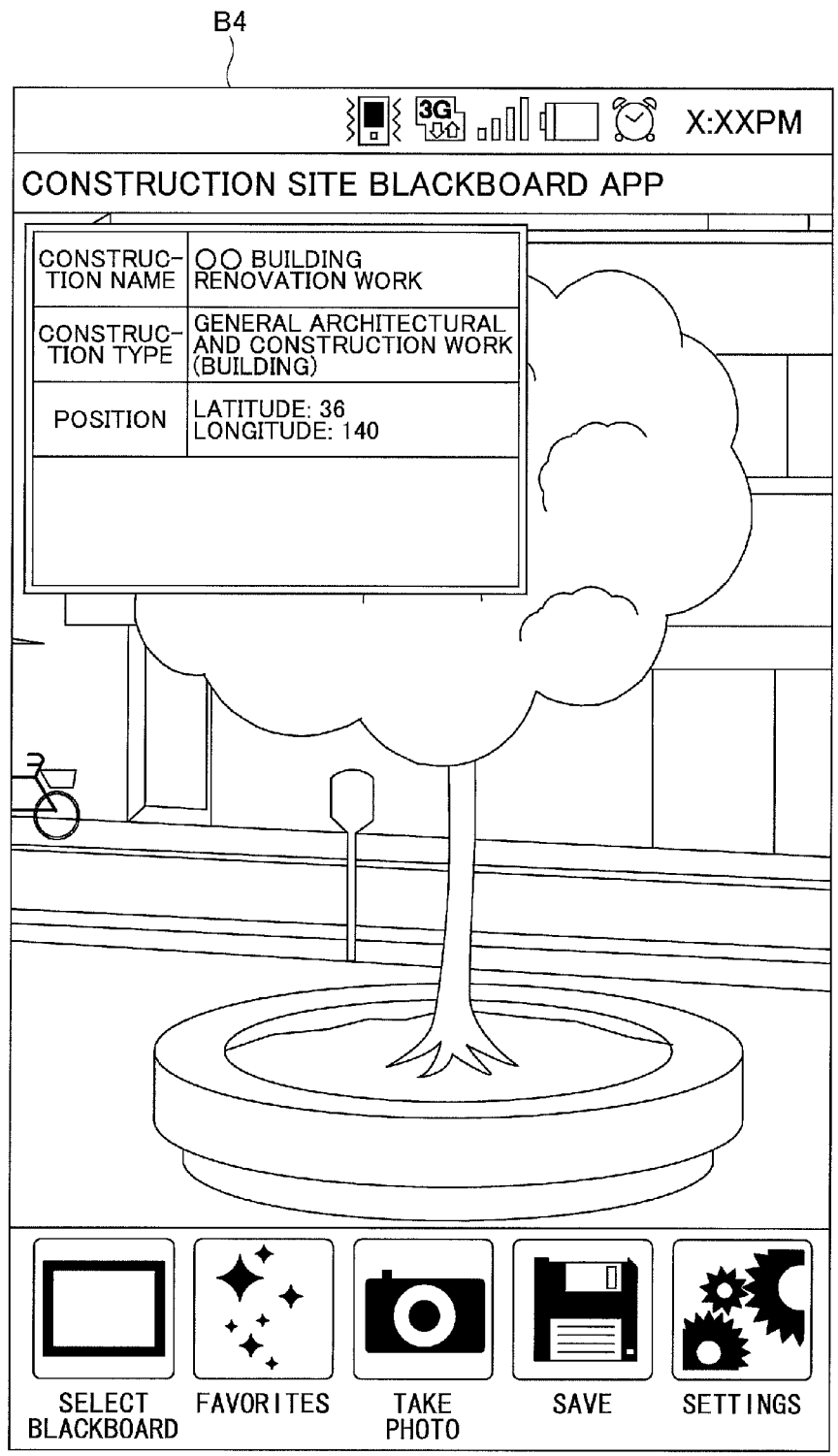
FIG. 13 illustrates an example of screen B4 according to an embodiment of the present invention.

FIG. 13 illustrates an example of screen B4 according to the present embodiment. In the screen B4 of FIG. 13, the image editing unit 106 superimposes the virtual blackboard having relevant data input to its fields on the captured photo image. In the illustrated example, the virtual blackboard having relevant data input to its fields as illustrated in FIG. 10C or FIG. 12C is placed on the captured photo image of the screen B1 as illustrated in FIG. 8. Such an image is an example of a virtual blackboard-added photo image.

Note that at this point, the user may operate the touch panel to adjust the position and size of the virtual blackboard, for example. The virtual backboard is initially placed on the photo image according to initial values set up for the position and size of the virtual blackboard. However, in some cases, visibility of the photo image of the construction site may be compromised due to the presence of the virtual blackboard. Thus, the user may check the screen B4 to see whether the initial position and size of the virtual blackboard would cause any inconveniences and may change the position and size of the virtual blackboard as necessary.

Figure 14A:
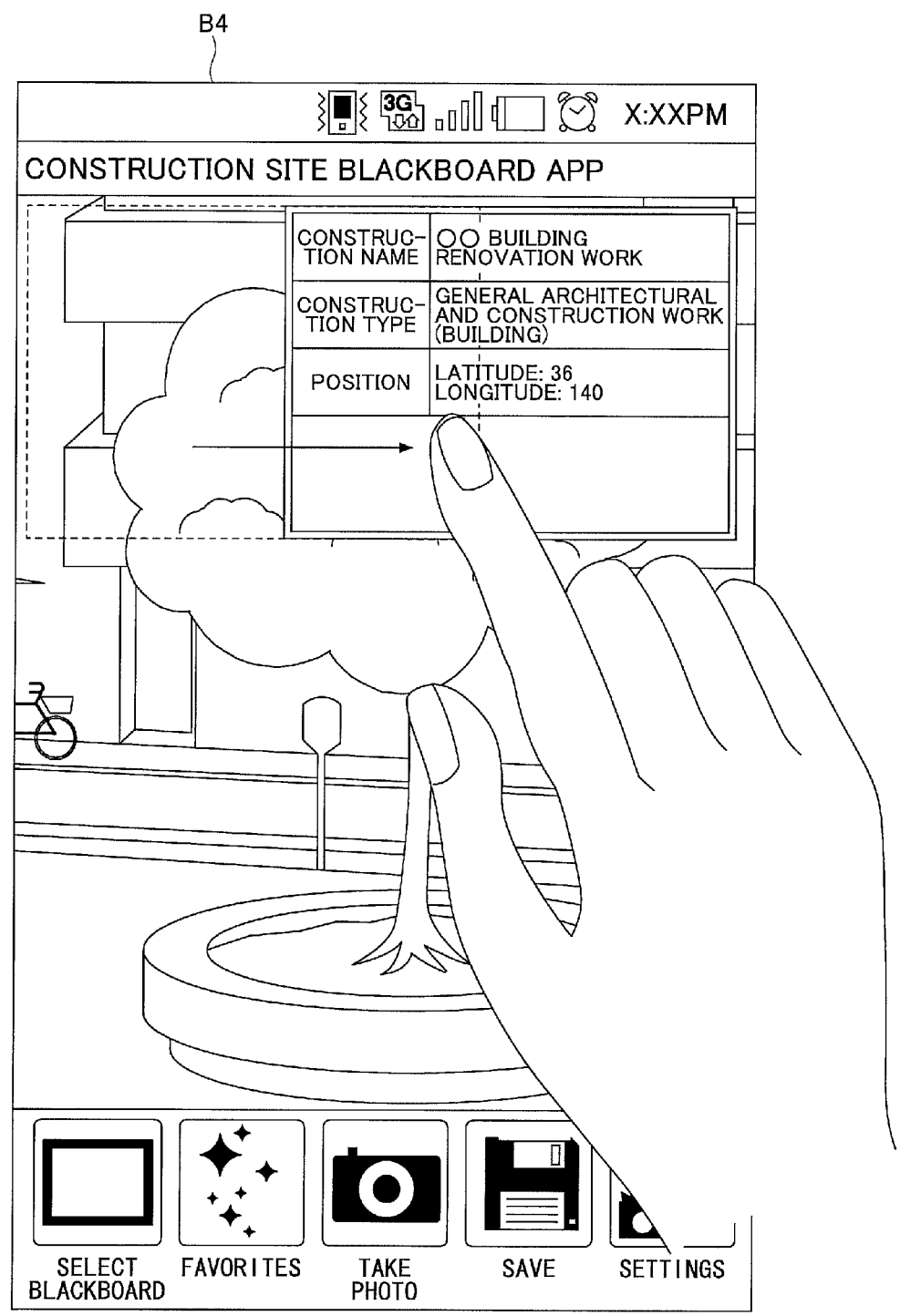
FIGS. 14A and 14B illustrate exemplary operations for changing the position and size of a virtual blackboard displayed in a screen according to an embodiment of the present invention.
Figure 14B:
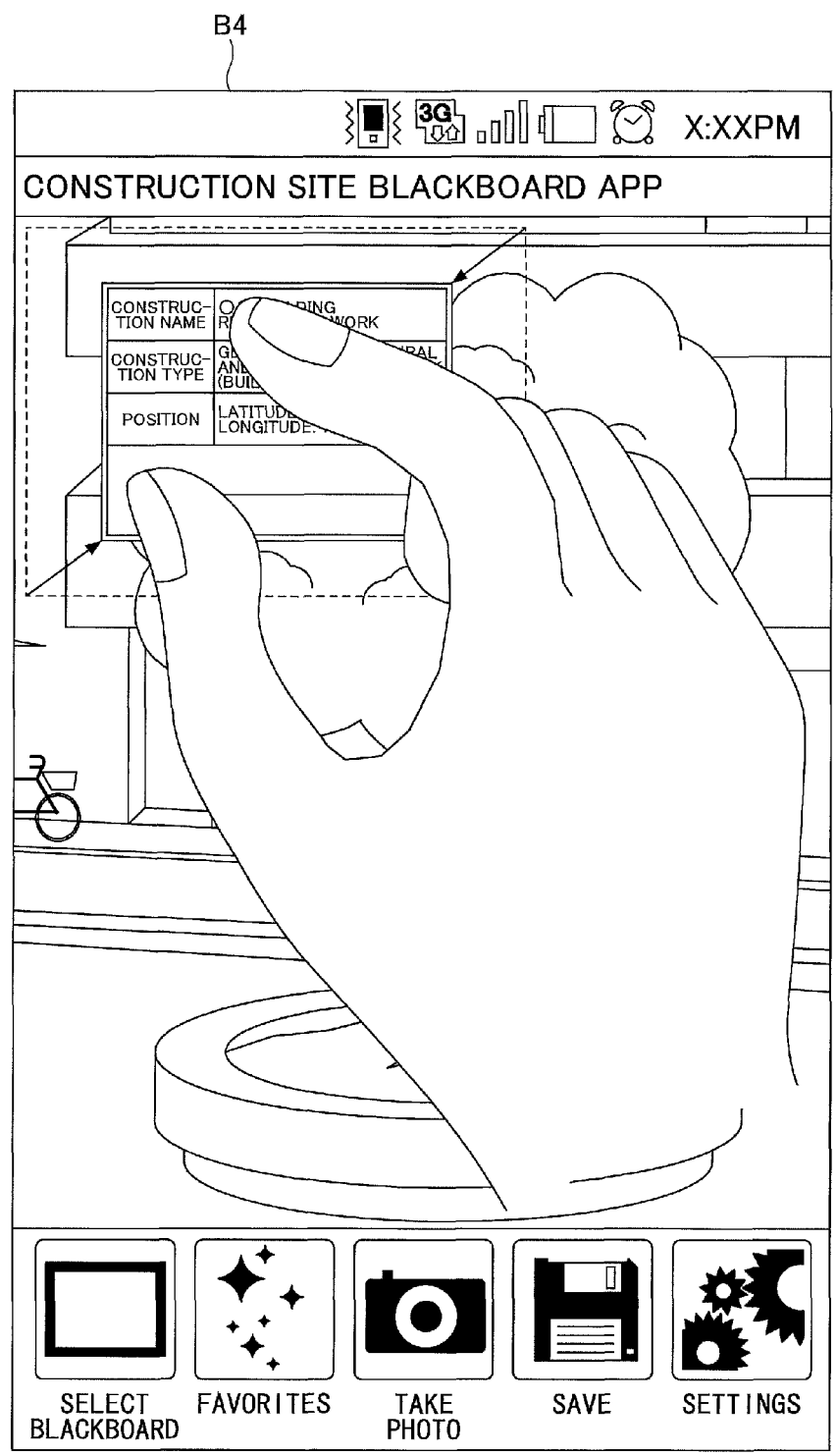

FIGS. 14A and 14B illustrate exemplary operations for changing the position and size of the virtual blackboard according to the present embodiment. FIG. 14A illustrates an exemplary operation for changing the position of the virtual blackboard. As illustrated in FIG. 14A, the user may easily change the position of the virtual blackboard by dragging the virtual blackboard across the screen B4 on the touch panel 102 using a finger, for example. FIG. 14B illustrates an exemplary operation for changing the size of the virtual blackboard. As illustrated in FIG. 14B, the user may easily change the size of the virtual blackboard by shrinking (or enlarging) the virtual blackboard on the touch panel 102 using a finger, for example. The user may also perform an operation for changing both the position and the size of the virtual blackboard at the same time, for example.

After the user has finished checking the virtual blackboard-added photo on the screen B4 of FIG. 13, the user may touch an operation button "SAVE" in the screen B4 of FIG. 13 to store the virtual blackboard-added photo. Note that the virtual blackboard-added is stored in the "PHOTO STORAGE" on the smart device application (e.g., see screen D1 of FIG. 17) as described in detail below.

Further, verification information may be computed (generated) based on the virtual blackboard-added photo and Exif metadata of the virtual blackboard-added photo, the generated verification information may be stored (embedded) in the virtual blackboard-added photo to create a verification information/virtual blackboard-added photo, and the verification information/virtual blackboard-added photo may be stored in the storage unit 101.

Figure 15:
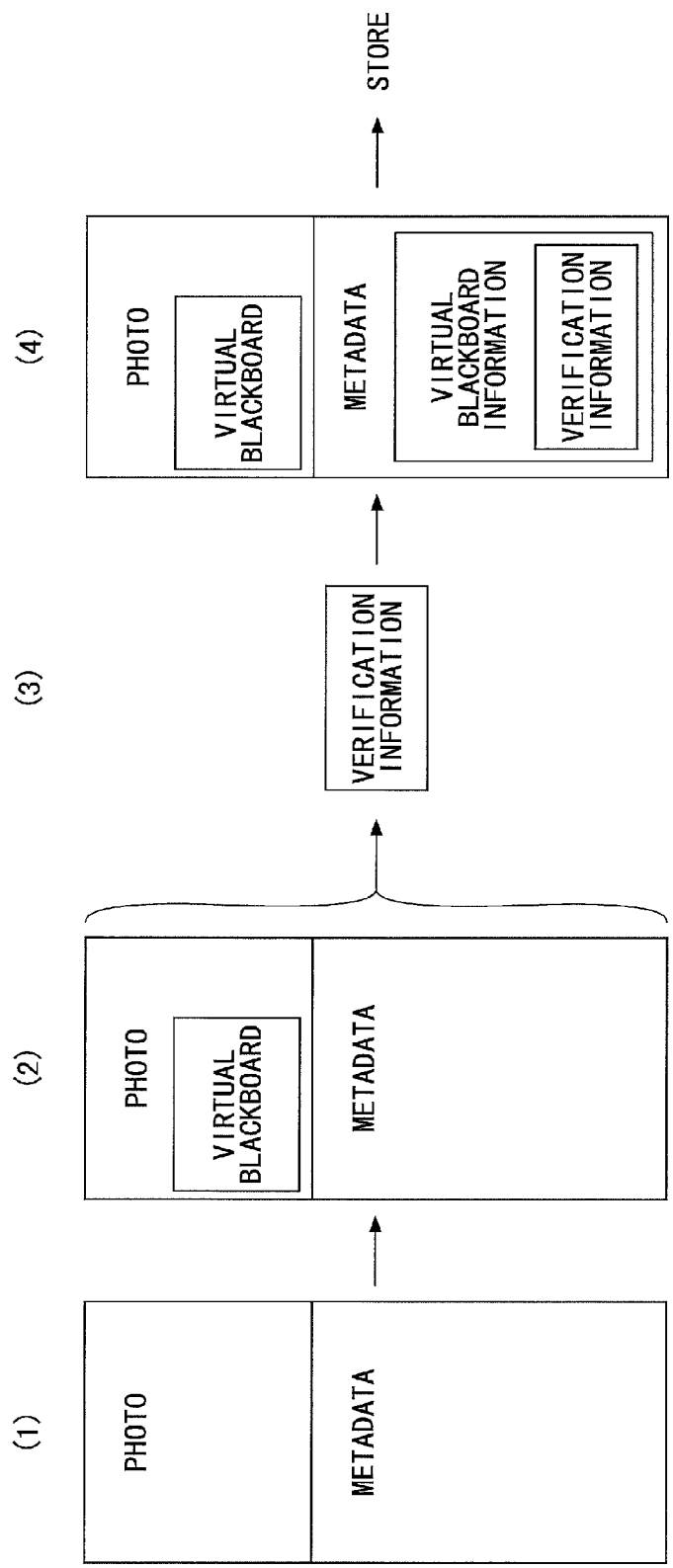
FIG. 15 illustrates an exemplary process of creating a verification information/virtual blackboard-added photo.

FIG. 15 illustrates an exemplary process of creating a verification information/virtual blackboard-added photo. For example, Exif metadata may be created upon storing a site photo as a JPEG file (1). That is, the stored site photo includes photo image data and metadata. Then, a virtual blackboard-added photo may be created by placing a virtual blackboard on the site photo (2). Then, verification information may be computed (generated) based on the virtual blackboard-added photo and the metadata (3). For example, a predetermined function such as a hash function may be used to compute a value (verification information) representing the virtual blackboard-added photo and the metadata. The verification information is then stored in a predetermined area of the metadata along with virtual blackboard information.

FIG. 16 illustrates an exemplary Exif data format. The Exif data may have a data format including SOI, APP1, APP5, DQT, DHT, SOF, SOS, compressed data, and EOI, for example. The Exif data includes a secure and private area such as the APP5 for storing manufacturer specific information and the like. A definition statement is set up in advance to store information in such private area. The verification information and the virtual blackboard information are stored in such private area of the Exif data according to the definition statement.

(Operation C)

Like operation B, operation C is an operation for creating a site photo. However, in operation C, the process steps of operation B are performed in a different order. That is, in operation C, the process steps of selecting a virtual blackboard and inputting relevant data to the fields of the virtual blackboard are performed before performing the process steps of taking a site photo and placing the virtual blackboard on the site photo to ultimately create a virtual blackboard-added photo. The process flow of operation C is briefly described below.

Referring to FIG. 6, in operation C, the operation button "SELECT BLACKBORAD" or the operation button "FAVORITES" in the top screen A is operated (e.g. touched) by the user.

When the operation button "SELECT BLACKBORAD" is operated, the screen display is switched to screen C1-1. The screen C1-1 may be similar to the screen B2-1 of FIG. 9 and displays a plurality of virtual blackboard template images that are pre-installed. When the user touches/selects the virtual blackboard template to be used from the virtual blackboard template images displayed on the screen C1-1, the screen display is switched to a next screen C2.

The screen C2 displays the selected virtual blackboard in a manner similar to the screen B3 of FIG. 10A or the screen B3 of FIG. 12A, for example. The selected virtual blackboard displayed on the screen C2 includes one or more fields that are empty (blank), and the user uses soft keys to input a specific value to the empty fields (see e.g. FIGS. 10A-10C). Alternatively, as described above, in the present embodiment, measurement data obtained by the surveying/measuring device 2 and general construction information managed by the PC 4 or code information may be input to the smart device 1 via the communication unit 104. In such case, input values for the predetermined fields of the virtual blackboard may be automatically input by the input unit 105 based on the construction information input to the smart device 1 via the communication unit 104.

On the other hand, when the operation button "FAVORITES" is operated on the top screen A, the screen display is switched to screen C1-2. The screen C1-2 may be similar to the screen B2-2 of FIG. 11 and displays a virtual blackboard that has been registered as a favorite virtual blackboard. If one or more virtual blackboards having relevant data already input to its fields are stored (registered) as favorite virtual blackboards, the user may select a virtual blackboard from the favorite virtual blackboards. In this case, the next screen C2 displays the selected virtual blackboard that already has relevant data input to its fields, and as such, the user does not have to perform any input operations on the screen C2.

Then, when the operation button "ATTACH BLACKBOARD" is operated, the screen display may be switched to screen C3. In the screen C3, a pre-installed camera app of the smart device 1 may be launched and set to image capture mode in a manner similar to the screen B1 of FIG. 8. A view of the construction site captured by the imaging unit 103 (a view of a cylindrical bench in the premises of a building is captured in the illustrated example) may be reflected on the screen C3 of the smart device 10. Thus, the user may take a photo of the construction site by performing image capturing operations.

Then, the screen display is switched to screen C4. In the screen C4, the virtual blackboard having relevant data input to its fields is superimposed on the captured photo image in a manner similar to the screen B4 of FIG. 13. Note that the user may also adjust the position and size of the virtual blackboard image by operating the touch panel, for example.

After the user has finished checking the virtual blackboard-added photo on the screen C4, the user may store the virtual blackboard-added photo by touching the operation button "SAVE" on the screen C4. Note that the virtual blackboard-added photo is stored in the "PHOTO STORAGE" on the smart device application (e.g. see screen D1 of FIG. 17).

Further, verification information may be computed (generated) based on the virtual blackboard-added photo and Exif metadata of the virtual blackboard-added photo, the generated verification information may be stored (embedded) in the virtual blackboard-added photo to create a verification information/virtual blackboard-added photo, and the verification information/virtual blackboard-added photo may be stored in the storage unit 101.

(Operation D)

Operation D may be performed for referencing a virtual blackboard-added photo, for example. Virtual blackboard-added photos that have been created in operation B and operation C are stored. Thus, the user may reference the stored virtual blackboard-added photos, arbitrarily select a given photo, and output the selected photo to the server 4, the PC 5, or a recording medium, for example.

Figure 17:
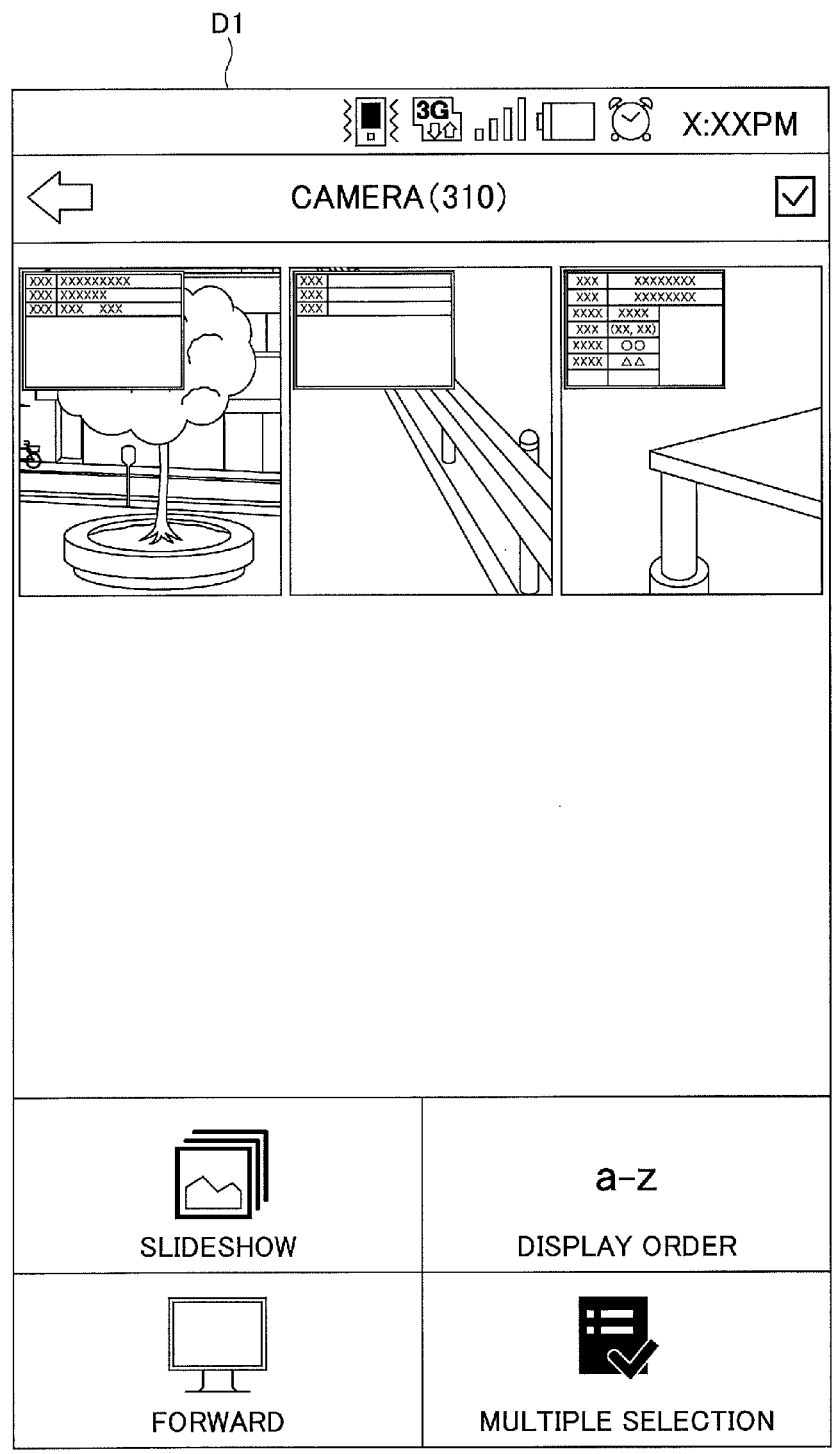
FIG. 17 illustrates an example of screen D1 according to an embodiment of the present invention.

FIG. 17 illustrates an example of screen D1 according to the present embodiment. When the operation button "PHOTO STORAGE" of the top screen A is operated, the screen display is switched to screen D1. As illustrated in FIG. 17, the screen D1 displays a list of virtual blackboard-added photos that have been created by operations B and C and stored in the "PHOTO STORAGE" up to this point. Also, in some embodiments, a list of verification information/virtual blackboard-added photos created by the operations B and C may be displayed on the screen D1. Note that each photo is reduced in size and displayed as a thumbnail on the screen D1. Thus, for example, when the user touches (selects) a desired photo on the screen D1, the selected photo may be enlarged and displayed on the screen D1. Also, when the user touches an operation button "SLIDE SHOW" on the screen D1, the photos stored in the "PHOTO STORAGE" may be sequentially displayed on the screen D1 as a slide show, for example.

Also, one or more photos may be selected from the "PHOTO STORAGE" and output to the server 4, the PC 5, or a recording medium, for example. Note that the user imports a verification information/virtual blackboard-added photo stored in the "PHOTO STORAGE" into the PC 5 to create a construction report using the verification information/virtual blackboard added photo.

(Operation E)

Operation E is an operation for establishing various parameter settings. In operation E, initial values of various parameters settings of the virtual blackboard may be set up, for example.

Figure 18:
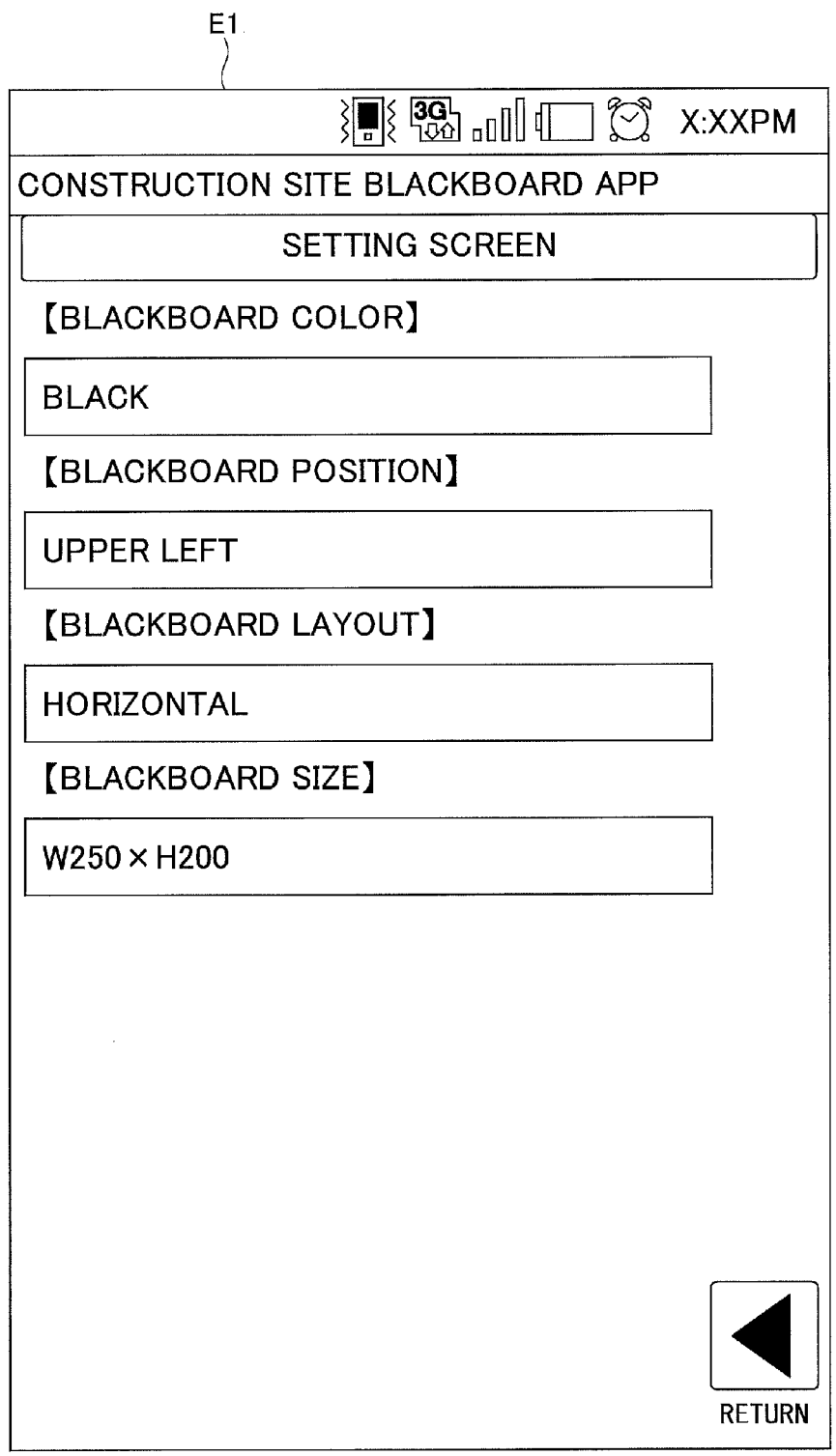
FIG. 18 illustrates an example of screen E1 according to an embodiment of the present invention.

FIG. 18 illustrates an example of screen E1 according to the present embodiment. As illustrated in FIG. 18, initial values of settings including "BLACKBOARD COLOR", "BLACKBOARD POSITION", "BLACKBOARD LAYOUT", and "BLACKBOARD SIZE" may be set up from the screen E1. When the user wishes to change the initial value of a parameter setting, the user may touch the corresponding setting field, and a corresponding selection list of possible input values may be displayed in response.

Figure 19A:
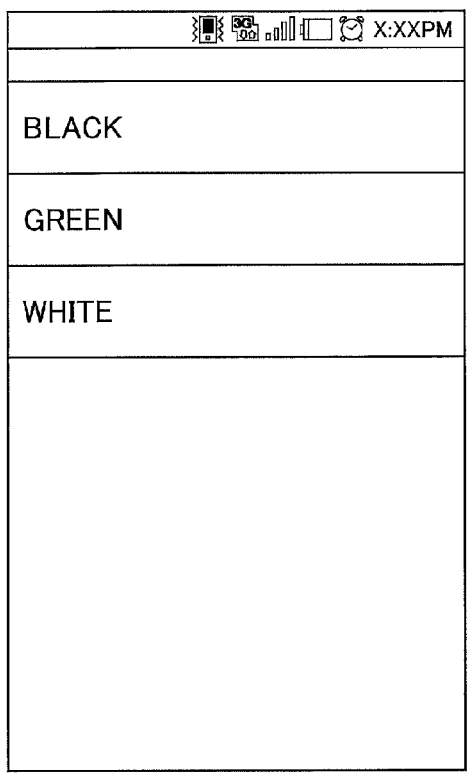
FIGS. 19A-19D illustrate examples of selection lists for selecting an initial value for each parameter setting.
Figure 19B:
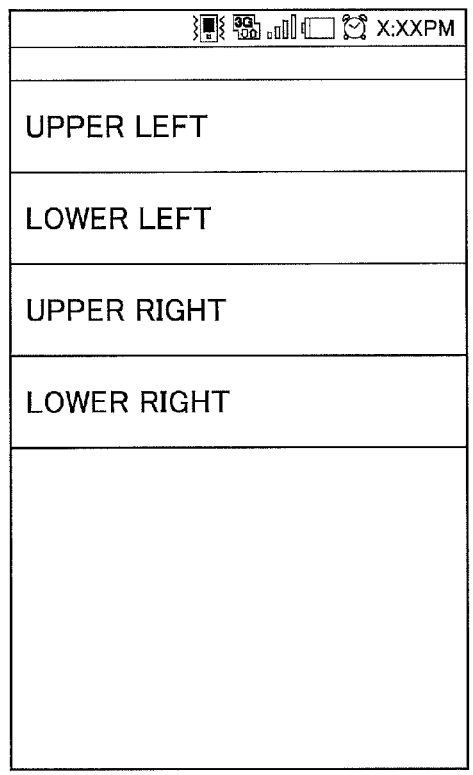
Figure 19C:
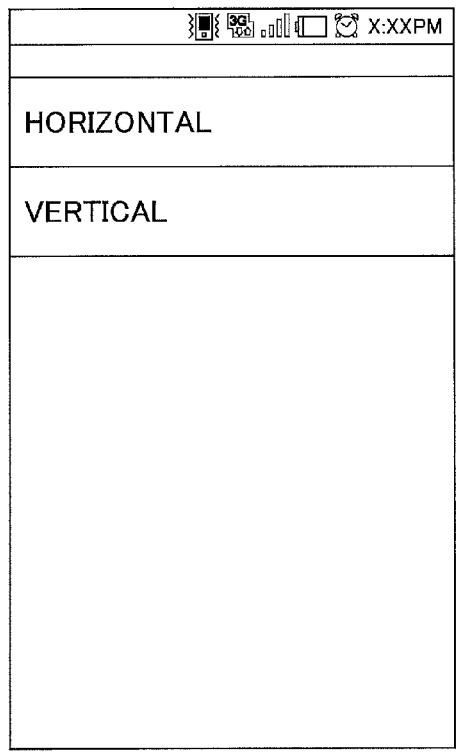
Figure 19D:
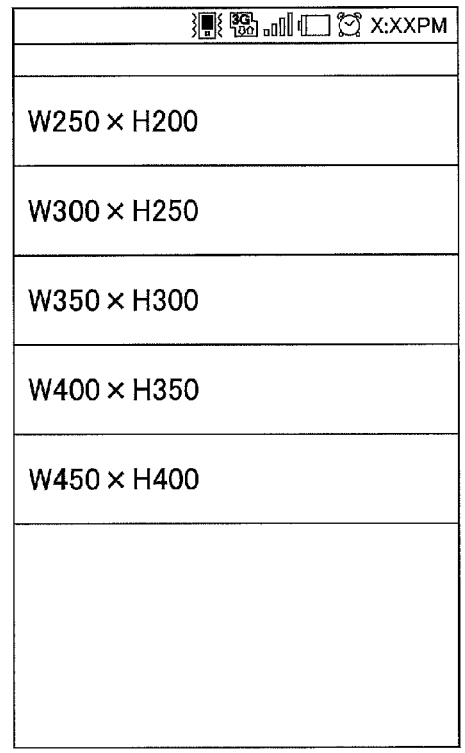

FIGS. 19A-19D illustrate exemplary selection lists of initial values for the various parameter settings according to the present embodiment. FIG. 19A illustrates an exemplary selection list of initial values for "BLACKBOARD COLOR", FIG. 19B illustrates an exemplary selection list of initial values for "BLACKBOARD POSITION", FIG. 19C illustrates an exemplary selection list of initial values for "BLACKBOARD LAYOUT", and FIG. 19D illustrates an exemplary selection list of initial values for "BLACKBOARD SIZE". The user may select a desired initial value from the selection list.

Referring back to FIG. 13, in screen B4, a virtual blackboard having relevant data input to its fields is superimposed on a captured photo. The color, position, size, and layout of the virtual blackboard placed on the photo by default are arranged according to the initial values set up in the screen E1. By setting desired initial values for the parameters of the virtual blackboard in advance via the screen E1, a suitable virtual blackboard may be arranged by default on a photo in creating a virtual blackboard-added photo, for example.

Note, however, that the initial values set up in the screen E1 merely specify the virtual blackboard that is to be arranged by default, and the user may still operate the touch panel as described above to adjust the position and size of the virtual blackboard, for example. That is, although the position and size of the virtual blackboard is initially arranged according to the initial values that are set up in advance, the position and size of the virtual blackboard may be optionally changed in the event inconveniences are created by the initial position and/or size of the virtual blackboard, for example.

[Storage Methods for Storing Favorite Virtual Blackboard and Virtual Blackboard-Added Photo]

Figure 20:
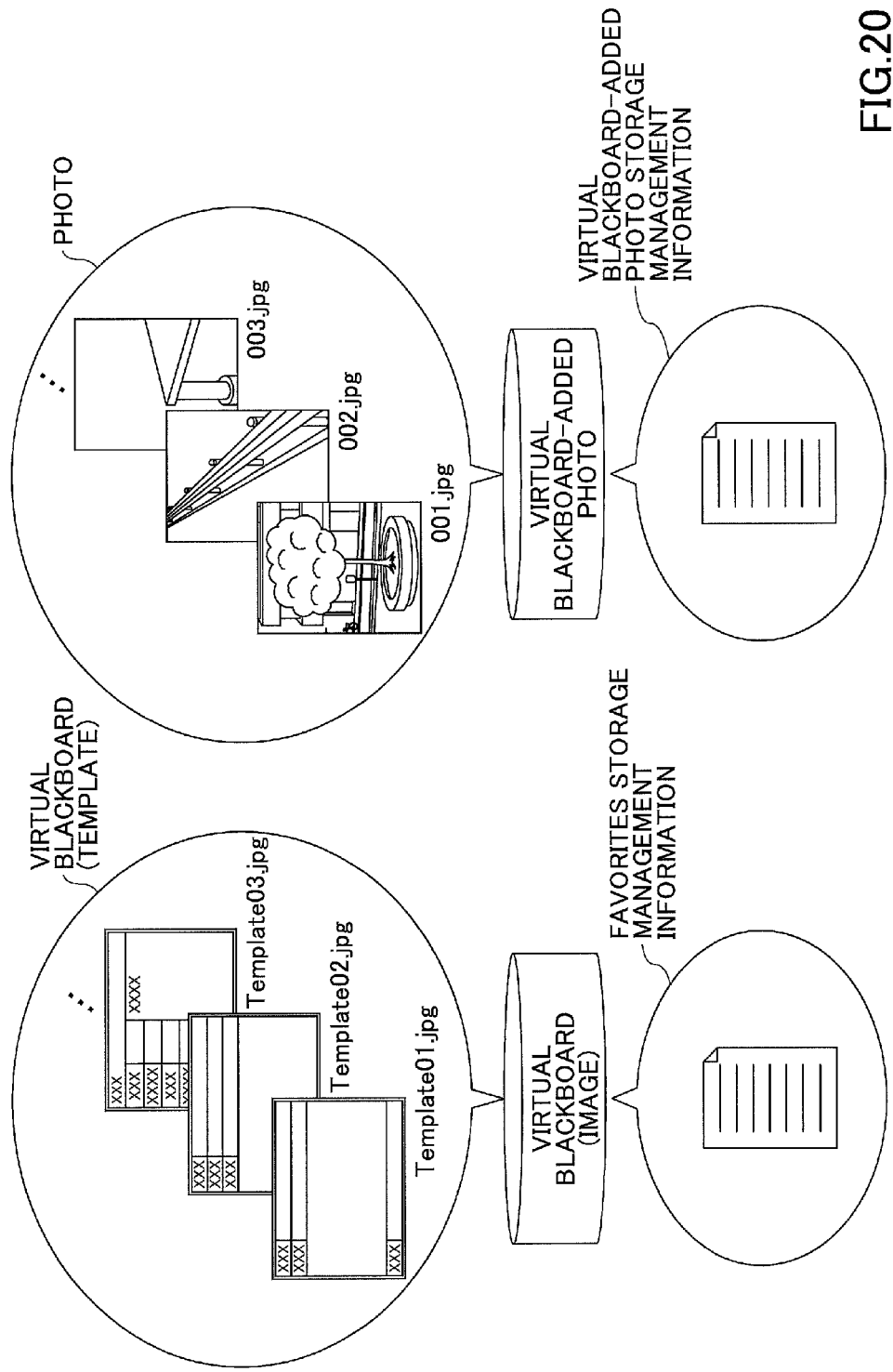
FIG. 20 illustrates exemplary storage methods for storing a favorite virtual blackboard and a virtual blackboard-added photo according to an embodiment of the present invention.

FIG. 20 illustrates methods for storing a favorite virtual blackboard and a virtual blackboard-added photo according to the present embodiment. As described above, in the present embodiment, a plurality of virtual blackboard template images are pre-installed. That is, the storage unit 101 stores a plurality of virtual blackboard images with predetermined fields (blank fields). Also, when a photo image is captured by the imaging unit 103, the photo image that has been captured is stored in the storage unit 101 as image data.

(Favorite Virtual Blackboard)

First, a storage method for storing a favorite virtual blackboard is described below. As described above, the smart device 1 according to the present embodiment is capable of separately storing a virtual blackboard having relevant data input to its fields as a favorite virtual blackboard. By calling and reusing a favorite virtual blackboard that is stored in a favorites list on the smart device application, for example, input operations for inputting the same information may be omitted (e.g. see FIG. 11).

FIG. 21 illustrates an exemplary configuration of favorites storage management information according to the present embodiment. The favorites storage management information is information for storing a virtual blackboard having relevant data input to its fields and reconfiguring (reproducing) this virtual blackboard as an image. When a virtual blackboard having relevant data input to its fields is separately stored as a favorite virtual blackboard, favorite storage management information for storing and managing the favorite virtual blackboard is generated. FIG. 21 illustrates an exemplary configuration of the favorites storage management information having three virtual blackboards registered as favorite virtual blackboards.

For example, with respect to a favorite virtual blackboard that is identified by a favorite item number "Template01-1", the favorites storage management information of FIG. 21 stores input data for the predetermined fields of a virtual blackboard image (virtual blackboard template) "Template01.jpg" that is stored in the storage unit 101. That is, the favorite virtual blackboard with the favorite item number "Template01-1" is a virtual blackboard that may be reproduced by inputting the following input values to the predetermined fields of the virtual blackboard template "Template01.jpg".

"CONSTRUCTION NAME": "Station Square renovation work"
"CONSTRUCTION LOCATION": "◯◯ Station"
"OPERATOR": "Tanaka Construction (Co., Ltd.)"

Figure 22:
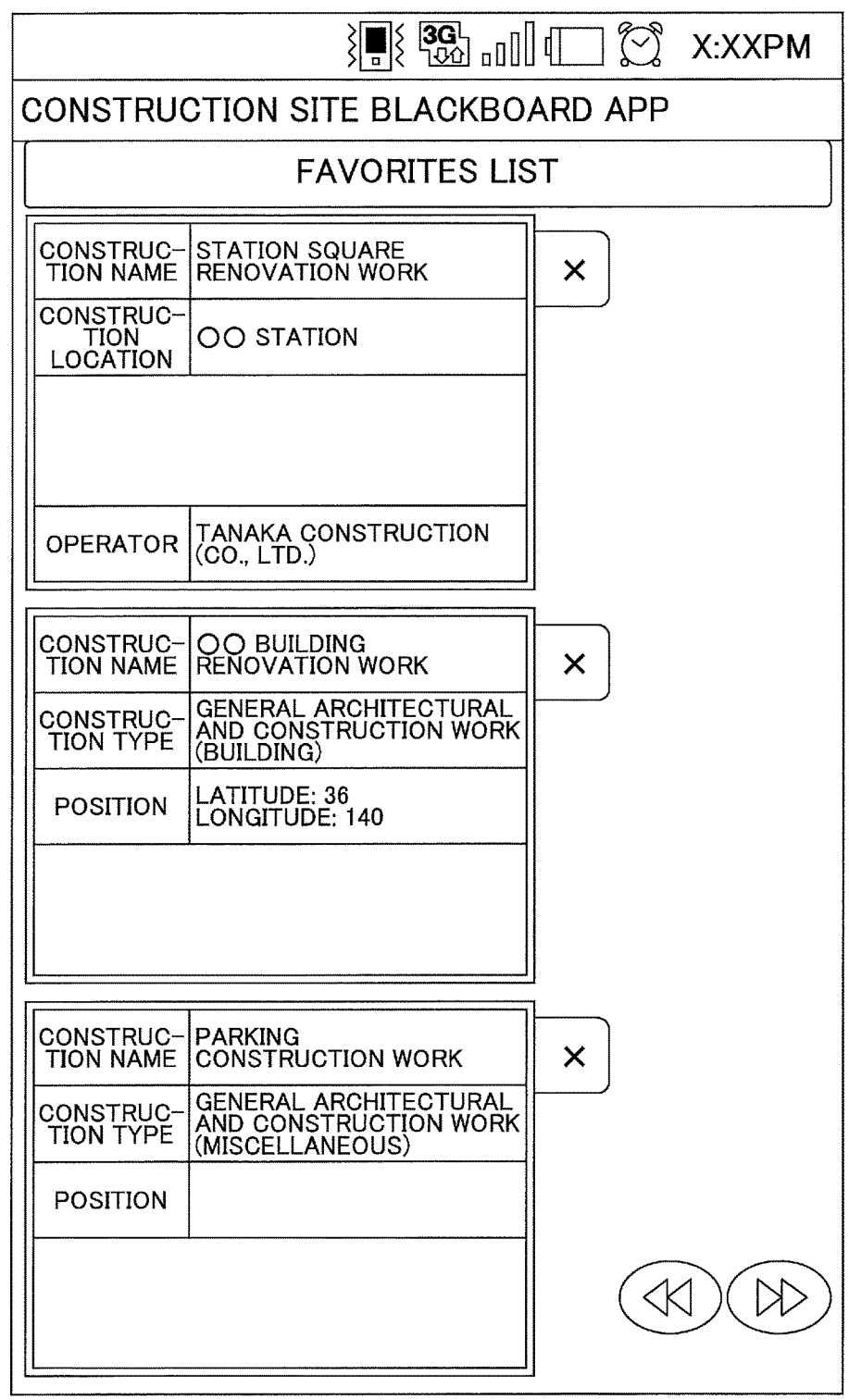
FIG. 22 illustrates an example of a favorite virtual blackboard list according to an embodiment of the present invention.

FIG. 22 illustrates an exemplary list of favorite virtual blackboard images according to the present embodiment. Note that the list of favorite virtual blackboard images illustrated in FIG. 22 represents images of the three favorite virtual blackboards registered in the favorites storage management information illustrated in FIG. 21. For example, with respect to the favorite virtual blackboard with the favorite item number "Template01-1" as described above, a corresponding virtual blackboard image may be reproduced by acquiring the virtual blackboard template "Template01.jpg" from the storage unit 101, and inputting the input values "Station Square renovation work", "◯◯ Station", and "Tanaka Construction (Co., Ltd.)", respectively, to the predetermined fields "CONSTRUCTION NAME", "CONSTRUCTION LOCATION", and "OPERATOR" of the virtual blackboard template. The virtual blackboard image reproduced in this way is included in the list of FIG. 22.

As described above, in the smart device 1 according to the present embodiment, when separately storing a virtual blackboard having relevant data input to its fields as a favorite virtual blackboard, the favorite virtual blackboard may be stored as favorite storage management information in text format rather than storing the corresponding virtual blackboard image itself, for example. That is, the virtual blackboard template and the input data for the virtual blackboard template may be stored separately but in association with each other. In this way, the favorite virtual blackboard image may be reproduced using the virtual blackboard template stored in the storage unit 101 and the favorites storage management information. In view of the limited storage capacity of the smart device 1, the storage method according to the present embodiment enables conservation of storage space while improving editability of the virtual blackboard-added photo.

(Virtual Blackboard-Added Photo)

Next, a storage method for storing a virtual blackboard-added photo is described below. As described above, a virtual blackboard-added photo is stored in the "PHOTO STORAGE" on the smart device application. In operation D, that is, when the operation button "PHOTO STORAGE" is operated on the top screen A and the screen display is switched to screen D1 (e.g. see FIG. 17), the user may be able to view the virtual blackboard-added photos that have been created and stored.

In the smart device 1, the actual virtual blackboard-added photo is stored in the storage unit 101. A first storage method of storing the virtual blackboard-added photo involves storing a display image of the photo image having the virtual blackboard image placed thereon as a new image. Also, a second storage method for storing the virtual blackboard-added photo may be implemented that involves storing the captured photo image, the pre-installed virtual blackboard template image, and the data input to the predetermined fields of the virtual blackboard template in association with each other.

When a photo image is captured by the imaging unit 103, the captured photo image is stored in the storage unit 101 as image data. Then, when a virtual blackboard image is placed on the captured photo image and the resulting virtual blackboard-added photo is stored in the "PHOTO STORAGE" (e.g. see FIG. 17), virtual blackboard-added photo storage management information for storing and managing the virtual blackboard-added photo is generated.

FIG. 23 illustrates an exemplary configuration of the virtual blackboard-added photo storage management information according to the present embodiment. The virtual blackboard-added photo storage management information is information that may be used for storing a virtual blackboard-added photo and reconfiguring (reproducing) the virtual blackboard-added photo. Table (0) of FIG. 23 manages and associates the information items "PHOTO NO." corresponding to a unique identifier for storing and managing the virtual blackboard-added photo, "PHOTO IMAGE" (file name) for identifying the photo used as a base, "BLACKBOARD IMAGE" (file name) for identifying the virtual blackboard template used, and "BLACKBOARD IMAGE PARAMETER SETTINGS" corresponding to initial values for the parameters of the virtual blackboard. Also, tables (1), (2), and (3) of FIG. 23 manages and associates the "PHOTO NO." with corresponding input data (input values) for the virtual blackboard image.

As an illustrative example, a case where the smart device 1 (image reproducing unit 109) reconfigures (reproduces) the virtual blackboard-added photo stored in the first row of table (0) identified by the photo number "001" is described below. First, referring to table (0), file data "001.jpg" of the captured photo used in the virtual blackboard-added photo "001" is acquired. The virtual blackboard template used in the virtual blackboard-added photo "001" is "Template02.jpg", and thus, the file data "Template02.jpg" is acquired.

Next, referring to table (2), input values input to the predetermined fields of the "Template02.jpg" corresponding to the virtual blackboard template used are acquired. Specifically, in table (2), input values stored in association with the photo number "001" include "◯◯ building renovation work" for the "CONSTRUCTION NAME", "General Architectural and Construction Work (Building)" for "CONSTRUCTION TYPE", "(36.140)" for "POSITION", and no value for "FREE SPACE". Thus, these input values are acquired from table (2).

Note that in a case where "Template01.jpg" is used as the virtual blackboard template image, table (1) is referenced in order to acquire input values input to the predetermined fields of the "Template01.jpg". Also, in a case where "Template03.jpg" is used as the virtual blackboard template image, table (3) is referenced in order to acquire input values input to the predetermined fields of the "Template03.jpg". That is, because the predetermined fields vary depending on the specific virtual blackboard template image used, separate management information is provided with respect to each virtual blackboard template image.

Then, referring back to table (0), initial values set up for the parameters of "Template02.jpg" corresponding to the virtual blackboard template image used by the virtual blackboard-added photo "001" are acquired. Specifically, in table (1), initial values stored in association with "Template02.jpg" include "Black" for "BLACKBOARD COLOR", "Upper Left" for "BLACKBOARD POSITION", "horizontal" for "BLACKBOARD LAYOUT", and "W250×H200" for "BLACKBOARD SIZE". Accordingly, these initial values are acquired from table (1).

Then, the virtual blackboard template image "Template02.jpg" is edited to conform to the parameter settings (initial values) "BLACKBOARD COLOR": "Black", "BLACKBOARD LAYOUT": "Horizontal", "BLACKBOARD SIZE": "W250×H200". Then, in the predetermined fields of the blackboard image "Template02.jpg", the acquired input values including "CONSTRUCTION NAME": "◯◯ building renovation work", "CONSTRUCTION TYPE": General Architectural and Construction Work (Building)", "POSITION": "(36.140)", and "FREE SPACE": no value are input to create a virtual blackboard image having relevant data input to its fields. Then, the resulting virtual blackboard image is arranged at an upper left position of the captured photo image "001.jpg2" based on the acquired parameter setting (initial value) "BLACKBOARD POSITION": "Upper Left" to reconfigured and display the virtual blackboard-added photo image (e.g. see FIG. 13). Note that in the case where the virtual blackboard-added photo is stored using the first storage method of the above-described storage methods, the virtual blackboard-added photo image itself is stored, and therefore, the virtual blackboard-added photo image may be reconfigured (reproduced) without the virtual blackboard-added photo storage management information as described above.

In the smart device 1 according to the present embodiment, when storing a virtual blackboard-added photo that has been created, the virtual blackboard-added photo is stored in the storage unit 101 as an image. In addition, the smart device 1 may store the captured photo image, the virtual blackboard template image, and the virtual blackboard-added photo storage management information (e.g. positional information of the virtual blackboard image on the photo image, size information of virtual blackboard template image, and input data for the predetermined fields of the virtual blackboard image) in association with each other in the storage unit 101. In this case, the smart device 1 may be able to reproduce the virtual blackboard-added photo using the pre-installed virtual blackboard template image stored in the storage unit 101, the captured photo image, and the virtual blackboard-added photo storage management information.

(Editing Verification Information/Virtual Blackboard-Added Photo)

As for a storage method for storing a verification information/virtual blackboard-added photo, when data is input to the predetermined fields of a virtual blackboard, the virtual blackboard is placed on a photo image at a predetermined position and in a predetermined size, and a data storage request is issued, for example, verification information may be computed and a corresponding verification information/virtual blackboard-added photo may be stored as an image. That is, a composite image of the virtual blackboard arranged on the photo image is created so that the verification information and the virtual blackboard information embedded in the verification information/virtual blackboard-added photo cannot be easily edited (tampered) thereafter.

(Editing Virtual Blackboard-Added Photo)

In the smart device 1 according to the present embodiment, when storing a virtual blackboard-added photo that has been created, the virtual blackboard-added photo is stored in the storage unit 101 as a virtual blackboard-added photo image. In addition, before editing and storage of the virtual blackboard-added photo is completed, the captured photo image, the virtual blackboard template image, and the virtual blackboard-added photo storage management information (e.g. positional information of the virtual blackboard image on the photo image, size information of virtual blackboard template image, and input data for the predetermined fields of the virtual blackboard image) may be temporarily stored in association with each other in the storage unit 101. However, once the virtual blackboard-added photo image is stored, other temporarily stored data are deleted.

In the smart device 1 according to the present embodiment, editing of the virtual blackboard may be performed before the virtual blackboard-added photo image is stored. That is, values for the parameter settings "BLACKBOARD POSITION" and "BLACKBOARD SIZE" included in the "BLACKBOARD IMAGE PARAMETER SETTINGS" of the above-described virtual blackboard-added photo storage management information may be rewritten and changed. For example, referring to table (0) of FIG. 23, with respect to the virtual blackboard-added photo with a photo number "003" stored in the third row of table (0), the values for the "BLACKBOARD POSITION" and "BLACKBOARD SIZE" are set to "(10.10)" and "W120×H100", respectively. These values are different from the initial values listed in the selection lists illustrated in FIGS. 19B and 19D, for example.

However, such a storage method of storing the captured photo image, the virtual blackboard template image, and the virtual blackboard-added photo storage management information in association with each other is preferably only implemented in the smart device 1 or a PC that includes the "construction site blackboard app".

In the present embodiment, a verification information/virtual blackboard-added photo corresponding to a composite image of a virtual blackboard image arranged on a photo image is generated so that the verification information/virtual blackboard-added photo may be included in a construction report to be submitted to a construction projector owner, for example.

The "construction site blackboard app" of the smart device 1 according to the present embodiment is capable of outputting a JPEG image of a composite image having a virtual blackboard superimposed on a photo image. Further, the "construction site blackboard app" is capable of generating and outputting a verification information/virtual blackboard-added photo at the time of storing the JPEG image (e.g. see screen B4 of FIG. 7 and FIG. 13) so that the JPEG image can be inspected by a construction project owner to verify that the JPEG image has not been tampered with.

Also, one or more verification information/virtual blackboard-added photos stored in the smart device 1 as described above may be selected from the "PHOTO STORAGE" and output to the server 4, the PC 5, or a recording medium, for example. In this case, if the external receiving device is capable of implementing the same storage/management scheme as that implemented by the smart device 1, the verification information/virtual blackboard-added photo may be output as is.

[Verification Information/Virtual Blackboard-Added Photo Output Method]

In the following, an output method for outputting a verification information/virtual blackboard-added photo according to an embodiment of the present invention is described. As described above, the "construction site blackboard app" of the smart device 1 according to the present embodiment is configured to store a verification information/virtual blackboard-added photo that has been generated. Also, in view of desired editability of the virtual blackboard-added photo, the "construction site blackboard app" may be able to implement the second storage method as described above that includes storing the captured photo image, the virtual blackboard template image, and the virtual blackboard-added photo storage management information (e.g. position information of the virtual blackboard image on the photo image, size information of the virtual blackboard, data input to the predetermined fields of the virtual blackboard) in association with each other in the storage unit 101.

However, when editability is enhanced (i.e. when editing can be more easily performed), there will be an increased risk of the photo image and the virtual blackboard image being tampering with. Accordingly, for example, a verification information/virtual blackboard-added photo may be used in a construction report transmitted to the construction project owner or the like. In this way, the construction project owner may be able to easily determine whether tampering has occurred based on the verification information included in the verification information/virtual blackboard-added photo.

(Operation D)

To output a verification information/virtual blackboard-added photo, the user first selects the verification information/virtual blackboard-added photo to be output. Specifically, the user may perform operation D to view the verification information/virtual blackboard-added photos that have been created (see FIG. 7). Note that verification information/virtual blackboard-added photos that have been created are stored in the "PHOTO STORAGE", and therefore, the user may select a desired verification information/virtual blackboard-added photo from the verification information/virtual blackboard-added photos stored in the "PHOTO STORAGE".

Figure 24:
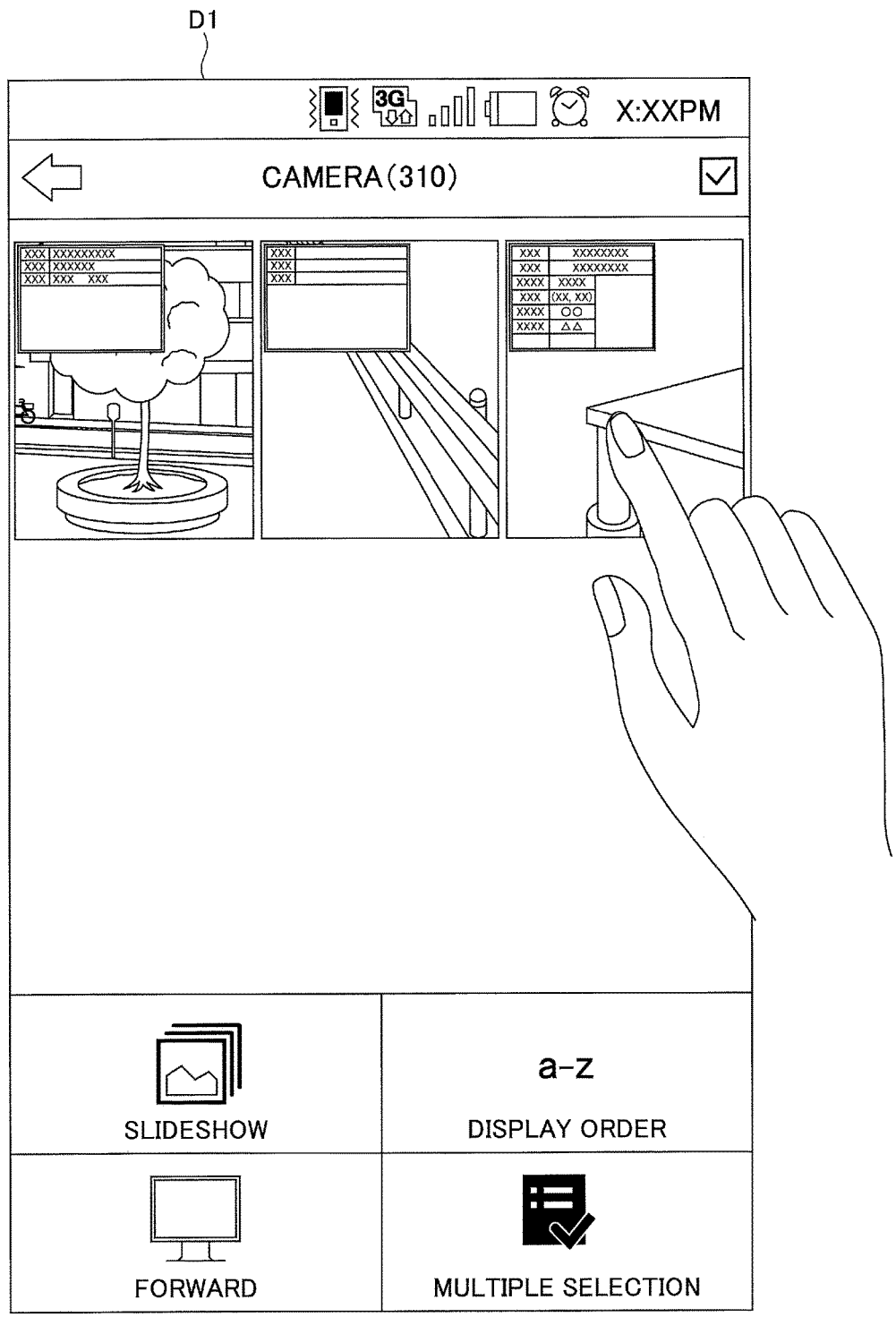
FIG. 24 illustrates an example of screen D1 being operated according to an embodiment of the present invention.

FIG. 24 illustrates an example where the user operates screen D1 according to the present embodiment. When the operation button "PHOTO STORAGE" on the top screen A (FIG. 6) is operated, the screen display is switched to screen D1 as illustrated in FIG. 24 (the same as the screen D1 of FIG. 17). As illustrated in FIG. 24, the screen D1 displays a list of verification information/virtual blackboard-added photos that have been created through operations B and C and stored in the "PHOTO STORAGE" up to this point. Each photo (verification information/virtual blackboard-added photo) is reduced in size to be displayed as a thumbnail, and when the user touches/selects a desired photo, the selected photo may be enlarged and displayed on the screen D1. Note that in the following descriptions, it assumed that the photo (thumbnail) at the far right side of the screen D1 has been touched by the user.

Figure 25:
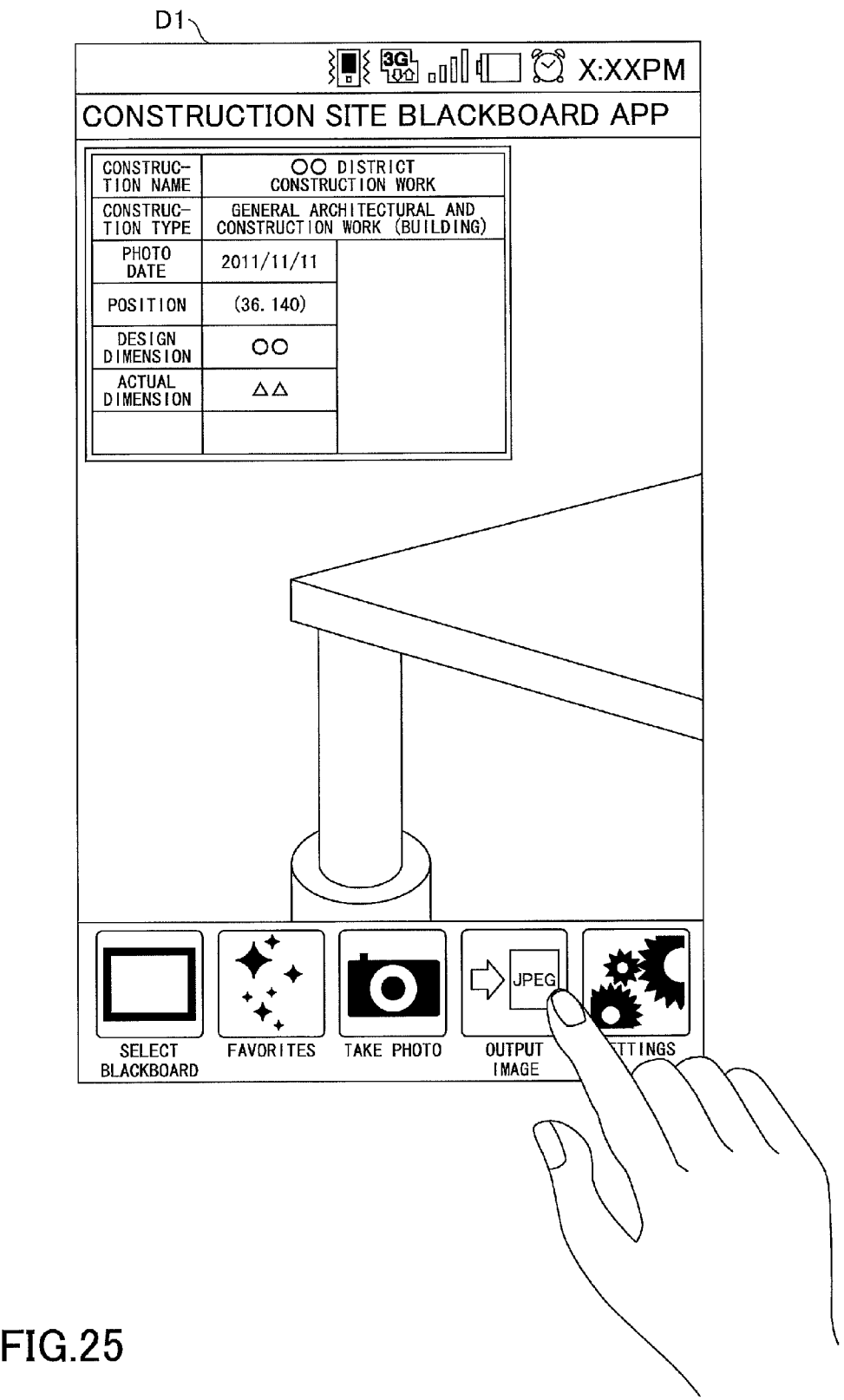
FIG. 25 illustrates another example of screen D1 according to an embodiment of the present invention.

FIG. 25 illustrates another example of screen D1 according to the present embodiment. In the screen D1 of FIG. 25, the verification information/virtual blackboard-added photo that has been selected by the user is displayed. In turn, the user may touch an operation button "OUTPUT IMAGE" on the screen D1 of FIG. 25 in order to output the selected verification information/virtual blackboard-added photo as image data in the JPEG format. In this way, the verification information/virtual blackboard-added photo (JPEG image) may be output.

Note that the JPEG image that is output by the above operation may be stored in an arbitrary memory such as an internal memory of the smart device 1 or a recording medium (e.g. SD card), for example. Also, the storage destination of the JPEG image is not limited to a memory of the smart device 1, and the JPEG may also be output to the server 4, the PC 5, or the cloud storage 7, for example.

Figure 26:
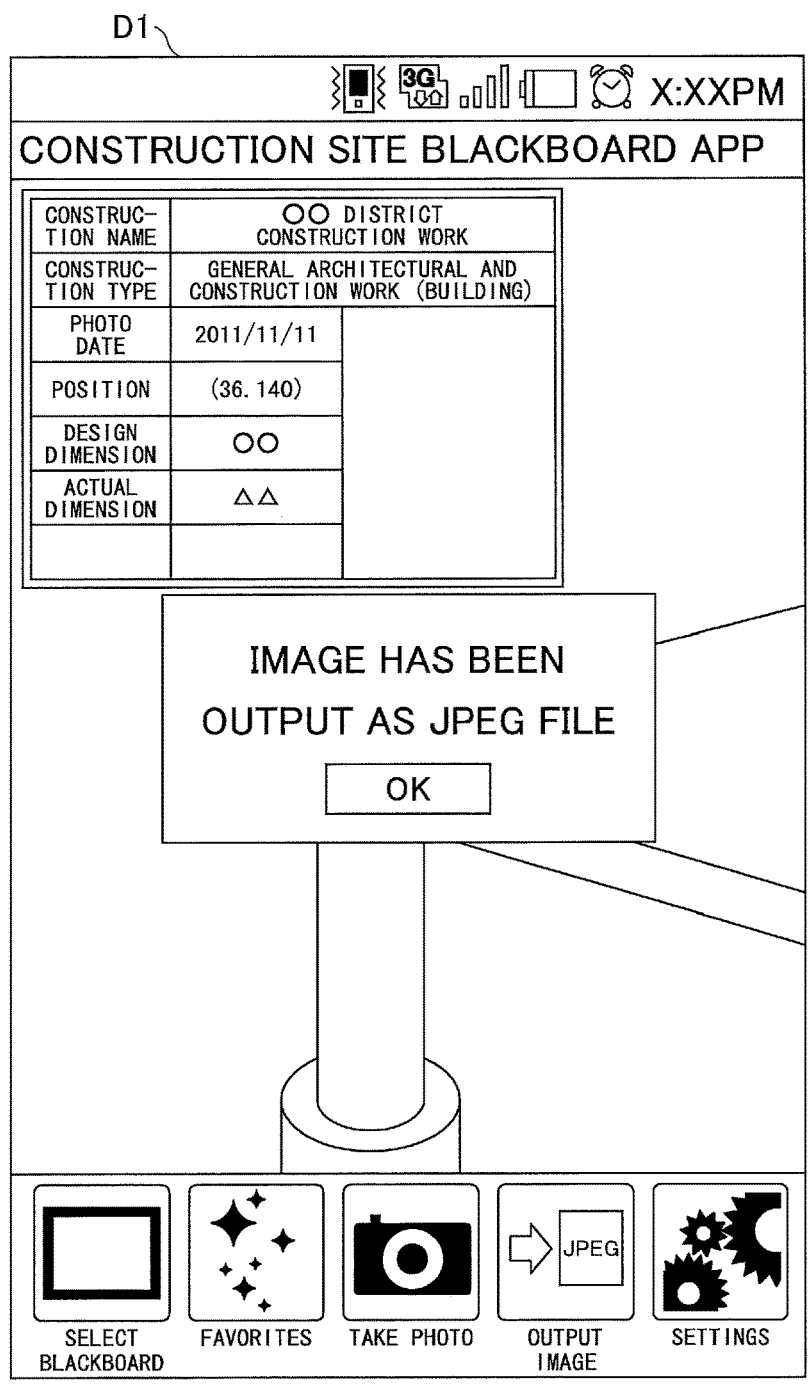
FIG. 26 illustrates another example of screen D1 according to an embodiment of the present invention.

FIG. 26 illustrates another example of screen D1 according to the present embodiment. When the selected verification information/virtual blackboard-added photo has been output as a JPEG image, a message to that effect is displayed on the screen D1 as illustrated in FIG. 26.

Figure 27:
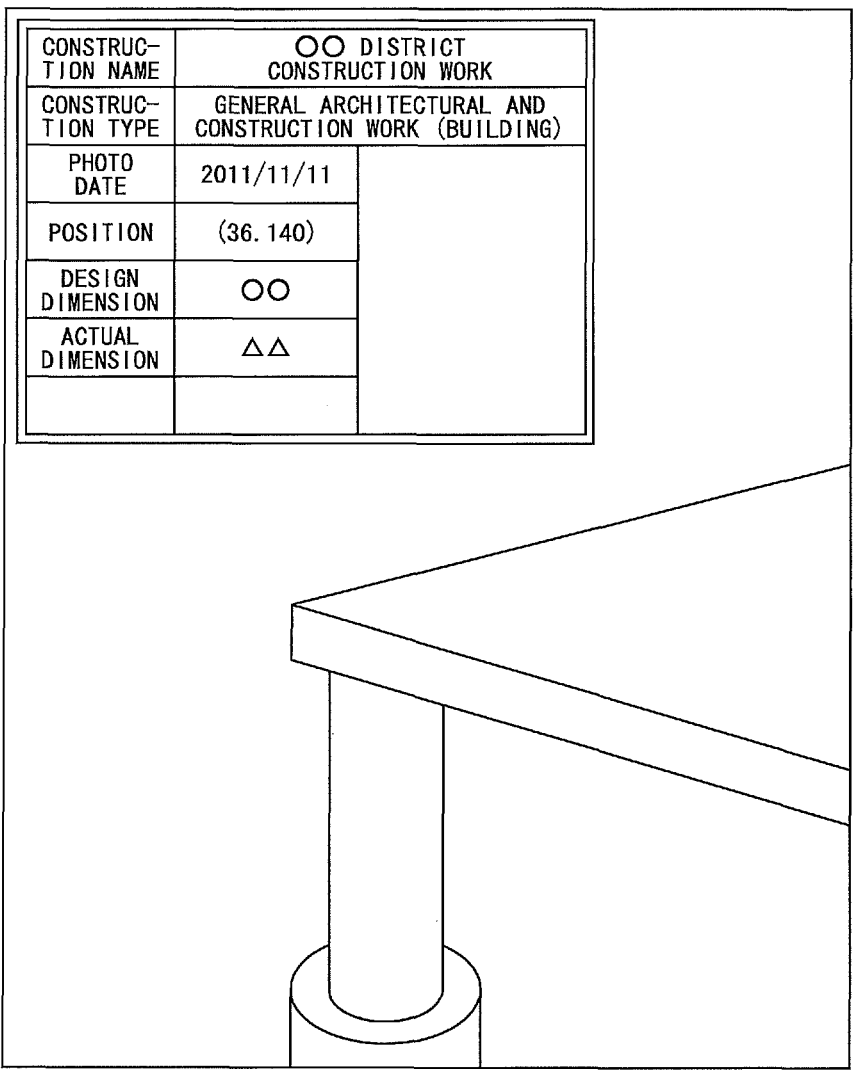
FIG. 27 illustrates an example of an output JPEG image according to an embodiment of the present invention.

FIG. 27 illustrates an example of a JPEG image (verification information/virtual blackboard-added photo) output according to the present embodiment. The JPEG image of FIG. 27 correspond to the selected verification information/virtual blackboard-added photo that is created by compositing a virtual blackboard on a photo image and is output as JPEG file image data. In the following, Exif data of the output JPEG image according to the present embodiment is described.

(Exif Data)

First, a general configuration of Exif data (Exif metadata, also referred to as Exif information) is described. Generally, when capturing a photo with a digital camera and storing the captured photo as a JPEG file, for example, metadata in the Exif format may be automatically created. Such metadata is referred to as Exif data.

Specifically, the digital camera embeds information such as the camera model and the image capturing conditions into the captured photo as Exif data. Such Exif data can be referenced along with the photo image using an image viewer or Exif editing software, for example. Also, in the case of printing the photo image with a printer, for example, the photo image may be automatically optimized based on information relating to the image capturing conditions included in the Exif data before the photo image is printed.

FIG. 28 illustrates an example of EXIF data according to a comparative example. EXIF data is automatically created by a digital camera (software of digital camera) upon storing a captured photo as a JPEG file. The Exif data may include information items such as the camera model and the image capturing conditions as illustrated in FIG. 28.

FIG. 29 illustrates an example of EXIF data of an output JPEG image according to the present embodiment. The EXIF data illustrated in FIG. 29 represents metadata automatically generated by the smart device 1 ("construction site blackboard app" of the smart device 1) according to the present embodiment upon outputting a virtual blackboard-added photo as a JPEG image. Specifically, in addition to camera-specific data such as the camera model and image capturing conditions, the Exif data of FIG. 29 includes virtual blackboard information input to the predetermined fields of the virtual blackboard and verification information.

The Exif data includes a storage area (standard area) for storing standardized information (Exif Standard data) including main information such as the camera model and sub information such as the image capturing conditions, for example. In addition, the Exif data includes a storage area (private area) for storing information including parameters that may be uniquely defined by each individual manufacturer, for example. Thus, each manufacturer may additionally store "manufacturer-specific information" that is specifically defined by the manufacturer in the private area. In the present embodiment, when outputting a virtual blackboard-added photo as a JPEG image, the smart device 1 ("construction site blackboard app" of smart device 1) additionally stores data input to the predetermined fields of the virtual blackboard (virtual blackboard information) and verification information in the "manufacturer-specific information" of the Exif data.

(JPEG Image Output Process)

Figure 30:
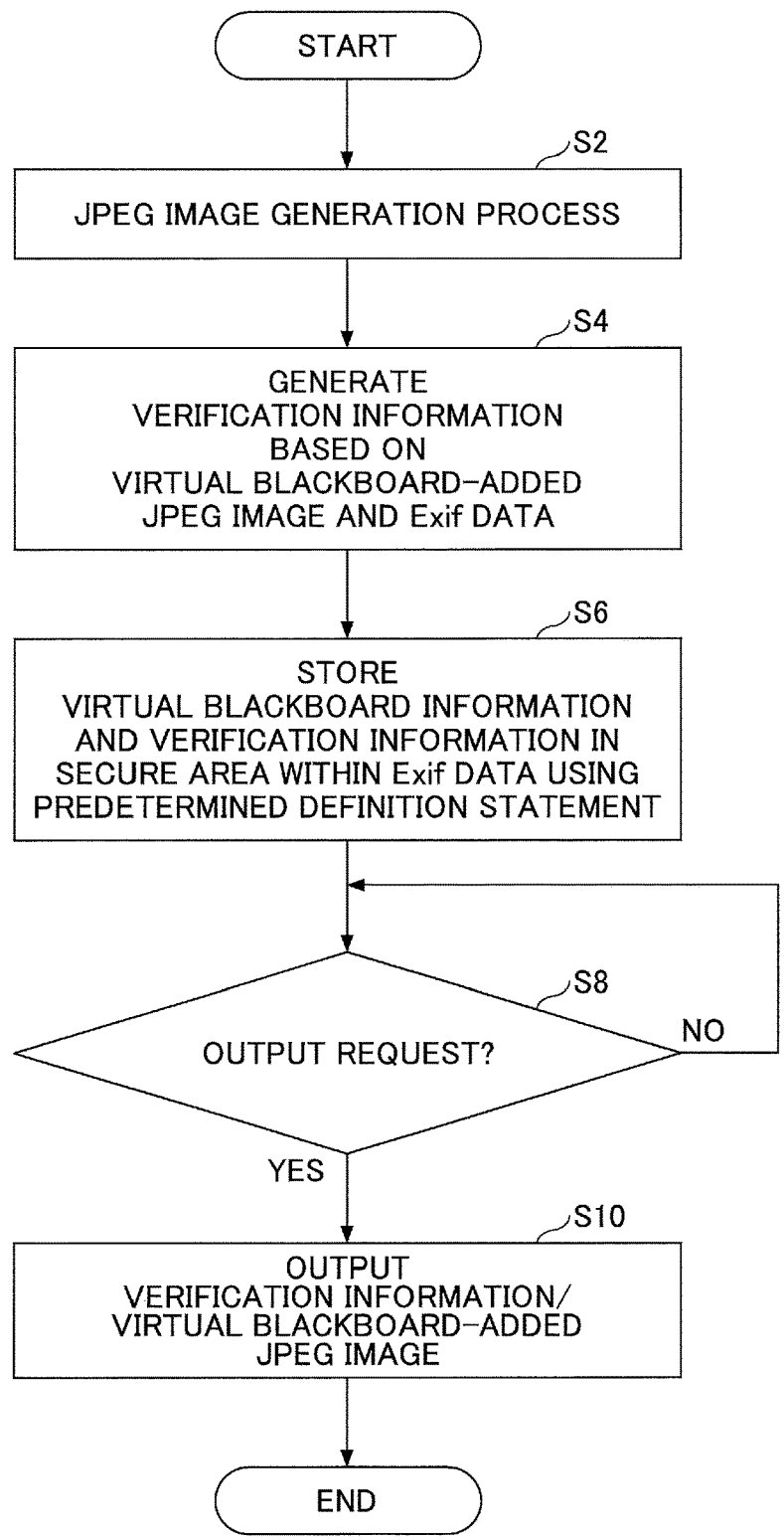
FIG. 30 is a flowchart illustrating a process for outputting verification information and a virtual blackboard-added JPEG image according to an embodiment of the present invention.
Figure 31:
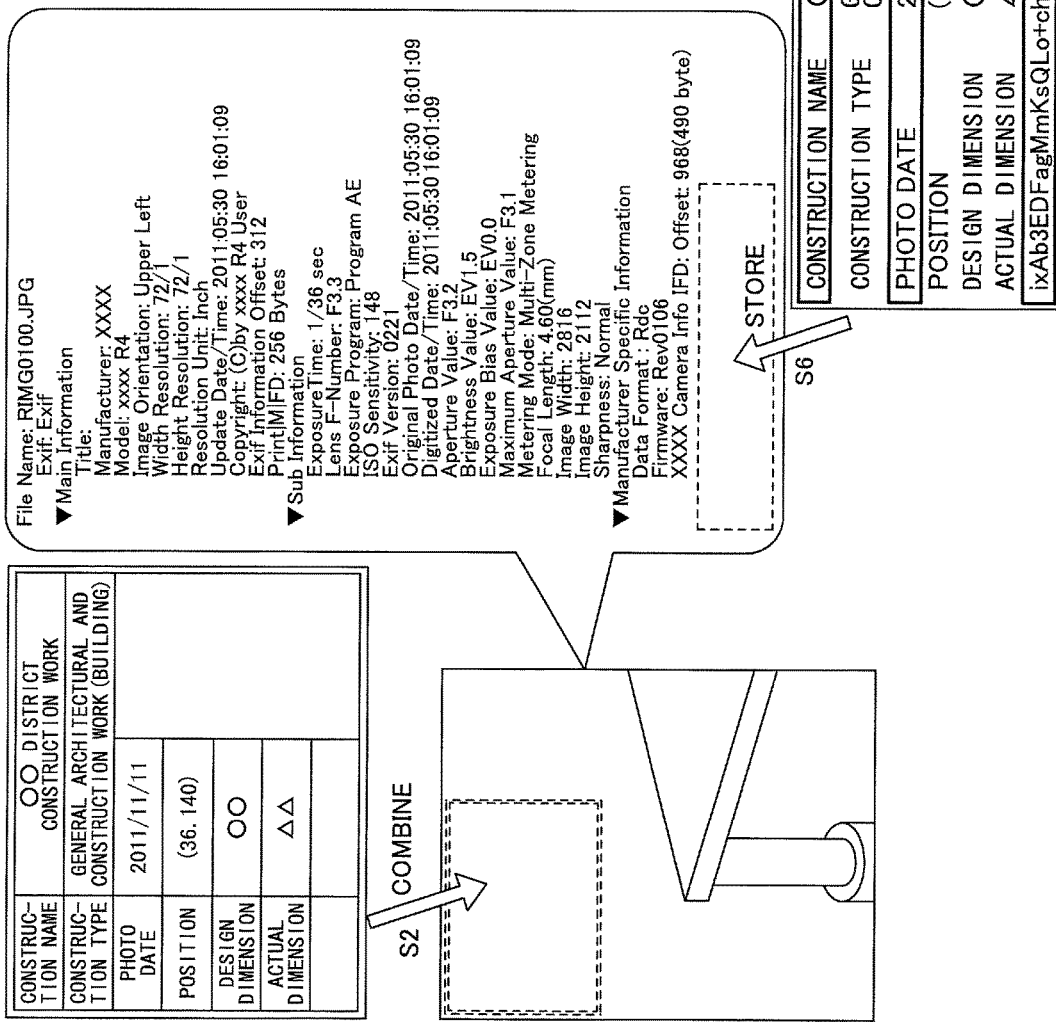
FIG. 31 illustrates the process for outputting the JPEG image.

FIG. 30 is a flowchart illustrating a process for outputting a verification information/virtual blackboard-added JPEG image according to an embodiment of the present invention. Note that the JPEG image output process of FIG. 30 is described below with reference to FIG. 31 as well.

In step S2, the image editing unit 106 performs a JPEG image generation process with respect to a captured photo image. Specifically, the image editing unit 106 superimposes a virtual blackboard image on the captured photo image according to parameter settings (size and position of the virtual blackboard, etc.).

In step S4, the verification information computing unit 107 computes (generates) verification information based on the virtual blackboard-added photo and metadata. Specifically, the verification information may be generated when a corresponding operation button on the screen is touched after the virtual blackboard-added photo is displayed on the screen, for example.

In step S6, the verification information storage unit 108 stores the virtual blackboard information and the verification information in the private area of the Exif data according to a predetermined definition statement. Note that in the illustrated example of FIG. 31, data input to the fields "CONSTRUCTION NAME" and "PHOTO DATE" are used as the virtual blackboard information. However, the virtual blackboard information used in the present embodiment is not particularly limited to data input to the above fields.

In step S8, the image output unit 110 determines whether an output request has been issued with respect to the virtual blackboard-added photo having the verification information and the virtual blackboard information stored (embedded) therein (hereinafter referred to as "verification information/virtual blackboard-added photo"). Specifically, for example, when the operation button "OUTPUT IMAGE" on the screen is touched while the verification information/virtual blackboard-added photo is displayed on the screen (e.g. see FIG. 25), the image output unit 110 may determine that an output request has been issued with respect to the verification information/virtual blackboard-added photo.

In step S10, the image output unit 110 outputs the verification information/virtual blackboard-added photo upon determining that an output request has been issued (e.g. see FIG. 29).

[Process of PC 6]

Figure 32:
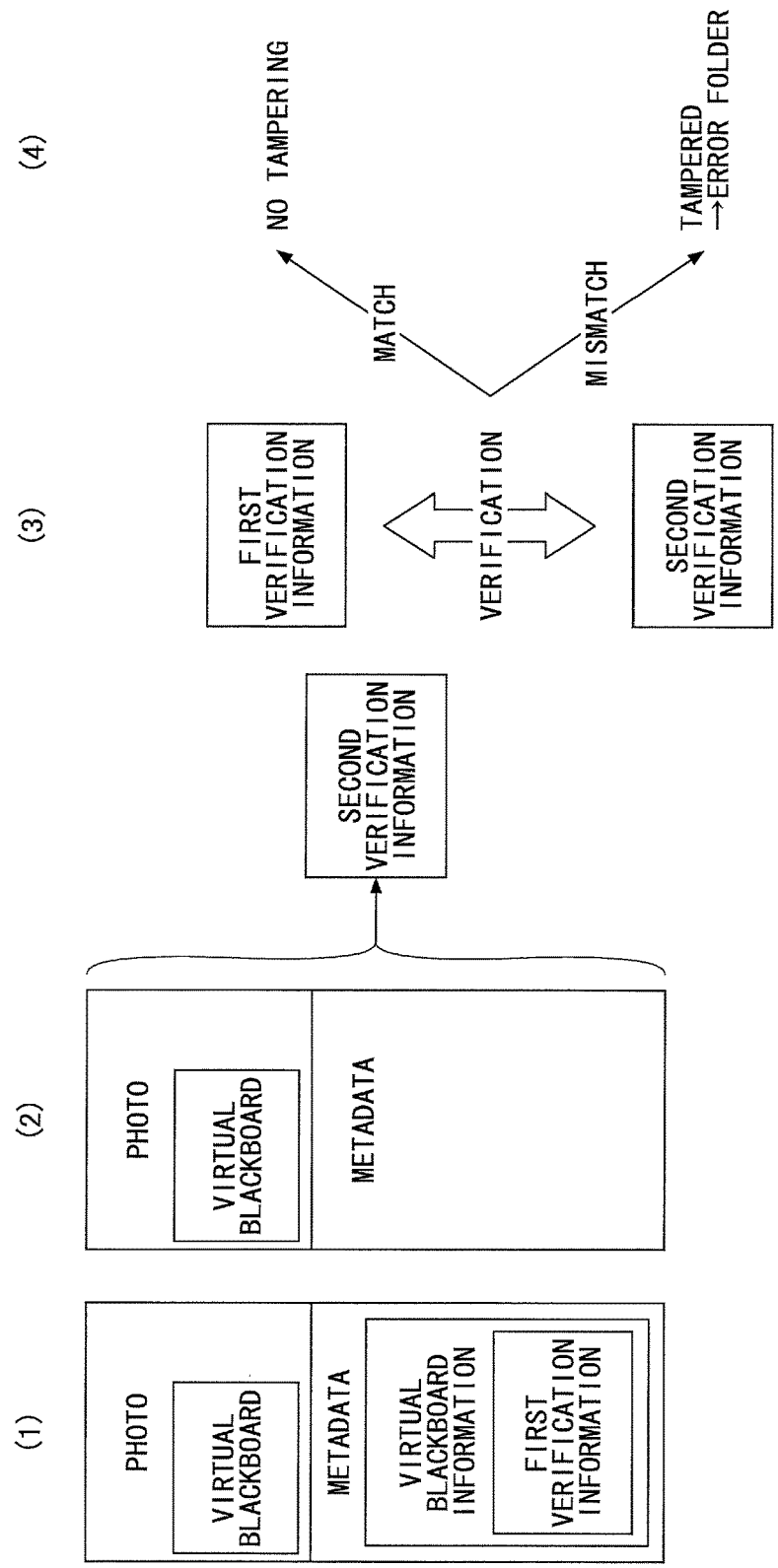

FIG. 32 illustrates an exemplary process for determining whether a verification information/virtual blackboard-added photo has been tampered with that is implemented by the PC 6.

A verification information/virtual blackboard-added photo transmitted to the PC 6 from the smart device 1 may be received by the communication unit 603 and input to the image acquisition unit 604. In a case where an operation for acquiring a verification information/virtual blackboard-added photo is performed, the image acquisition unit 604 inputs the acquired verification information/virtual blackboard-added photo to the storage unit 601. In a case where an operation for inspecting whether the verification information/virtual blackboard-added photo has been tampered with is performed in addition to the operation of acquiring the verification information/virtual blackboard-added photo, the image acquisition unit 604 inputs the acquired verification information/virtual blackboard-added photo to the storage unit 601 and the tampering determination unit 605.

When the verification information/virtual blackboard-added photo is input to the tampering determination unit 605 (1), the verification information removing unit 605a acquires the virtual blackboard information and the verification information (hereinafter referred to as "first verification information") from the private area of the Exif data of the verification information/virtual blackboard-added photo according to a predetermined definition statement and removes the acquired virtual blackboard information and first verification information from the verification information/virtual blackboard-added photo. Then, the verification information removing unit 605a inputs the virtual blackboard-added photo that is obtained as a result of removing the virtual blackboard information and the first verification information from the verification information/virtual blackboard-added photo (hereinafter referred to as a "verification information-removed virtual blackboard-added photo") to the verification information computing unit 605b, and inputs the acquired first verification information to the verification information verifying unit 605c.

The verification information computing unit 605b generates verification information (hereinafter referred to as "second verification information") based on the verification information-removed virtual blackboard-added photo (verification information generating image) that is input from the verification information removing unit 605a using a predetermined function such as a hash function that is set in advance, and inputs the generated second verification information to the verification information verifying unit 605c (2). Note that the predetermined function is not limited to a hash function as described above. For example, in a case where a function to be used may be selectively set from a plurality of functions, the same function as that used by the smart device 1 will be set.

The verification information verifying unit 605c performs verification by determining whether the first verification information input from the verification information removing unit 605a matches the second verification information input from the verification information computing unit 605b (3).

When the first verification information and the second verification information match, the verification information verifying unit 605c determines that the virtual blackboard-added photo has not been tampered with and indicates on the display unit 602b that the virtual blackboard-added photo has not been tampered with. On the other hand, when the first verification information and the second verification information do not match, the verification information verifying unit 605c determines that the virtual blackboard-added photo has been tampered with and transfers the virtual blackboard-added photo to an error folder.

(Tampering Determination Process)

Figure 33:
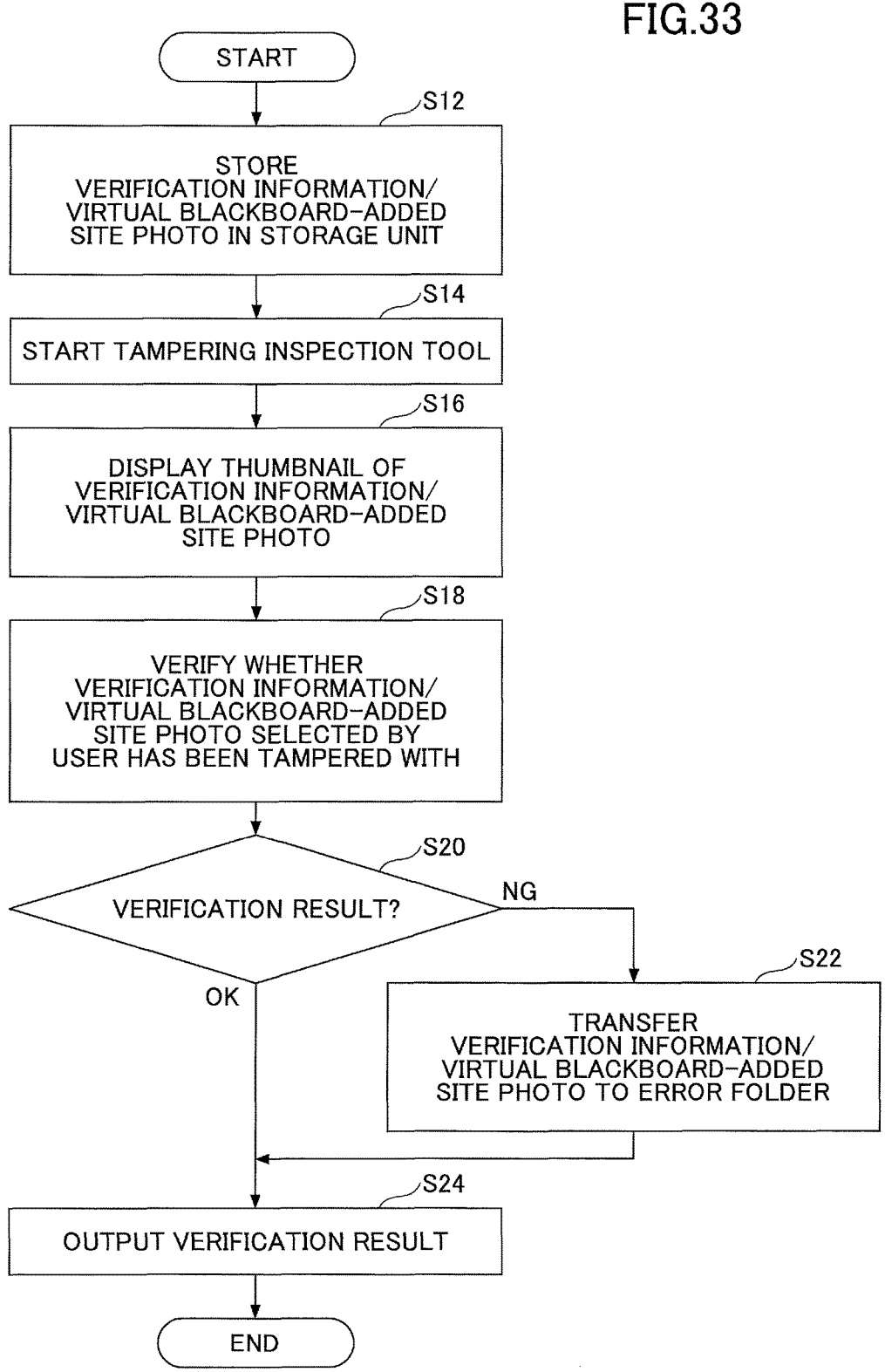
FIG. 33 is a flowchart illustrating the process for determining whether a virtual blackboard-added photo has been tampered with according to an embodiment of the present invention.

FIG. 33 is a flowchart illustrating an exemplary process that is implemented by the PC 6 for determining whether a verification information/virtual blackboard-added photo has been tampered with according to the present embodiment.

In step S12, the verification information/virtual blackboard-added photo transmitted from the smart device 1 to the PC 6 is received by the communication unit 603 and is input to the image acquisition unit 604. The image acquisition unit 604 stores the verification information/virtual blackboard-added photo in the storage unit 601.

In step S14, when the user of the PC 6 operates the operation unit 602a, a tampering inspection tool of an application program of the PC 6 (e.g. "construction site blackboard app") is activated.

In step S16, the display unit 602b displays thumbnails of one or more verification information/virtual blackboard-added photos that are stored in the storage unit 601.

In step S18, the user operates the operation unit 602a to select a desired verification information/virtual blackboard-added photo from the thumbnails of the verification information/virtual blackboard-added photos displayed by the display unit 602b. The tampering determination unit 605 inspects whether the verification information/virtual blackboard-added photo selected by the user via the operation unit 602a has been tampered with.

In step S20, the tampering determination unit 605 determines the verification result. The tampering determination section 605 may determine whether the verification information/virtual blackboard-added photo has been tampered with by determining whether the second verification information matches the first verification information.

In step S22, the tampering determination unit 605 transfers the verification information/virtual blackboard-added photo to the error folder upon determining that the verification information/virtual blackboard-added photo has been tampered with.

In step S24, after transferring the verification information/virtual blackboard-added photo to the error folder in step S22, or upon determining that the verification information/virtual blackboard-added photo has not been tampered with, the tampering determination unit 605 outputs the verification result.

As can be appreciated, the Exif data of the verification information/virtual blackboard-added photo according to the present embodiment includes a value (first verification information) representing the photo image and metadata thereof in addition to camera-specific information such as the camera model and image capturing conditions. Accordingly, at a transmission destination terminal of the verification information/virtual blackboard-added photo, the first verification information may be removed from the verification information/virtual blackboard-added photo, second verification information may be computed based on the verification information-removed virtual blackboard-added photo, and a determination may be made as to whether the verification information/virtual blackboard-added photo has been tampered with based on whether the computed second verification information matches the removed first verification information. Note that because the first verification information is stored in a private area of the Exif data, the first verification cannot be easily acquired by a third party.

(Modification of Verification Information/Virtual Blackboard-Added Photo)

Note that the verification information/virtual blackboard-added photo that is used in the tampering determination process as described above is not limited to the example of FIG. 15. In the following, modified examples of the verification information/virtual blackboard-added photo are described with reference to FIGS. 34-36. Note that the modified examples described below represent variations of the verification information/virtual blackboard-added photo stored in the storage unit 101. As described above, after the user checks a virtual blackboard-added photo on the screen B4 of FIG. 13 and touches the operation button "SAVE" on the screen B4, for example, the virtual blackboard-added photo is stored in the storage unit 101. Further, verification information is computed (generated) based on the virtual blackboard-added photo and Exif metadata, the generated verification information is stored in the virtual blackboard-added photo to create a verification information/virtual blackboard-added photo, and the created verification information/virtual blackboard-added photo is stored in the storage unit 101.

(First Modified Example)

Figure 34:
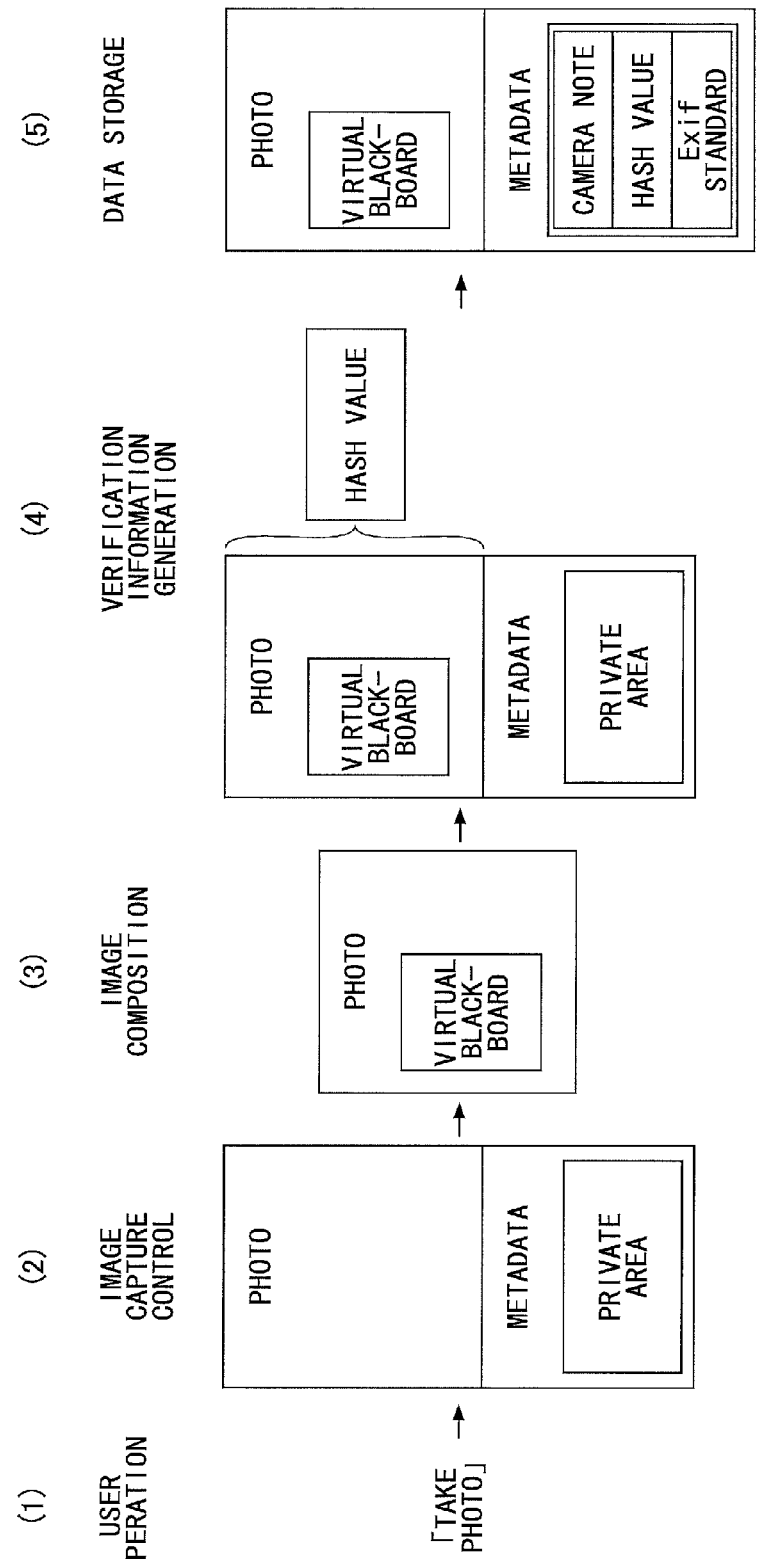
FIG. 34 illustrates a process for creating and storing a verification information/virtual blackboard-added photo according to a first modified example.

FIG. 34 illustrates a first modified example of a process for creating the verification information/virtual blackboard-added photo. According to the process illustrated in FIG. 34, the camera (imaging unit 103) of the smart device 1 captures a photo of a construction site in response to an image capturing operation by the user (1), and an application of the smart device 1 acquires (imports) the photo image (2). Also, Exif metadata is created by the application of the smart device 1 in the image capture control process (2).

Also, the application of the smart device 1 superimposes (inserts) a virtual blackboard as described above on the acquired photo image to create a virtual blackboard-added photo (3). Then, when a user instruction corresponding to an image storage request is issued, the verification information computing unit 107 computes (generates) verification information (e.g. hash value) based on the virtual blackboard-added photo image in the JPEG file format that is input from the image editing unit 106 (4). Note that in the example of FIG. 15 as described above, the verification information is generated based on the virtual blackboard-added photo and the Exif metadata. On the other hand, in the first modified example, the verification information is generated based on the virtual blackboard-added photo obtained by the image composition process (3). Note that in generating the verification information according to the first modified example, the entire virtual blackboard-added photo may be used to generate the verification information, or a predetermined portion of the virtual blackboard-added photo may be used to generate the verification information.

Then, the verification information storage unit 108 stores the verification information generated by the verification information computing unit 107 in a private area of the metadata. Note that in the first modified example, tampering cannot be detected based on the verification information in a case where data items of the metadata (Exif data) has been tampered with. In particular, Exif standard data may be easily tampered with because the definitions of Exif standard data are revealed to the public. Thus, in the first modified embodiment, the verification information storage unit 108 may also store a predetermined information item of the standard metadata (data item of the Exif standard data that is desirably protected from tampering) in the private area. For example, although not limited thereto, image capture date/time information input as Exif standard data by the camera function may set up as a predetermined information item to be stored in the private area. By storing such items of information in the private area, even when the metadata has been tampered with, the information may be acquired from the private area, for example. Note that because the private area is a manufacturer-specific secure area, information stored therein cannot be easily acquired by a third party or be tampered with.

Also, in the first modified example, the verification information storage unit 108 may store information such as a camera note in the private area. A camera note refers to additional data associated with an image that can be optionally set by an image capturing device or an application program using an image capturing function. For example, the verification information storage unit 108 may store an information item such as "construction manager" as a camera note in addition to the above-described virtual blackboard information such as "construction name". Note that information store as the "construction manager" may correspond to a user name that is registered in advance in association with the "construction name" in the smart device 1 as construction information, for example. Also, the construction site blackboard app of the smart device 1 may include a login function, and information stored as the "construction manager" may be a user name of a login user that has logged into the construction site blackboard app, for example. In this way, the verification information/virtual blackboard-added photo (e.g. verification information/virtual blackboard-added site photo) according to the first modified example may be created, and the created verification information/virtual blackboard-added photo may be stored in the storage unit 101 (5).

Note that in the first modified example described above, the verification information is generated using a part or all of the virtual blackboard-added photo. However, in other examples, the verification information may be generated using a part or all of the metadata.

The stored verification information/virtual blackboard-added photo according to the first modified example may subsequently be output to the PC 6, for example, and the PC 6 may perform a process of determining whether the verification information/virtual blackboard-added photo has been tampered with in a manner similar to the process illustrated in FIG. 32. Note that in the first modified example, the same process steps as those illustrated in FIG. 32 are performed, but the verification information being compared is different. In the first modified example, the tampering determination unit 605 computes verification information based on the virtual blackboard-added photo (verification information generating image) using a predetermined function such as a hash function that is set up in advance. Also, the tampering determination unit 605 acquires verification information (e.g. hash value) from the private area of the metadata (Exif data), and performs verification by comparing the computed verification information and the acquired verification information. If the verification result reveals that the above two sets of verification information match, the tampering determination unit 605 determines that the virtual blackboard-added photo has not been tampered with and displays a message to that effect at the display unit 602b. On the other hand, if the verification result reveals that the two sets of verification information do not match, the tampering determination unit 605 determines that the virtual blackboard-added photo has been tampered with and transfers the verification information/virtual blackboard-added photo to an error folder. Also, in the first modified example, information items such as the camera note and Exif standard data that have not been tampered with can be acquired from the private area, for example. Further, in the first modified example, the Exif standard data stored in the private area and the Exif standard data stored in the standard Exif data storage area (where the main information and sub information are stored) may be compared to determine whether the standard Exif data storage area has been tampered with, for example.

(Second Modified Example)

Figure 35:
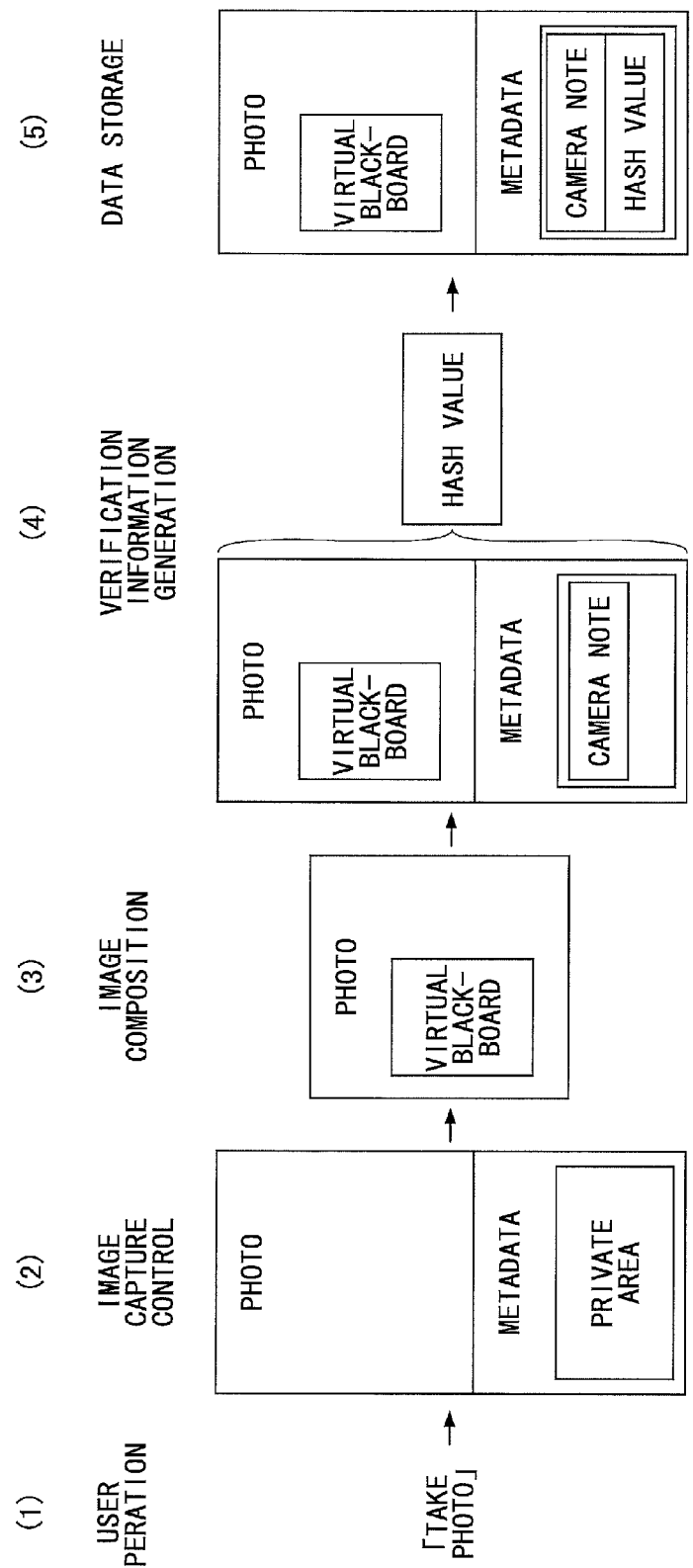
FIG. 35 illustrates a process for creating and storing a verification information/virtual blackboard-added photo according to a second modified example.

FIG. 35 illustrates a process of creating a verification information/virtual blackboard-added photo according to a second modified example. Note that the process steps (1) through (3) of the process of FIG. 35 may be substantially identical to those of the above-described first modified example, and as such, descriptions thereof are omitted.

In the second modified example, when generating verification information (4), the verification information computing unit 107 computes the verification information based on the virtual blackboard-added photo and metadata (e.g. Exif data) in a manner similar to the process illustrated in FIG. 15. However, in the second modified example, the camera note as described above is stored in the private area of the metadata (e.g. Exif data), and the verification information is computed based on the metadata including the camera note. By storing information such as the camera note in the private area, verification information reflecting such information stored in the private area may be generated thereby improving the security of the generated verification information, for example.

Then, the generated verification information (e.g. hash value) is stored in the private area of the metadata to create a verification information/virtual blackboard-added photo, and the created verification information/virtual blackboard-added photo is stored in the storage unit 101 (5). Collation information and a virtual blackboard with photo image created is stored in the storage unit 101 (5).

Note that in the second modified example, when the PC 6 receives the verification information/virtual blackboard-added photo and performs a process of determining whether the verification information/virtual blackboard-added photo had been tampered with, the verification information removing unit 605a as described above acquires and removes the verification information but does not remove the camera memo, and inputs the resulting verification information-removed virtual blackboard-added photo to the verification information computing unit 605b. Note the other process steps of the tampering determination process performed in the second modified example may be substantially similar to the process steps of FIG. 32, and as such, descriptions thereof are omitted.

(Third Modified Example)

Figure 36:
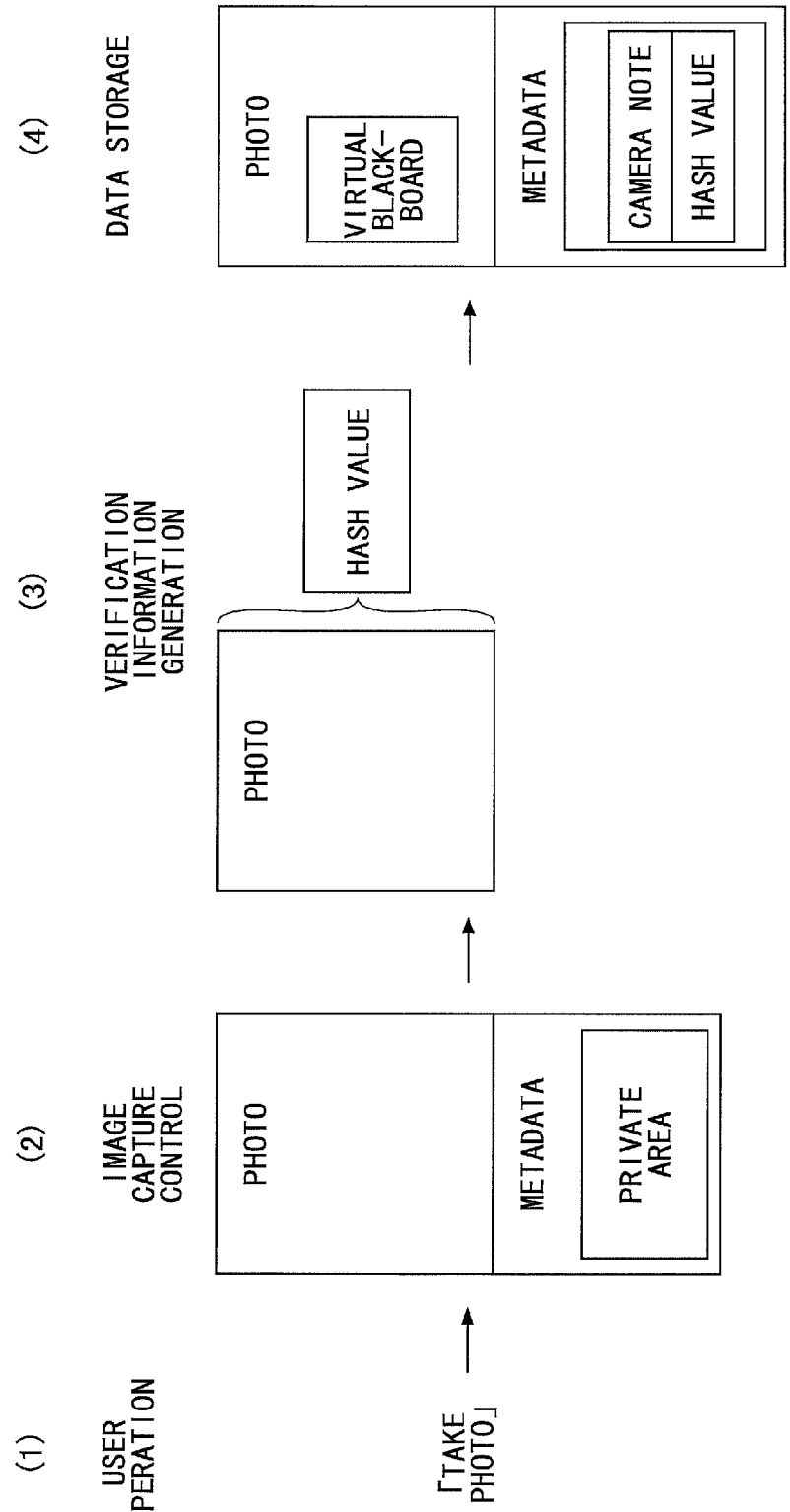
FIG. 36 illustrates a process for creating and storing a verification information/virtual blackboard-added photo according to a third modified example.

FIG. 36 illustrates a process for creating a verification information/virtual blackboard-added photo according to a third modified example. Note that the process steps (1) and (2) of FIG. 36 may be substantially identical to those of the first modified example as described above, and as such, descriptions thereof are omitted.

For example, in the case of detecting tampering of a construction report containing detailed accounts of construction work operations, tampering prevention may sometimes be focused on data input to the fields of the virtual blackboard and the photo image of the construction site. Accordingly, in the third modified example, the verification information computing unit 107 computes verification information using the photo image without a virtual blackboard as a verification information generating image (3). The generated verification information is stored in the private area of the metadata. Also, in the third modified example, the verification information storage unit 108 stores a part or all of the virtual blackboard information including the data input to the fields of the virtual blackboard as a camera note in the private area of the metadata. Note that the camera note may include coordinate information indicating a position of the virtual blackboard on the photo image, for example. Also, such coordinate information may be directly stored in the private area rather than being included in the camera note, for example. In this way, a verification information/virtual blackboard-added photo according to the third modified example may be generated, and the generated verification information/virtual blackboard-added photo may be stored in the storage unit 101 (4). Note that in the third modified example, the virtual blackboard-added photo is stored using the second storage method, namely, by storing the captured photo image, the virtual blackboard template image, and the virtual blackboard-added photo storage management information in association with each other, and output to the PC 6.

Thus, for example, in a process of determining whether the verification information/virtual blackboard-added photo image has been tampered with at the PC 6 according to the third modified example, process steps identical to those of the process illustrated in FIG. 32 may be performed, but the verification information being compared is different in that it represents the photo image. That is, in the third modified example, the tampering determination unit 605 computes verification information based on the photo image using a predetermined function such as a hash function that is set in advance. Also, the tampering determination unit 605 acquires the verification information from the private area of the metadata (Exif data), and performs verification by comparing the two sets of verification information (the acquired verification information and the computed verification information).

In addition, the tampering determination unit 605 may acquire character information by performing a character recognition process such as OCR (Optical Character Recognition) on the virtual blackboard image, and perform verification by comparing the acquired character information with information described in the camera note. In addition, the tampering determination unit 605 may acquire position information (coordinates) of the virtual blackboard by matching a template corresponding to the preset size of the virtual blackboard, and perform verification by comparing the acquired position information with the position information included in the camera note, for example.

If the verification result reveals that the information being compared match, the tampering determination unit 605 determines that the virtual blackboard-added photo has not been tampered with and displays a message to that effect at the display unit 602*b*. On the other hand, if the verification result reveals that the information being compared do not match, the tampering determination unit 605 determines that the virtual blackboard-added photo has been tampered with and transfers the verification information/virtual blackboard-added photo to the error folder.

As can be appreciated, in the third modified example, a determination may be made as to whether the photo image has been tampered with based on verification information generated using the photo image (verification information generating image), and a determination may be made as to whether data input to the virtual blackboard had been tampered with based on virtual blackboard information (camera note) stored in the private area of the metadata. Also, in the third modified embodiment, the virtual blackboard-added photo is not a composite image, and as such, the virtual blackboard-added photo being displayed may be edited in the manned described above. Although editing that may lead to unauthorized tampering should be disabled, for example, by enabling the position of the virtual blackboard to be shifted (edited), the photo image located underneath the virtual blackboard may be viewed and inspected, for example. In this way, for example, concealment of a portion of the photo image using the virtual blackboard may be prevented.

Note that by acquiring coordinate information stored in the private area, the PC 6 may determine whether the virtual blackboard in the virtual blackboard-added photo received from the smart device 1 is placed according to the acquired coordinate information. In this way, the PC 6 may determine whether the virtual blackboard has been subject to editing such as position shifting or scaling between the time the virtual blackboard-added photo has been stored at the smart device 1 and the time the virtual blackboard-added photo has been received at the PC 6.

Note that in the above modified examples, one set of verification information is generated based on a part or all of the virtual blackboard-added photo or the photo image. However, embodiments of the present invention are not limited thereto, and a plurality of different types of verification information may be generated, for example. In this case, for example, verification information may be generated based on the photo image, and verification information may also be generated based on the virtual blackboard. The plurality of types of verification information that have been generated may be stored in the private area of the metadata to be used in a tampering determination process. By increasing the number of verification information used, a more detailed tampering determination process may be performed, for example.

Note that the PC 6 is an example of an information processing apparatus. Also, JPEG is an example of a predetermined image format.

[Summary]

As described above, according to an aspect of the present invention, a system may be provided that can improve efficiency in performing image capturing operations for capturing a site photo of a construction site, and also enable tampering detection of a virtual blackboard-added photo that has a virtual blackboard arranged on the captured site photo.

Note that in the embodiments described above, the present invention has been described with reference to image capturing operations performed at a construction site as an example. However, the scope of the present invention is by no means limited thereto. For example, the present invention may be applied to various systems in which a user inputs additional information at the time a photo is captured and attaches the additional information (corresponding to virtual blackboard information in the above embodiment) to the captured photo, and the image data of the photo is desirably protected from tampering after the image capturing operations have been completed. As another example, the present invention may be applied to electronic evidence preservation for electronically verifying the authenticity of declaration information (e.g. information relating to work status, work progress, field conditions) that is input by a user with respect to a photo image. Examples of electronic evidence preservation may include providing evidence that certain work such as cleaning toilets, clearing ash trays, garbage collection, or other cleaning operations has been completed at a certain time by taking a photo of the completed state and storing the photo image as evidence. Note, however, that the above are merely illustrative examples and do not limit the scope of the present invention.

Although the present invention has been illustrated with respect to certain illustrative embodiments, the present invention is not limited to these embodiments, and numerous variations can be made including combinations of the above embodiments and/or other embodiments. That is, numerous modifications and changes may be made without departing from the scope of the present invention. In addition, the present invention encompasses applications in various forms including any one or a combination of components, methods, apparatuses, systems, a computer program, a recording medium, and the like.

Although the present invention has been described above with respect to specific embodiments, the embodiments and modifications are merely illustrative, and one skilled in the art may conceive of various variations, modifications, alternatives, and replacements. For convenience of explanation, an apparatus according to an embodiment of the present invention has been described with reference to functional block diagrams, but such features of the apparatus may be implemented by hardware, software or a combination thereof. The present invention is not limited to the above embodiments and encompasses various changes, modifications, alternatives, and substituted examples that can be derived within the scope of the present invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority of Japanese Patent Application No. 2014-199812 filed on Sep. 30, 2014 and Japanese Patent Application No. 2015-181503 filed on Sep. 15, 2015, the entire contents of which are hereby incorporated by reference.

What is claimed is:

1. An information processing system comprising:
a smart device including a first storage device; and
an information processing apparatus configured to receive an image that has been created by the smart device;
wherein the smart device includes
an imaging device configured to capture a photo image;
an input device configured to input data to a predetermined field of a virtual display panel image; and
a first processor that executes program instructions stored in the first storage device, the execution of the program instructions causing the first processor to
create a virtual display panel-added photo image by superimposing the virtual display panel image having the data input to the predetermined field by the input device on the photo image captured by the imaging device;
generate first verification information with respect to the virtual display panel-added photo image based on at least the photo image of the virtual display panel-added photo image; and
create a verification information/virtual display panel-added photo image that stores the first verification information and the data input to the predetermined field as metadata of the verification information/virtual display panel-added photo image; and
wherein the information processing apparatus includes
a second storage device configured to store program instructions; and
a second processor that executes the program instructions stored in the second storage device, the execution of the program instructions causing the second processor to
acquire the first verification information and the data input to the predetermined field from the verification information/virtual display panel-added photo image received from the smart device;
create a verification information generating image to be used for generating second verification information, the verification information generating image being created by removing at least the first verification information from the received verification information/virtual display panel-added photo image;
generate the second verification information based on the verification information generating image; and
verify the generated second verification information with respect to the acquired first verification information and output a verification result.

2. The information processing system as claimed in claim 1, wherein
the first processor creates the virtual display panel-added photo image by compositing the virtual display panel image on the photo image to create a single image conforming to a predetermined image format; and
the first processor generates the first verification information based on the virtual display panel-added photo image.

3. The information processing system as claimed in claim 1, wherein
the virtual display panel-added photo image includes metadata; and
the first processor generates the first verification information based on the virtual display panel-added photo image that includes the metadata.

4. The information processing system as claimed in claim 3, wherein
the data input to the predetermined field of the virtual display panel image is stored in the metadata of the virtual display panel-added photo image; and
the first processor generates the first verification information based on the virtual display panel-added photo image that includes the metadata storing the data input to the predetermined field.

5. The information processing system as claimed in claim 1, wherein
the metadata includes a standard area for storing standard information defined by a standard and a private area for storing uniquely defined information; and
the first processor creates the verification information/virtual display panel-added photo image that stores the first verification information and the data input to the predetermined field in the private area of the meta data of the verification information/virtual display panel-added photo image.

6. The information processing system as claimed in claim 1, wherein the virtual display panel-added photo image is in a JPEG image format, and the metadata corresponds to Exif data.

7. The information processing system as claimed in claim 2, wherein
the virtual display panel-added photo image includes metadata; and
the first processor generates the first verification information based on the virtual display panel-added photo image that includes the metadata.

8. The information processing system as claimed in claim 7, wherein
the data input to the predetermined field of the virtual display panel image is stored in the metadata of the virtual display panel-added photo image created; and
the first verification information generating unit generates the first verification information based on the virtual display panel-added photo image that includes the metadata storing the data input to the predetermined field.

9. The information processing system as claimed in claim 2, wherein
the metadata includes a standard area for storing standard information defined by a standard and a private area for storing uniquely defined information; and
the first processor creates the verification information/virtual display panel-added photo image that stores the first verification information and the data input to the predetermined field in the private area of the meta data of the verification information/virtual display panel-added photo image.

10. The information processing system as claimed in claim 2, wherein the virtual display panel-added photo image is in a JPEG image format, and the metadata corresponds to Exif data.

11. The information processing system as claimed in claim 3, wherein
the metadata includes a standard area for storing standard information defined by a standard and a private area for storing uniquely defined information; and
the first processor creates the verification information/virtual display panel-added photo image that stores the first verification information and the data input to the predetermined field in the private area of the meta data of the verification information/virtual display panel-added photo image.

12. The information processing system as claimed in claim 3, wherein the virtual display panel-added photo image is in a JPEG image format, and the metadata corresponds to Exif data.

13. The information processing system as claimed in claim 4, wherein
the metadata includes a standard area for storing standard information defined by a standard and a private area for storing uniquely defined information; and
the first processor creates the verification information/virtual display panel-added photo image that stores the first verification information and the data input to the predetermined field in the private area of the meta data of the verification information/virtual display panel-added photo image.

14. The information processing system as claimed in claim 4, wherein the virtual display panel-added photo image is in a JPEG image format, and the metadata corresponds to Exif data.

15. The information processing system as claimed in claim 5, wherein the virtual display panel-added photo image is in a JPEG image format, and the metadata corresponds to Exif data.

16. An information processing apparatus configured to receive a verification information/virtual display panel-added photo image that has been created by a smart device, the smart device including
an imaging device configured to capture a photo image;
an input device configured to input data to a predetermined field of a virtual display panel image;
a first storage device configured to store program instructions; and
a first processor that executes the program instructions stored in the first storage device, the execution of the program instructions causing the first processor to
create a virtual display panel-added photo image by superimposing the virtual display panel image having the data input to the predetermined field by the input device on the photo image captured by the imaging device;
generate first verification information with respect to the virtual display panel-added photo image based on at least the photo image of the virtual display panel-added photo image; and
create a verification information/virtual display panel-added photo image that stores the first verification information and the data input to the predetermined field as metadata of the verification information/virtual display panel-added photo image;
the information processing apparatus comprising:
a second storage device configured to store program instructions; and
a second processor that executes the program instructions stored in the second storage device, the execution of the program instructions causing the second processor to
acquire the first verification information and the data input to the predetermined field from the verification information/virtual display panel-added photo image received from the smart device;
create a verification information generating image to be used for generating second verification information, the verification information generating image being created by removing at least the first verification information from the received verification information/virtual display panel-added photo image;
generate the second verification information based on the verification information generating image; and
verify the generated second verification information with respect to the acquired first verification information, and output a verification result.

* * * * *